(12) United States Patent
Zhang et al.

(10) Patent No.: US 12,096,176 B2
(45) Date of Patent: Sep. 17, 2024

(54) MICROPHONE NOISE REDUCTION SYSTEM AND SMART GLASSES USING THE SYSTEM

(71) Applicant: SHENZHEN SHOKZ CO., LTD., Guangdong (CN)

(72) Inventors: Lei Zhang, Shenzhen (CN); Junjiang Fu, Shenzhen (CN); Bingyan Yan, Shenzhen (CN); Fengyun Liao, Shenzhen (CN); Xin Qi, Shenzhen (CN)

(73) Assignee: SHENZHEN SHOKZ CO., LTD., Shenzhen (CN)

( * ) Notice: Subject to any disclaimer, the term of this patent is extended or adjusted under 35 U.S.C. 154(b) by 748 days.

(21) Appl. No.: 17/320,257

(22) Filed: May 14, 2021

(65) Prior Publication Data
US 2021/0271115 A1    Sep. 2, 2021

Related U.S. Application Data

(63) Continuation of application No. PCT/CN2020/070550, filed on Jan. 6, 2020.

(30) Foreign Application Priority Data

Apr. 30, 2019 (CN) .......................... 201910364346.2
Sep. 19, 2019 (CN) .......................... 201910888067.6
Sep. 19, 2019 (CN) .......................... 201910888762.2

(51) Int. Cl.
*H04R 1/26*   (2006.01)
*G02C 11/00*  (2006.01)
(Continued)

(52) U.S. Cl.
CPC .......... *H04R 1/1016* (2013.01); *G02C 11/00* (2013.01); *G02C 11/10* (2013.01); *G06F 3/16* (2013.01);
(Continued)

(58) Field of Classification Search
CPC ........ H04R 1/1016; H04R 1/02; H04R 1/026; H04R 1/028; H04R 1/10; H04R 1/1008;
(Continued)

(56) References Cited

U.S. PATENT DOCUMENTS

2015/0049893 A1* 2/2015 Heidenreich .......... H04R 25/50
                                              381/320
2021/0160606 A1   5/2021 Zhang et al.

FOREIGN PATENT DOCUMENTS

CN    202307119 U    7/2012
CN    206640738 U    11/2017
(Continued)

OTHER PUBLICATIONS

International Search Report in PCT/CN2020/070550 mailed on Mar. 27, 2020, 5 pages.

*Primary Examiner* — Paul Kim
(74) *Attorney, Agent, or Firm* — METIS IP LLC

(57) ABSTRACT

The present disclosure relates to a pair of smart glasses. The pair of smart glasses may include a frame, one or more lenses, and one or more temples. The pair of smart glasses may further include at least one microphone array, a noise reduction device, at least one low-frequency acoustic driver, at least one high-frequency acoustic driver, and a controller. The at least one microphone array may be configured to generate sub-band voice signals. The noise reduction device may be configured to generate a noise correction signal based on each of the sub-band voice signal and generate a sub-band correction signal based on the noise correction signal and the sub-band voice signal. The controller may be configured to direct the low-frequency acoustic driver to output the sounds in a first frequency range and direct the high-frequency acoustic driver to output the sounds in a second frequency range.

18 Claims, 32 Drawing Sheets

(51) Int. Cl.
- G06F 3/16 (2006.01)
- G10L 21/0208 (2013.01)
- G10L 21/038 (2013.01)
- H04M 1/03 (2006.01)
- H04M 1/78 (2006.01)
- H04R 1/02 (2006.01)
- H04R 1/10 (2006.01)
- H04R 1/22 (2006.01)
- H04R 1/24 (2006.01)
- H04R 1/28 (2006.01)
- H04R 1/34 (2006.01)
- H04R 1/38 (2006.01)
- H04R 1/44 (2006.01)
- H04R 3/00 (2006.01)
- H04R 3/02 (2006.01)
- H04R 5/02 (2006.01)
- H04R 5/033 (2006.01)
- H04R 9/06 (2006.01)
- H04S 7/00 (2006.01)
- H04W 4/80 (2018.01)
- G02C 11/06 (2006.01)
- G10L 21/0216 (2013.01)

(52) U.S. Cl.
CPC ............... *G06F 3/162* (2013.01); *G06F 3/165* (2013.01); *G10L 21/0208* (2013.01); *G10L 21/038* (2013.01); *H04M 1/03* (2013.01); *H04M 1/035* (2013.01); *H04M 1/78* (2013.01); *H04R 1/02* (2013.01); *H04R 1/026* (2013.01); *H04R 1/028* (2013.01); *H04R 1/10* (2013.01); *H04R 1/1008* (2013.01); *H04R 1/1025* (2013.01); *H04R 1/1041* (2013.01); *H04R 1/105* (2013.01); *H04R 1/1075* (2013.01); *H04R 1/1083* (2013.01); *H04R 1/22* (2013.01); *H04R 1/24* (2013.01); *H04R 1/245* (2013.01); *H04R 1/26* (2013.01); *H04R 1/28* (2013.01); *H04R 1/2803* (2013.01); *H04R 1/2807* (2013.01); *H04R 1/2811* (2013.01); *H04R 1/2896* (2013.01); *H04R 1/34* (2013.01); *H04R 1/342* (2013.01); *H04R 1/345* (2013.01); *H04R 1/347* (2013.01); *H04R 1/38* (2013.01); *H04R 1/44* (2013.01); *H04R 3/00* (2013.01); *H04R 3/005* (2013.01); *H04R 3/02* (2013.01); *H04R 5/02* (2013.01); *H04R 5/033* (2013.01); *H04R 5/0335* (2013.01); *H04R 9/06* (2013.01); *H04S 7/304* (2013.01); *H04W 4/80* (2018.02); *G02C 11/06* (2013.01); *G10L 2021/02166* (2013.01); *H04R 2201/103* (2013.01); *H04R 2410/05* (2013.01); *H04R 2420/07* (2013.01); *H04S 2400/11* (2013.01)

(58) Field of Classification Search
CPC .... H04R 1/1025; H04R 1/1041; H04R 1/105; H04R 1/1075; H04R 1/1083; H04R 1/22; H04R 1/24; H04R 1/245; H04R 1/26; H04R 1/28; H04R 1/2803; H04R 1/2807; H04R 1/2811; H04R 1/2896; H04R 1/34; H04R 1/342; H04R 1/345; H04R 1/347; H04R 1/38; H04R 1/44; H04R 3/00; H04R 3/005; H04R 3/02; H04R 5/02; H04R 5/033; H04R 5/0335; H04R 9/06; H04R 2201/103; H04R 2410/05; H04R 2420/07; H04W 4/80; G02C 11/00; G02C 11/10; G02C 11/06; G06F 3/16; G06F 3/162; G06F 3/165; G10L 21/0208; G10L 21/038; G10L 2021/02166; H04M 1/03; H04M 1/035; H04M 1/78; H04S 7/304; H04S 2400/11
USPC ........................................................ 381/94.1
See application file for complete search history.

(56) References Cited

FOREIGN PATENT DOCUMENTS

| CN | 208783039 U | 4/2019 |
|----|-------------|--------|
| WO | 2016206764 A1 | 12/2016 |
| WO | 2020051786 A1 | 3/2020 |

* cited by examiner

300

(a)

(b)

600

Signal processing module

Signal processing module

4600A

4600B

MICROPHONE NOISE REDUCTION SYSTEM AND SMART GLASSES USING THE SYSTEM

CROSS-REFERENCE TO RELATED APPLICATIONS

This application is a Continuation of International Patent Application No. PCT/CN2020/070550, filed on Jan. 6, 2020, which claims priority of Chinese Patent Application No. 201910364346.2, filed on Apr. 30, 2019, Chinese Patent Application No. 201910888762.2, filed on Sep. 19, 2019, and Chinese Patent Application No. 201910888067.6, filed on Sep. 19, 2019, the entire contents of each of which are incorporated herein by reference.

TECHNICAL FIELD

The present disclosure relates to smart devices, in particular, to a microphone noise reduction system and smart glasses with the microphone noise reduction system.

BACKGROUND

With the development of voice and communication technology, more and more people hope to make a voice call or a video call with others through portable smart devices (such as smart glasses, etc.). With the development of artificial intelligence technology, a smart device may include a voice assistant to realize human-computer interaction. However, a conventional smart device may include one single microphone to receive a sound. During receiving the sound, noises may also be recorded by the microphone, and the noises may affect the record of a sound source of a user of the microphone, thereby affecting the call quality and the recognition performance of the voice assistant. Therefore, it is desirable to provide a microphone noise reduction system and smart glasses with the microphone noise reduction system.

SUMMARY

According to an aspect of the present disclosure, a microphone noise reduction system and smart glasses with the microphone noise reduction system are provided. The microphone noise reduction system may include at least one microphone array. Each of the at least one microphone array may include microphones with different frequency responses, thereby reducing sound leakage of smart glasses and improving user's experience. In some embodiments, the microphone noise reduction system may further reduce the sound leakage of the smart glasses and improve the user's experience by setting multi-point sources and loudspeakers corresponding with different frequency responses.

To achieve the above purposes, the technical solutions disclosed according to some embodiments of the present disclosure are described in the following.

According to an aspect of the present disclosure, a pair of smart glasses is provided. The pair of smart glasses may include a frame, one or more lenses, and one or more temples. The pair of smart glasses may further include at least one microphone array, a noise reduction device, at least one low-frequency acoustic driver, at least one high-frequency acoustic driver, and a controller. The at least one microphone array may be configured to generate a sub-band voice signal. The noise reduction device may be configured to generate a noise correction signal based on the sub-band voice signal and generate a sub-band correction signal based on the noise correction signal and the sub-band voice signal. The at least one low-frequency acoustic driver may be configured to output sounds from at least two first guiding holes. The at least one high-frequency acoustic driver may be configured to output sounds from at least two second guiding holes. The controller may be configured to direct the low-frequency acoustic driver to output the sounds in a first frequency range and direct the high-frequency acoustic driver to output the sounds in a second frequency range. The second frequency range may include one or more frequencies higher than one or more frequencies in the first frequency range.

In some embodiments, a first distance may be between the two first guiding holes, a second distance may be between the two second guiding holes, and the first distance may exceed the second distance.

In some embodiments, the first distance may be in a range of 20 millimeters-40 millimeters, and the second distance may be in a range of 3 millimeters-7 millimeters.

In some embodiments, the first distance may be at least twice of the second distance.

In some embodiments, the first frequency range may include frequencies lower than 650 Hz, and the second frequency range may include frequencies higher than 1000 Hz.

In some embodiments, the first frequency range may overlap with the second frequency range.

In some embodiments, the controller may include an electronic frequency division module. The electronic frequency division module may be configured to divide an audio source signal to generate a low-frequency signal corresponding to the first frequency range and a high-frequency signal corresponding to the second frequency range. The low-frequency signal may drive the at least one low-frequency acoustic driver to generate the sounds, and the high-frequency signal may drive the at least one high-frequency acoustic driver to generate the sounds.

In some embodiments, the electronic frequency division module may include at least one of a passive filter, an active filter, an analog filter, or a digital filter.

In some embodiments, the at least one low-frequency acoustic driver may include a first transducer. The at least one high-frequency acoustic driver may include a second transducer. The first transducer and the second transducer may have different frequency response characteristics.

In some embodiments, the first transducer may include a low-frequency loudspeaker, and the second transducer may include a high-frequency loudspeaker.

In some embodiments, at least two first acoustic routes may be formed between the at least one low-frequency acoustic driver and the at least two first guiding holes. At least two second acoustic routes may be formed between the at least one high-frequency acoustic driver and the at least two second guiding holes. The at least two first acoustic routes and the at least two second acoustic routes may have different frequency selection characteristics.

In some embodiments, each of the at least two first acoustic routes may include an acoustic resistance material. An acoustic impedance of the acoustic resistance material may be in a range from 5MKS Rayleigh to 500MKS Rayleig.

In some embodiments, the pair of smart glasses may further include a supporting structure. The supporting structure may be configured to support the at least one high-frequency acoustic driver and the at least one low-frequency acoustic driver and keep the at least two second guiding holes closer to a user's ears than the at least two first guiding holes when the user wears the smart glasses.

In some embodiments, the at least two first guiding holes and the at least two second guiding holes may be disposed on the supporting structure.

In some embodiments, the supporting structure may include a first housing. The low-frequency acoustic driver may be encapsulated by the first housing. The first housing may define a front chamber and a rear chamber of the low-frequency acoustic driver.

In some embodiments, the front chamber of the low-frequency acoustic driver may be acoustically coupled to one of the at least two first guiding holes. The rear chamber may be acoustically coupled to the other first guiding hole of the at least two first guiding holes.

In some embodiments, the supporting structure may include a second housing. The high-frequency acoustic driver may be encapsulated by the second housing. The second housing may define a front chamber and a rear chamber of the high-frequency acoustic driver.

In some embodiments, the front chamber of the high-frequency acoustic driver may be acoustically coupled to one of the at least two second guiding holes. The rear chamber of the high-frequency acoustic driver may be acoustically coupled to the other second guiding hole of the at least two second guiding holes.

In some embodiments, the sounds output from the at least two first guiding holes may have opposite phases.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
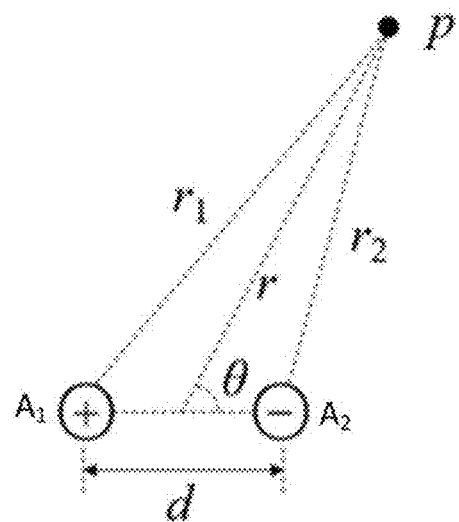
FIG. 1 is a schematic diagram illustrating an exemplary dual-point sound source according to some embodiments of the present disclosure.

In order to illustrate the technical solutions related to the embodiments of the present disclosure, a brief introduction of the drawings referred to in the description of the embodiments is provided below. Obviously, drawings described below are only some examples or embodiments of the present disclosure. Those skilled in the art, without further creative efforts, may apply the present disclosure to other similar scenarios according to these drawings. It should be understood that the purposes of these illustrated embodiments are only provided to those skilled in the art to practice the application, and not intended to limit the scope of the present disclosure. Unless apparent from the locale or otherwise stated, like reference numerals represent similar structures or operations throughout the several views of the drawings.

As used in the disclosure and the appended claims, the singular forms "a," "an," and/or "the" may include plural forms unless the content clearly indicates otherwise. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

It will be understood that the term "system," "unit," "module," and/or "block" used herein are one method to distinguish different components, elements, parts, section or assembly of different level in ascending order. However, the terms may be displaced by another expression if they achieve the same purpose.

Spatial and functional relationships between elements (for example, between layers) are described using various terms, including "connected," "engaged," "interfaced," and "coupled." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The present disclosure discloses a pair of smart glasses. The pair of smart glasses may include an acoustic output device and at least one microphone array. The at least one microphone array may include at least two microphones. The at least two microphones may have different frequency responses to a sound signal. For example, a low-frequency microphone may have a relatively high response to a low-frequency sound and a high-frequency microphone may have a relatively high response to a high-frequency sound. The at least two microphones with different frequency responses to sounds may improve sound pickup performance of the pair of smart glasses and improve the stability of the frequency response curve of the pair of smart glasses. In some embodiments, the pair of smart glasses may include a noise reduction device and a synthesis device. The noise reduction device may generate a noise correction signal according to a sub-band voice signal received by at least one of the at least two microphones. The noise correction signal may at least include noises of the sub-band voice signal and have a phase opposite to that of the noises of the sub-band voice signal. A sub-band correction signal may be generated by combining the noise correction signal and the sub-band voice signal. The synthesis device may be configured to synthesize sub-band correction signals of the at least two microphones to generate a target voice signal.

In some embodiments, the acoustic output device may include at least two sets of acoustic drivers. The at least two sets of acoustic drivers may include at least one set of high-frequency acoustic drivers and at least one set of low-frequency acoustic drivers. Each of the two sets of acoustic drivers may be configured to generate sounds with certain frequency ranges, and propagate the sounds outward through at least two guiding holes acoustically coupled with the two sets of acoustic drivers, respectively.

In some embodiments, the acoustic output device may include at least one set of acoustic drivers, and the sound generated by the at least one set of acoustic drivers may be propagated outward through at least two guiding holes acoustically coupled with the at least one set of acoustic drivers. In some embodiments, the acoustic output device may include a baffle, and the at least two guiding holes may be disposed on two side of the baffle, respectively. In some embodiments, the at least two guiding holes may be disposed on two sides of the user's auricle when a user wears the acoustic output device. In this case, the auricle may be regarded as the baffle to separate the at least two guiding holes, and the at least two guiding holes may correspond to different acoustic routes to the user's ear canal.

FIG. 1 is a schematic diagram illustrating an exemplary dual-point sound source according to some embodiments of the present disclosure. To further illustrate the effect of the setting of guiding holes of an acoustic output device on an output sound of the acoustic output device, and considering that the sound propagates outward from the guiding holes, the guiding holes of the acoustic output device may be regarded as sound sources for sound output in the present disclosure.

Merely for illustration purposes, when a size of each of the guiding holes of the acoustic output device is relatively small, the each guiding hole may be regarded as a point sound source. In some embodiments, any guiding holes disposed on the acoustic output device for outputting sound may be regarded as a single point sound source of the acoustic output device. A sound pressure of a sound field p generated by a single point sound source may be represented by Equation (1) below:

$$p = \frac{j\omega\rho_0}{4\pi r} Q_0 \exp j(\omega t - kr), \tag{1}$$

where $\omega$ refers to an angular frequency, $\rho_0$ refers to the air density, r refers to a distance between a target point and a sound source, $Q_0$ refers to a volume velocity of the sound source, and k refers to a wave number. It can be seen that the sound pressure of the sound field of the point sound source may be inversely proportional to the distance between the target point to the point sound source. It should be noted that a guiding hole for outputting a sound is regarded as a point sound source in the present disclosure may be only an example of the principle and effect, which does not limit the shape and size of the guiding hole in practical applications. In some embodiments, a guiding hole with a relatively large area may be regarded as a surface sound source and configured to propagate a sound outward. In some embodiments, the point sound source may also be realized by other structures, such as a vibrating surface, a sound radiating surface, or the like. For those skilled in the art, without paying any creative activity, it may be known that the sound generated by the structures such as the guiding hole, the vibrating surface, and the sound radiating surface may be regarded as a point sound source at a spatial scale discussed in the present disclosure, which may have the same sound propagation characteristics and the same mathematical descriptions. Further, for those skilled in the art, without paying any creative activity, it may be known that the acoustic effect achieved in a case in which a sound generated by an acoustic driver may be propagated outward through at least two guiding holes illustrated in the present disclosure may be achieved by other acoustic structures mentioned above, such as the sound generated by the at least one set of acoustic drivers may be propagated outward through at least one sound radiating surface. Other acoustic structures may be selected, adjusted, and/or combined according to actual needs, and the same acoustic output effect may be achieved. The principle of propagating sound outward by a structure such as the surface sound source may be similar to the principle of propagating sound outward by the point sound source, which is not be repeated herein.

As mentioned above, at least two guiding holes corresponding to the same acoustic driver of an acoustic output device disclosed in the present disclosure may be used to construct a dual-point sound source, thereby reducing the sound radiated by the acoustic output device to the surrounding environment. For convenience, the sound radiated by the acoustic output device to the surrounding environment may be referred to as a far-field leakage sound due to that the sound may be heard by other people in the environment. The sound that the acoustic output device radiates to the ears of the user wearing the acoustic output device may be referred to as a near-field sound due to the acoustic output device is close to the user. In some embodiments, the sound output by two guiding holes (i.e., a dual-point sound source) may have a certain phase difference. As used herein, a phase of the sound output by a point sound source (e.g., a guiding hole) may also be referred to as a phase of the point sound source. When positions of the two point sound sources of the dual-point sound source and the phase difference satisfy certain conditions, the acoustic output device may show different sound effects in the near-field (e.g., a hearing position of the user's ear) and the far-field. For example, when the phases of the point sound sources corresponding to the two guiding holes are opposite, that is, when an absolute value of the phase difference between the two point sound sources is 180 degrees, a far-field leakage may be reduced according to the principle of sound wave anti-phase cancellation. More descriptions regarding improving the sound output effect of an acoustic output device may be found in International Patent Application No. PCT/CN2019/130884 filed on Dec. 31, 2019, the entire contents of which are hereby incorporated by reference.

As shown in FIG. 1, the sound pressure p of the sound field generated by the dual-point sound source may be represented by Equation (2) below:

$$p = \frac{A_1}{r_1} \exp\; j(\omega t - kr_1 + \varphi_1) + \frac{A_2}{r_2} \exp\; j(\omega t - kr_2 + \varphi_2), \quad (2)$$

where $A_1$ and $A_2$ refer to the intensities of the two point sound sources of the dual-point sound source, respectively, $\varphi_1$ and $\varphi_2$ refer to the phases of the two point sound sources of the dual-point sound source, respectively, and $r_1$ and $r_2$ may be represented by Equation (3) below:

$$\begin{cases} r_1 = \sqrt{r^2 + \left(\frac{d}{2}\right)^2 - 2*r*\frac{d}{2}*\cos\theta} \\ r_2 = \sqrt{r^2 + \left(\frac{d}{2}\right)^2 + 2*r*\frac{d}{2}*\cos\theta} \end{cases} \quad (3)$$

where r refers to a distance between any target point in space and a center position of the two point sound sources of the dual-point sound source, θ refers to an angle between a line connecting the target point and the center position of the dual-point sound source and a line where the dual-point sound source locates (i.e., the line connecting the two point sound sources of the dual-point sound source), and d refers to a distance between the two point sound sources of the dual-point sound source.

According to Equation (3), the sound pressure of the target point in the sound field may relate to the intensity of each point sound source, the distance between the two point sound sources, the phases of the two point sound sources, and a distance between the target point and the dual-point sound source.

The dual-point sound source with different output performance may be formed by setting the sound guiding holes. In this case, a volume in the near-field sound may be increased, and a volume of the leakage sound in the far-field may be decreased. For example, an acoustic driver may include a vibration diaphragm. When the vibration diaphragm vibrates, sounds may be transmitted from a front side and a rear side of the vibration diaphragm, respectively. The front side of the vibration diaphragm in the acoustic output device may include a front chamber for transmitting a sound. The front chamber may be acoustically coupled with a sound guiding hole. The sound transmitted from the front side of the vibration diaphragm may be transmitted to the sound guiding hole through the front chamber and further transmitted outwards. The rear side of the vibration diaphragm in the acoustic output device may be provided with a rear chamber for transmitting a sound. The rear chamber may be acoustically coupled with another sound guiding hole, and the sound transmitted from the rear side of the vibration diaphragm may be transmitted to the sound guiding hole through the rear chamber and propagate outwards. It should be noted that, when the vibration diaphragm vibrates, the front side and the rear side of the vibration diaphragm may generate sounds with opposite phases, respectively. In some embodiments, the structures of the front chamber and rear chamber may be specially set so that the sounds output by the acoustic driver at different sound guiding holes may meet specific conditions. For example, lengths of the front chamber and the rear chamber may be specially designed such that sounds with a specific phase relationship (e.g., opposite phases) may be output from the two sound guiding holes. As a result, problems that the acoustic output device has a low volume in the near-field and the sound leakage in the far-field may be effectively resolved.

Under certain conditions, compared to a single point sound source, the volume of the far-field sound of the dual-point sound source may be increased with the frequency. In other words, the leakage reduction capability of the dual-point sound source in the far-field may be decreased as the frequency increases. For further description, a curve of far-field leakage with frequency may be described in connection with FIG. 2.

Figure 2:
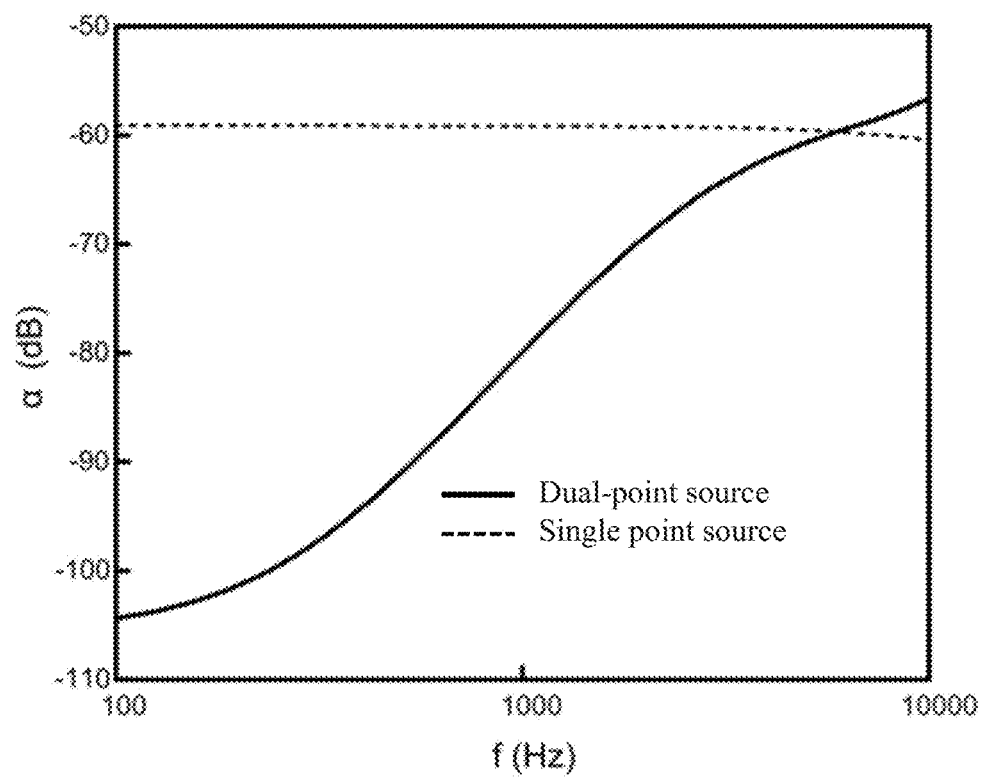
FIG. 2 is a schematic diagram illustrating changes of leakage sounds of a dual-point sound source and a single point sound source along with a frequency according to some embodiments of the present disclosure.

FIG. 2 is a schematic diagram illustrating changes of leakage sounds of a dual-point sound source and a single point sound source along with a frequency according to some embodiments of the present disclosure. A distance between the two point sound sources of the dual-point sound source in FIG. 2 may be constant, and the dual-point sound source may have the same (or substantially same) amplitude and opposite phases. A dotted line represents the variation of a volume of the leakage sound of the single point sound source at different frequencies. A solid line represents the variation of a volume of the leakage sound of the dual-point sound source at different frequencies. The abscissa represents the sound frequency (f), and the unit is Hertz (Hz). The ordinate adopts a normalization parameter α to evaluate a volume of a leakage sound. The parameter α may be represented by Equation (4) below:

$$\alpha = \frac{|P_{far}|^2}{|P_{ear}|^2}, \tag{4}$$

where $P_{far}$ represents a sound pressure of the acoustic output device in a far-field (i.e., the sound pressure of the far-field sound leakage). $P_{ear}$ represents a sound pressure around the user's ear(s) (i.e., a sound pressure of the near-field sound). The greater the value of α, the greater the far-field leakage sound relative to the near-field sound may be, which may indicate that the capability of the acoustic output device for reducing the far-field sound leakage may be worse.

As shown in FIG. 2, when the frequency is below 6000 Hz, the far-field leakage sound produced by the dual-point sound source may be less than the far-field leakage sound produced by the single point sound source, and the far-field leakage sound may be increased as the frequency increases. When the frequency is close to 10000 Hz (e.g., about 8000 Hz or above), the far-field leakage sound produced by the dual-point sound source may be greater than the far-field leakage sound produced by the single point sound source. In some embodiments, a frequency corresponding to an intersection of the variation curves of the dual-point sound source and the single point sound source may be determined as an upper limit frequency that the dual-point sound source can reduce the sound leakage.

For the purposes of illustration, when the frequency is relatively small (e.g., in a range of 100 Hz to 1000 Hz), the capability of reducing sound leakage of the dual-point sound source may be relatively strong (i.e., the value of α may be small which is below −80 dB). In such a frequency band, increment of the volume of the hearing sound may be determined as an optimization goal. When the frequency is relatively great, (e.g., in a range of 1000 Hz to 8000 Hz), the capability of reducing sound leakage of the dual-point sound source may be relatively weak (i.e., the value of α may be large which is above −80 dB). In such a frequency band, decrease of the sound leakage may be determined as the optimization goal.

Referring to FIG. 2, a frequency division point of the frequency may be determined based on the variation tendency of the capability of the dual-point sound source in reducing the sound leakage. Parameters of the dual-point sound source may be adjusted according to the frequency division point so as to reduce the sound leakage of the acoustic output device. For example, the frequency corresponding to α with a specific value (e.g., −60 dB, −70 dB, −80 dB, −90 dB, etc.) may be used as the frequency division point. Parameters of the dual-point sound source may be determined by setting the frequency band below the frequency division point to improve volume of the near-field sound, and setting the frequency band above the frequency division point to reduce the far-field sound leakage. In some embodiments, a high-frequency band with relatively high sound frequencies (e.g., a sound output by a high-frequency acoustic driver) and a low-frequency band with relatively low sound frequencies (e.g., a sound output by a low-frequency acoustic driver) may be determined based on the frequency division point. More descriptions regarding the frequency division point may be found elsewhere in the present disclosure. See, e.g., FIG. 4 and the relevant descriptions thereof.

In some embodiments, the measurement and calculation of the sound leakage may be adjusted according to the actual conditions. For example, an average value of amplitudes of the sound pressures of a plurality of points on a spherical surface centered at the dual-point sound source with a radius of 40 cm may be determined as the value of the sound leakage. A distance between the near-field hearing position and the point sound source may be less than a distance between the point sound source and the spherical surface for measuring the far-field sound leakage. Optionally, the ratio of the distance between the near-field hearing position and the center of the dual-point sound source to the radius r may be less than 0.3, 0.2, 0.15, or 0.1. As another example, one or more points of the far-field position may be taken as the position for measuring the sound leakage, and the sound volume of the position may be taken as the value of the sound leakage. As another example, a center of the dual-point sound source may be used as a center of a circle, and sound pressure amplitudes of two or more points evenly sampled according to a certain spatial angle in the far-field may be averaged, and an average value may be taken as the value of the sound leakage. These measurement and calculation methods may be adjusted by those skilled in the art according to actual conditions, which are not limited herein.

According to FIG. 2, it can be concluded that in the high-frequency band (e.g., a relatively high frequency band determined according to the frequency division point), the dual-point sound source may have a relatively weak capability to reduce sound leakage, and in the low-frequency band (e.g., a relatively low frequency band determined according to the frequency division point), the dual-point sound source may have a relatively strong capability to reduce sound leakage. At a certain sound frequency, the amplitudes, phase differences, etc., of the two point sound sources of the dual-point radiation source may be different, and the capability of the two point sound sources of the dual-point radiation source to reduce sound leakage may be different, and the difference between a volume of the heard sound and a volume of the leakage sound may also be different. For a better description, the curve of the far-field leakage as a function of the distance between the two point sound sources of the dual-point radiation source may be described with reference to FIGS. 3A and 3B.

Figure 3A:
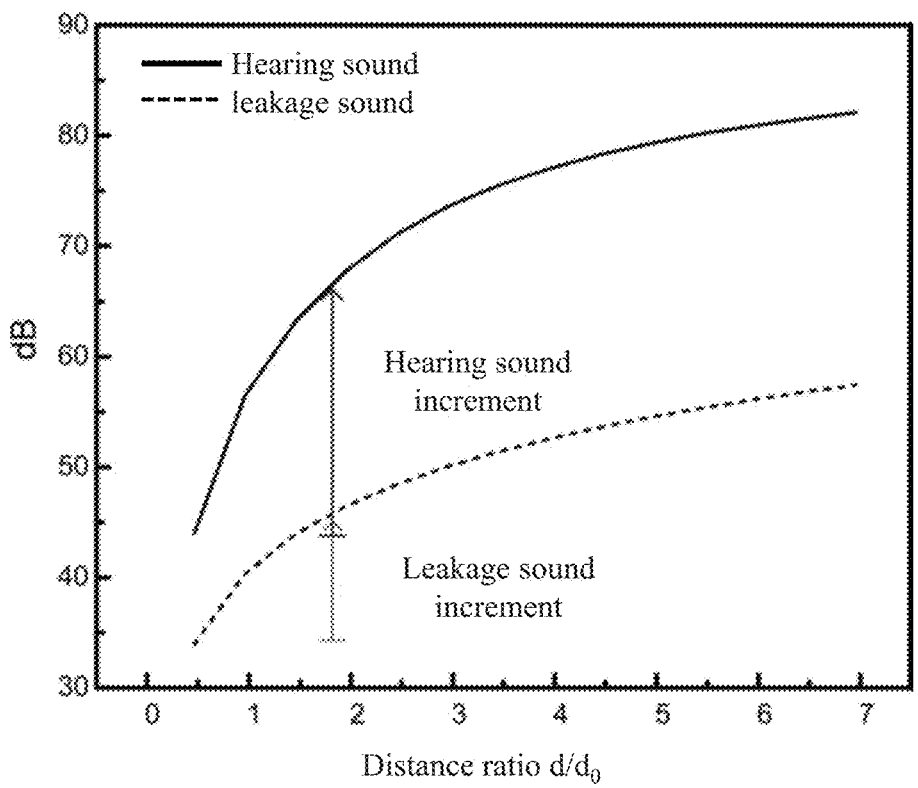
FIG. 3A and FIG. 3B are graphs illustrating changes of a volume of a near-field sound and a volume of a far-field leakage along with a distance of two point sound sources of a dual-point sound source according to some embodiments of the present disclosure.
Figure 3B:
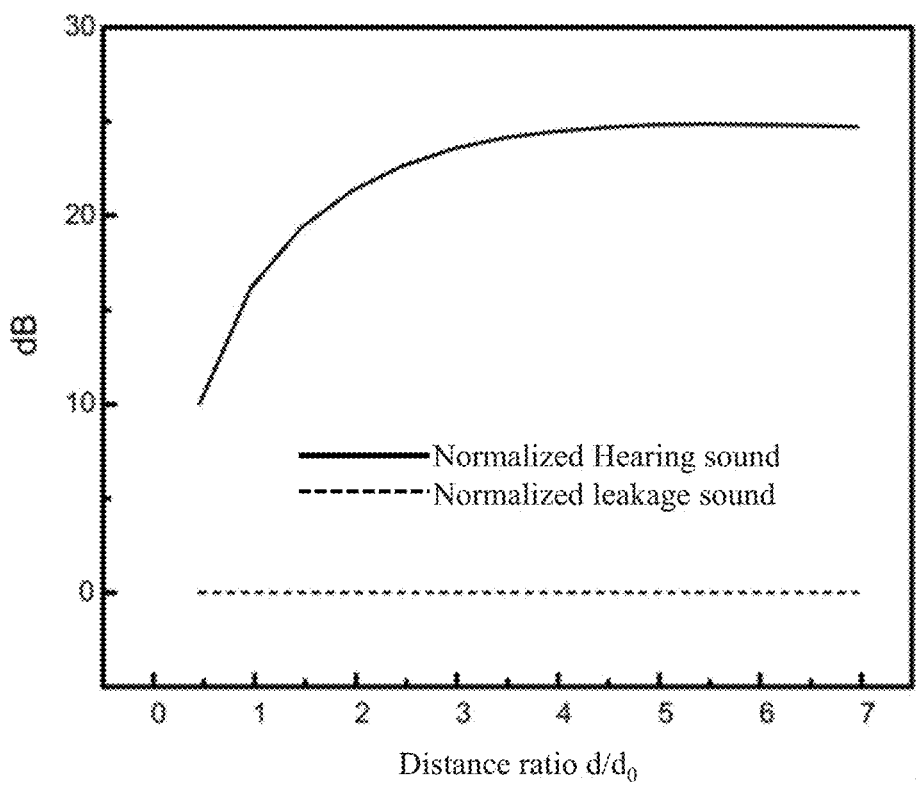

FIG. 3A and FIG. 3B are graphs illustrating changes of a volume of a near-field sound and a volume of a far-field leakage along with a distance of two point sound sources of a dual-point sound source according to some embodiments of the present disclosure. FIG. 3B is the graph which is generated by performing a normalization on the graph in FIG. 3A.

As shown in FIG. 3A, a solid line represents a variation curve of a hearing sound of the dual-point sound source with the distance between the two point sound sources of the dual-point sound source, and a dotted line represents a variation curve of a leakage sound of the dual-point sound source with the distance between the two point sound sources of the dual-point sound source. The abscissa represents a distance ratio d/d0 of the distance d between the two point sound sources of the dual-point sound source to a reference distance d0 The ordinate represents a sound volume (the unit is decibel (dB)). The distance ratio d/d0 may reflect a change of the distance between the two point sound sources of the dual-point sound source. In some embodiments, the reference distance d0 may be determined within a specific range. For example, d0 may be a specific value in the range of 2.5 millimeters-10 millimeters. Merely by way of example, d0 may be 5 millimeters. In some embodiments, the reference distance d0 may be determined based on a hearing position. For example, a distance between the hearing position to a nearest point sound source among the two point sound sources of the dual-point sound source may be regarded as the reference distance d0. It should be known that the reference distance d0 may be determined as any other suitable values according to the actual conditions, which is not limited herein. Merely by way of example, in FIG. 3A, do may be 5 millimeters as the reference value for the change of the distance between the two point sound sources of the dual-point sound source.

When the sound frequency is constant, a volume of the hearing sound and a volume of the leakage sound of the dual-point sound source may increase as the distance between the two point sound sources of the dual-point sound source increases. When the distance ratio d/d0 is less than a ratio threshold, as the distance between the two point sound sources of the dual-point sound source increases, the increment of the volume of the hearing sound may be greater than the increment of the volume of the leakage sound. That is, the increment of the volume of the hearing sound may be more significant than that of the volume of the leakage sound. For example, as shown in FIG. 3A, when the distance ratio d/d0 is 2, a difference between the volume of the hearing sound and the volume of the leakage sound may be about 20 dB. When the distance ratio d/d0 is 4, the difference between the volume of the hearing sound and the volume of the leakage sound may be about 25 dB. In some embodiments, when the distance ratio d/d0 reaches the ratio threshold, a ratio of the volume of the hearing sound and the volume of the leakage sound may reach a maximum value, and as the distance of the two point sound sources of the dual-point sound source further increases, the curve of the volume of the hearing sound and the curve of the volume of the leakage sound may gradually go parallel. That is, the increment of the volume of the hearing sound and the increment of the volume of the leakage sound may be the same (or substantially same). For example, as shown in FIG. 3B, when the distance ratio d/d0 is 5, 6, or 7, the difference between the volume of the hearing sound and the volume of the leakage sound may be the same (or substantially same), which may be about 25 dB. That is, the increment of the volume of the hearing sound may be the same as the increment of the volume of the leakage sound. In some embodiments, the ratio threshold of the distance ratio d/d0 of the dual-point sound source may be in the range of 0-7. For example, the ratio threshold of d/d0 may be in the range of 0.5-4.5. As another example, the ratio threshold of d/d0 may be in the range of 1-4.

In some embodiments, the ratio threshold may be determined based on the change of the difference between the volume of the hearing sound and the volume of the leakage sound of the dual-point sound source in FIG. 3A. For example, the ratio of the volume of the hearing sound to the volume of the leakage sound may be determined as the ratio threshold when a maximum difference between the volume of the hearing sound and the volume of the leakage sound is reached. As shown in FIG. 3B, when the distance ratio d/d0 is less than the ratio threshold (e.g., 4), as the distance between the two point sound sources of the dual-point sound source increases, a normalized curve of a hearing sound may show an upward trend (e.g., a slope of the normalized curve is greater than 0). That is, the increment of the volume of the hearing sound may be greater than the increment of the volume of the leakage sound. When the distance ratio d/d0 is greater than the ratio threshold, as the distance between the two point sound sources of the dual-point sound source increases, the slope of the normalized curve of the hearing sound may gradually approach 0. The normalized curve of the hearing sound may be parallel to the normalized curve of the leakage sound. That is, as the distance between the two point sound sources of the dual-point sound source increases, the increment of the volume of the hearing sound may be no longer greater than the increment of the volume of the leakage sound.

Based on the description mentioned above, it can be seen that when the hearing position is constant and the parameters of the dual-point sound source may be adjusted by certain means, thereby achieving significantly increasing the volume of the near-field sound and slightly increasing the volume of the far-field leakage (that is, the increment of the volume of the near-field sound is greater than the increment of the volume of the far-field leakage). For example, two or more of dual-point sound sources (e.g., a high-frequency dual-point sound source and a low-frequency dual-point sound source) may be disposed, the distance between two point sound sources of each of the dual-point sound sources may be adjusted by a certain means, and the distance between two point sound sources of the high-frequency dual-point sound source may be less than the distance between two point sound sources of the low-frequency dual-point sound source. Due to the low-frequency dual-point sound source may have a small sound leakage (i.e., the low-frequency dual-point sound source may have a relatively strong capability to reduce the sound leakage), and the high-frequency dual-point sound source may have a relatively great sound leakage (i.e., the high-frequency dual-point sound source may have a relatively weak capability to reduce the sound leakage). The volume of the hearing sound may be significantly greater than the volume of the leakage sound when the distance between the two point sound sources of the dual-point sound source in the high-frequency band is relatively small, thereby reducing the sound leakage.

In the embodiments of the present disclosure, a distance may be between two guiding holes corresponding to each set of acoustic drivers, and the distance may affect the volume of the near-field sound transmitted by the acoustic output device to the user's ears and the volume of the far-field leakage transmitted by the acoustic output device to the environment. In some embodiments, when the distance between the guiding holes corresponding to a high-frequency acoustic driver is less than the distance between the guiding holes corresponding to a low-frequency acoustic driver, the volume of the hearing sound may be increased and the volume of the leakage sound may be reduced, thereby preventing the sound from being heard by others near the user of the acoustic output device. According to the above descriptions, the acoustic output device may be effectively used as an open binaural earphone even in a relatively quiet environment.

Figure 4:
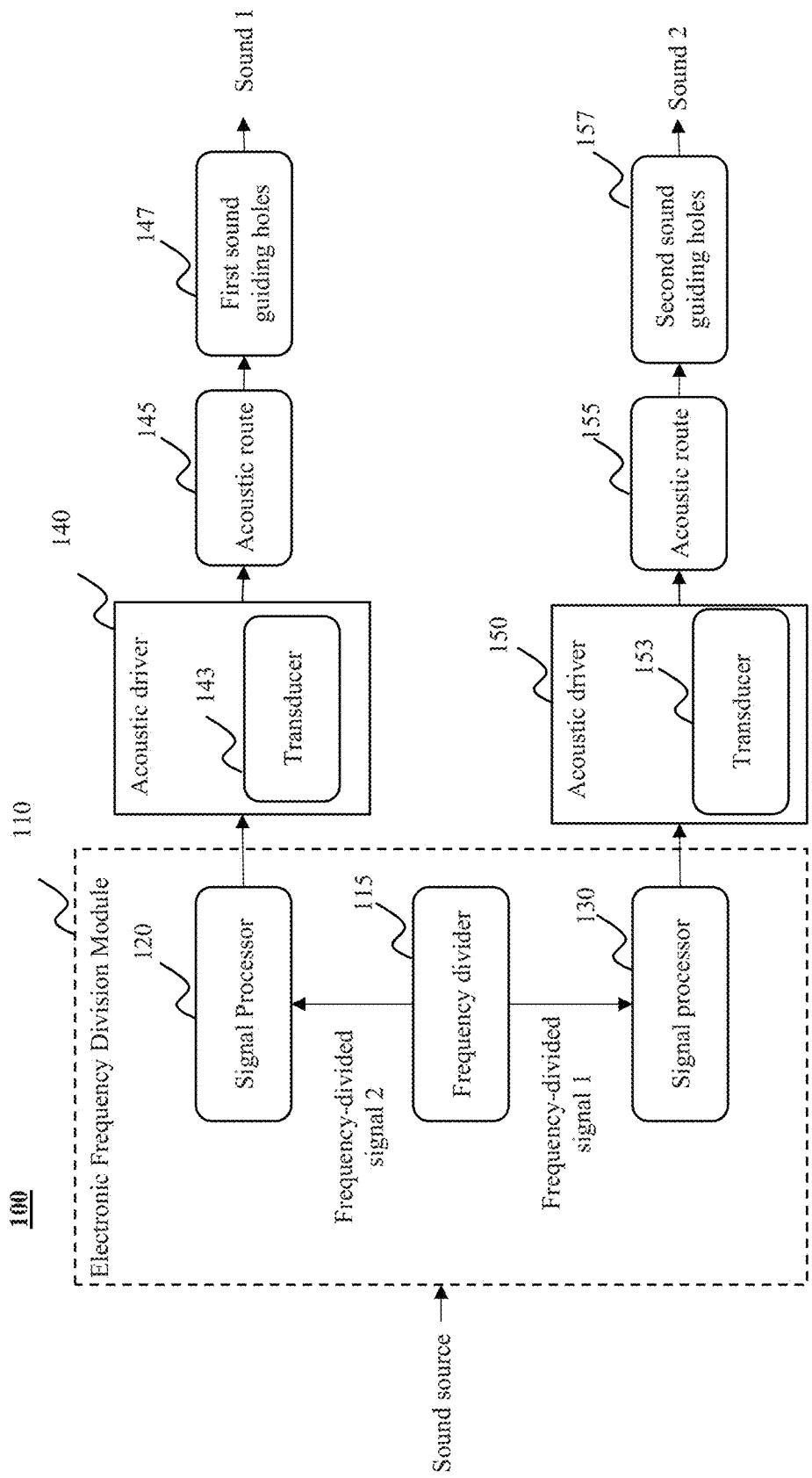
FIG. 4 is a schematic diagram illustrating an exemplary acoustic output device according to some embodiments of the present disclosure.

It should be noted that the changes of the volume of the near-field sound and the volume of the far-field leakage along with the distance between the two point sound sources of the dual-point sound source described in FIG. 4 may be applied to microphones. That is, the microphones with different frequencies and different distances may be set to improve the sound pickup effect of an audio device. For example, a set of low-frequency microphones and a set of high-frequency microphones may be set and a distance between the set of low-frequency microphones may be greater than that between the set of high-frequency microphones, so that a phase difference between noises received by each set of microphones may be the same (or substantially the same). The far-field noise may be eliminated or approximately eliminated when the noise is reduced by a difference operation. More descriptions regarding improving the sound pickup effect of the audio device by setting distances between microphones may be found elsewhere in the present disclosure. See, e.g., FIG. 47 and the relevant descriptions thereof.

FIG. 4 is a schematic diagram illustrating an exemplary acoustic output device according to some embodiments of the present disclosure. As shown in FIG. 4, an acoustic output device 100 may include an electronic frequency division unit 110, an acoustic driver 140, an acoustic driver 150, an acoustic route 145, an acoustic route 155, at least two first sound guiding holes 147, and at least two second sound guiding holes 157. In some embodiments, the acoustic output device 100 may further include a controller (not shown in the figure). The electronic frequency division unit 110, as part of the controller, may be configured to generate electrical signals that are input into different acoustic drivers. The connection between different components in the acoustic output device 100 may be wired or wireless. For example, the electronic frequency division unit 110 may send signals to the acoustic driver 140 and/or the acoustic driver 150 via a wired transmission manner or a wireless transmission manner.

The electronic frequency division unit 110 may divide a frequency of a source signal. The source signal may come from one or more sound source apparatuses (e.g., a memory storing audio data) integrated into the acoustic output device 100. The source signal may also be an audio signal that the acoustic output device 100 received by a wired or wireless means. In some embodiments, the electronic frequency division unit 110 may decompose the input source signal into two or more frequency-divided signals containing different frequencies. For example, the electronic frequency division unit 110 may decompose the source signal into a first frequency-divided signal (or frequency-divided signal 1) with high-frequency sound and a second frequency-divided signal (or frequency-divided signal 2) with low-frequency sound. For convenience, a frequency-divided signal with high-frequency sound may be referred to as a high-frequency signal, and a frequency-divided signal with low-frequency sound may be directly referred to as a low-frequency signal. The low-frequency signal may refer to a voice signal with frequencies in a first frequency range. The high-frequency signal may refer to a voice signal with frequencies in a second frequency range.

For the purposes of illustration, a low-frequency signal described in some embodiments of the present disclosure may refer to a voice signal with a frequency in a first frequency range with relatively low frequencies, and a high-frequency signal may refer to a voice signal with a frequency in a second frequency range with a relatively great frequencies. The first frequency range and the second frequency range may include or not include overlapping frequency ranges, and the second frequency range may include frequencies higher than the frequencies in the first frequency range. Merely by way of example, the first frequency range may include frequencies below a first frequency threshold, and the second frequency range may include frequencies above a second frequency threshold. The first frequency threshold may be lower than the second frequency threshold, equal to the second frequency threshold, or higher than the second frequency threshold. For example, the first frequency threshold may be smaller than the second frequency threshold (e.g., the first frequency threshold may be 600 Hz, and the second frequency threshold may be 700 Hz), which may indicate that there is no overlap between the first frequency range and the second frequency range. As another example, the first frequency threshold may be equal to the second frequency (e.g., both the first frequency threshold and the second frequency threshold may be 650 Hz or other frequency values). As yet another example, the first frequency threshold may be greater than the second frequency threshold, which may indicate that there is an overlap between the first frequency range and the second frequency range. In this case, a difference between the first frequency threshold and the second frequency threshold may not exceed a third frequency threshold. The third frequency threshold may be a value, for example, 20 Hz, 50 Hz, 100 Hz, 150 Hz, 200 Hz, etc., or may be a value related to the first frequency threshold and/or the second frequency threshold (e.g., 5%, 10%, 15%, etc., of the first frequency threshold). The third frequency threshold may be a value determined by a user according to the actual needs, which is not limited herein. It should be known that the first frequency threshold and the second frequency threshold may be determined according to different situations, which are limited herein.

In some embodiments, the electronic frequency division unit 110 may include a frequency divider 115, a signal processor 120, and a signal processor 130. The frequency divider 115 may be used to decompose the source signal into two or more frequency-divided signals containing different frequency components, for example, a frequency-divided signal 1 with high-frequency sound components and a frequency-divided signal 2 with low-frequency sound components. In some embodiments, the frequency divider 115 may be an electronic device that may implement the signal decomposition function, including but not limited to one of a passive filter, an active filter, an analog filter, a digital filter, or any combination thereof. In some embodiments, the frequency divider 115 may divide the sound source signal based on one or more frequency division points. A frequency division point refers to a signal frequency that distinguishes the first frequency range from the second frequency range. For example, when the first frequency range and the second frequency range include an overlapping frequency range, the frequency division point may be a feature point within the overlapping frequency range (e.g., a low-frequency boundary point, a high-frequency boundary point, a center frequency point, etc., of the overlapping frequency range). In some embodiments, the frequency division point may be determined according to a relationship (e.g., the curves shown in FIG. 2, FIG. 3A, or 3B) between a frequency and the sound leakage of the acoustic output device. For example, considering that the leakage sound of the acoustic output device may vary with a change of the frequency, a frequency point corresponding to the volume of the leakage sound that meets a certain condition may be selected as the frequency division point, for example, 1000 Hz shown in FIG. 2. More descriptions regarding the change of the leakage sounds with the frequency may be found elsewhere in the present disclosure. See, e.g., FIG. 2 and the relevant descriptions thereof. In some alternative embodiments, a user may directly determine a specific frequency as the frequency division point. For example, considering that the frequency range of sounds that a human ear can hear is 20 Hz-20 kHz, the user may select a frequency point in this range as the frequency division point. Merely by way of example, the frequency division point may be 600 Hz, 800 Hz, 1000 Hz, 1200 Hz, etc. In some embodiments, the frequency division point may be determined according to performance of the acoustic driver. For example, considering that the low-frequency acoustic driver and the high-frequency acoustic driver may have different frequency response curves, the frequency division point may be determined in a frequency range above ½ of an upper limiting frequency of the low-frequency acoustic driver and below 2 times of a low limiting frequency of the high-frequency acoustic driver. As another example, the frequency division point may be determined in a frequency range above ⅓ of the upper limiting frequency of the low-frequency acoustic driver and below 1.5 times of the low limiting frequency of the high-frequency acoustic driver. In some embodiments, in the overlapping frequency range, a position relationship between point sound sources may affect the volume produced by the acoustic output device in the near-field and the far-field. More descriptions regarding the effect of the position relationship between point sound sources on the volume produced by the acoustic output device in the near-field and the far-field may be found in International application No. PCT/CN2019/130886, filed on Dec. 31, 2019, the entire contents of which are hereby incorporated by reference.

The signal processors 120 and 130 may respectively process the frequency-divided signals to meet requirements of subsequent sound output. In some embodiments, the signal processor 120 or 130 may include one or more signal processing units. For example, the signal processor may include, but not limited to, an amplifier, an amplitude modulator, a phase modulator, a delayer, or a dynamic gain controller, or the like, or any combination thereof. Merely by way of example, the processing of the voice signal by the signal processor 120 and/or the signal processor 130 may include adjusting the amplitude corresponding to some frequencies in the voice signal. Specifically, when the first frequency range has an overlapping frequency range with the second frequency range, the signal processors 120 and 130 may adjust an intensity of the voice signal corresponding to the frequency in the overlapping frequency range (e.g., reduce the amplitude of a signal corresponding to a frequency in the overlapping frequency range), thereby avoiding excessive volume in the overlapping frequency range in the subsequent output sound caused by superposition of multiple voice signals.

After the processing operations are performed by the signal processor 120 or the signal processor 130, the frequency-divided signals may be transmitted to the acoustic drivers 140 and 150, respectively. In some embodiments, the voice signal transmitted to the acoustic driver 140 may be a voice signal including a relatively low frequency range (e.g., the first frequency range), and the acoustic driver 140 may also be referred to as a low-frequency acoustic driver. The voice signal transmitted into the acoustic driver 150 may be a voice signal including a relatively high frequency range (e.g., the second frequency range), and the acoustic driver 150 may also be referred to as a high-frequency acoustic driver. The acoustic driver 140 and the acoustic driver 150 may convert the voice signals into a low-frequency sound and a high-frequency sound, respectively, then propagate the converted sound outward.

In some embodiments, the acoustic driver 140 may be acoustically coupled to at least two first sound guiding holes (e.g., two first sound guiding holes 147) (e.g., connected to the two first sound guiding holes 147 via two acoustic routes 145 respectively). Then the acoustic driver 140 may propagate the sound through the at least two first sound guiding holes. The acoustic driver 150 may be acoustically coupled to at least two second sound guiding holes (e.g., two second sound guiding holes 157) (e.g., connected to the two second sound guiding holes 157 via two acoustic routes 155, respectively). Then the acoustic driver 150 may propagate the sound through the at least two second sound guiding holes. Each of the sound guiding holes (e.g., the at least two first sound guiding holes or the at least two second sound guiding holes) may be a relatively small hole formed on the acoustic output device with a specific opening and allow the sound to pass through. The shape of the sound guiding hole may include but is not limited to a circle shape, an oval shape, a square shape, a trapezoid shape, a rounded quadrilateral shape, a triangle shape, an irregular shape, or the like, or any combination thereof. In addition, a count of the sound guiding holes coupled to the acoustic driver 140 or 150 may be not limited to two, which may be determined based on actual needs, for example, 3, 4, 6, or the like.

In some embodiments, in order to reduce the far-field leakage of the acoustic output device 100, the acoustic driver 140 may be used to generate low-frequency sounds with equal (or approximately equal) amplitude and opposite (or approximately opposite) phases at the at least two first sound guiding holes, respectively. The acoustic driver 150 may be used to generate high-frequency sounds with equal (or approximately equal) amplitude and opposite (or approximately opposite) phases at the at least two second sound guiding holes, respectively. In this way, the far-field leakage of low-frequency sounds (or high-frequency sounds) may be reduced according to the principle of acoustic interference cancellation. In some embodiments, according to FIG. 2, FIG. 3A, and FIG. 3B, further considering that a wavelength of the low-frequency sound is longer than that of the high-frequency sound, and in order to reduce the interference cancellation of the sound in the near-field (e.g., a position of the user's ear), a distance between the two first sound guiding holes and a distance between the two second sound guiding holes may be set to be different values. For example, assuming that there is a first distance between the two first guiding holes and a second distance between the two second guiding holes, the first distance may be longer than the second distance. In some embodiments, the first distance and the second distance may be arbitrary values. Merely by way of example, the first distance may be less than or equal to 40 millimeters, for example, the first distance may be in the range of 20 millimeters-40 millimeters. The second distance may be less than or equal to 12 millimeters, and the first distance may be longer than the second distance. In some embodiments, the first distance may be greater than or equal to 12 millimeters, and the second distance may be less than or equal to 7 mm, for example, in the range of 3 millimeters-7 millimeters. In some embodiments, the first distance may be 30 millimeters, and the second distance may be 5 millimeters. In some embodiments, the first distance may be at least twice of the second distance. In some embodiments, the first distance may be at least 3 times of the second distance. In some embodiments, the first distance may be at least 5 times of the second distance.

As shown in FIG. 4, the acoustic driver 140 may include a transducer 143. The transducer 143 may transmit sound to the first sound guiding holes 147 through the acoustic route 145. The acoustic driver 150 may include a transducer 153. The transducer 153 may transmit sound to the second sound guiding holes 157 through the acoustic route 155. In some embodiments, the transducer (e.g., the transducer 143 or the transducer 153) may include, but not be limited to, a transducer of a gas-conducting acoustic output device, a transducer of a bone-conducting acoustic output device, a hydroacoustic transducer, an ultrasonic transducer, or the like, or any combination thereof. In some embodiments, the transducer may be of a moving coil type, a moving iron type, a piezoelectric type, an electrostatic type, or a magneto strictive type, or the like, or any combination thereof.

In some embodiments, the acoustic drivers (e g., the low-frequency acoustic driver 140, the high-frequency acoustic driver 150) may include transducers with different properties or numbers. For example, each of the low-frequency acoustic driver 140 and the high-frequency acoustic driver 150 may include a transducer (e.g., a low-frequency speaker unit and a high-frequency speaker unit) having different frequency response characteristics. As another example, the low-frequency acoustic driver 140 may include two transducers (e.g., two low-frequency speaker units), and the high-frequency acoustic driver 150 may include two transducers 153 (e.g., two high-frequency speaker units).

In some alternative embodiments, the acoustic output device 100 may generate sound with different frequency ranges by other means, such as transducer frequency division, acoustic route frequency division, or the like. When the acoustic output device 100 uses a transducer or an acoustic route to divide the sound, the electronic frequency division unit 110 (a part inside the dotted box) may be omitted, and the voice signal may be transmitted to the acoustic driver 140 and the acoustic driver 150.

In some alternative embodiments, the acoustic output device 100 may use a transducer to achieve signal frequency division, the acoustic driver 140 and the acoustic driver 150 may convert the input sound source signal into a low-frequency sound and a high-frequency sound, respectively. Specifically, through the transducer 143 (such as a low-frequency speaker), the low-frequency acoustic driver 140 may convert the voice signal into the low-frequency sound with low-frequency components. In some embodiments, at least two first acoustic routes may be formed between the at least one low-frequency acoustic driver and the at least two first guiding holes. The low-frequency sound may be transmitted to the at least two first sound guiding holes 147 along at least two different acoustic routes (i.e., at least two first acoustic routes). Then the low-frequency sound may be propagated outwards through the first sound guiding holes 147. Through the transducer 153 (such as a high-frequency speaker), the high-frequency acoustic driver 150 may convert the voice signal into the high-frequency sound with high-frequency components. In some embodiments, at least two second acoustic routes may be formed between the at least one high-frequency acoustic driver and the at least two second guiding holes. The high-frequency sound may be transmitted to the at least two second sound guiding holes 157 along at least two different acoustic routes (i.e., the at least two second acoustic routes). Then the high-frequency sound may be propagated outwards through the second sound guiding holes 157. In some embodiments, the at least two first acoustic routes and the at least two second acoustic routes may have different frequency selection characteristics. As used herein, the frequency selection characteristic of an acoustic route refers to that a sound signal with a predetermined frequency range may be passed through the acoustic route. The frequency selection characteristic of an acoustic route may include the predetermined frequency range within which a sound can pass through the acoustic route. For example, a sound with low-frequency components within a first frequency range may be passed through the at least two first acoustic routes and a sound with high-frequency components within a second frequency range may be passed through the at least two second acoustic routes. The first frequency range may include frequencies less than frequencies in the second frequency range. In some embodiments, the first frequency range may include a maximum frequency that is less than or equal to the minimum frequency in the second frequency range. In some embodiments, the first frequency range may include the maximum frequency that exceeds the minimum frequency in the second frequency range and less than the maximum frequency in the second frequency range. In some embodiments, the at least two first acoustic routes may have different frequency selection characteristics. In some embodiments, the at least two first acoustic routes may have the same frequency selection characteristic. In some embodiments, the at least two second acoustic routes may have different frequency selection characteristics. In some embodiments, the at least two second acoustic routes may have the same frequency selection characteristic.

In some alternative embodiments, an acoustic route (e.g., the acoustic route 145 and the acoustic route 155) connecting a transducer and sound guiding holes may affect the nature of the transmitted sound. For example, an acoustic route may attenuate or change a phase of the transmitted sound to some extent. In some embodiments, an acoustic route may include a sound tube, a sound cavity, a resonance cavity, a sound hole, a sound slit, or a tuning network, or the like, or any combination thereof. In some embodiments, the acoustic route (e.g., at least one of the at least two first acoustic routes, at least one of the at least two second acoustic routes, etc.) may also include an acoustic resistance material, which may have a specific acoustic impedance. For example, the acoustic impedance may be in the range of 5 MKS Rayleigh to 500 MKS Rayleigh. The acoustic resistance materials may include, but not be limited to, plastic, textile, metal, permeable material, woven material, screen material or mesh material, porous material, particulate material, polymer material, or the like, or any combination thereof. By setting the acoustic routes with different acoustic impedances, the acoustic output of the transducer may be acoustically filtered, such that the sounds output through different acoustic routes may have different frequency component.

In some alternative embodiments, the acoustic output device 100 may utilize acoustic routes to achieve signal frequency division. Specifically, the source signal may be input into a specific acoustic driver and converted into a sound containing high and low-frequency components. The voice signal may be propagated along acoustic routes having different frequency selection characteristics. For example, the voice signal may be propagated along the acoustic route with a low-pass characteristic to the corresponding sound guiding hole to generate low-frequency sound. In this process, the high-frequency sound may be absorbed or attenuated by the acoustic route with a low-pass characteristic. Similarly, the voice signal may be propagated along the acoustic route with a high-pass characteristic to the corresponding sound guiding hole to generate a high-frequency sound. In this process, the low-frequency sound may be absorbed or attenuated by the acoustic route with the high-pass characteristic.

In some embodiments, the acoustic output device 100 may include a controller (not shown in figure). The controller may cause the low-frequency acoustic driver 140 to output a sound in the first frequency range (i.e., low-frequency sound), and cause the high-frequency acoustic driver 150 to output a sound in the second frequency range (i.e., high-frequency sound). In some embodiments, the acoustic output device 100 may also include a supporting structure. The supporting structure may be used to support the acoustic driver (such as the high-frequency acoustic driver 150, the low-frequency acoustic driver 140, etc.), so that the sound guiding holes corresponding to the acoustic driver is positioned away from the user's ear. In some embodiments, the sound guiding holes (e.g., the at least two second guiding holes) acoustically coupled with the high-frequency acoustic driver 150 may be located closer to an expected position of the user's ear (e.g., the ear canal entrance), while the sound guiding holes (e.g., the at least two first guiding holes) acoustically coupled with the low-frequency acoustic driver 140 may be located further away from the expected position. For example, a distance between the sound guiding holes (e.g., the at least two second guiding holes) acoustically coupled with the high-frequency acoustic driver 150 and the expected position of the user's ear may be less than a first distance threshold, and a distance between the sound guiding holes (e.g., the at least first second guiding holes) acoustically coupled with the low-frequency acoustic driver 140 and the expected position of the user's ear may be greater than a second distance threshold. The first distance threshold and/or the second distance threshold may be determined according to an actual need. The first distance threshold may be less than the second distance threshold.

In some embodiments, the supporting structure may be used to package the acoustic driver. The supporting structure of the packaged acoustic driver may be a housing made of various materials such as plastic, metal, tape, etc. The housing may encapsulate the acoustic driver and form a front chamber and a rear chamber corresponding to the acoustic driver. For example, the low-frequency acoustic driver may be encapsulated by a first housing, and the first housing may define a front chamber and a rear chamber of the low-frequency acoustic driver. As another example, the high-frequency acoustic driver may be encapsulated by a second housing, and the second housing may define a front chamber and a rear chamber of the high-frequency acoustic driver. In some embodiments, the second housing may be the same as or different from the first housing. The front chamber may be acoustically coupled to one of the at least two sound guiding holes. The rear chamber may be acoustically coupled to the other of the at least two sound guiding holes. For example, the front chamber of the low-frequency acoustic driver 140 may be acoustically coupled to one of the at least two first sound guiding holes 147. The rear chamber of the low-frequency acoustic driver 140 may be acoustically coupled to the other of the at least two first sound guiding holes 147. The front chamber of the high-frequency acoustic driver 150 may be acoustically coupled to one of the at least two second sound guiding holes 157. The rear chamber of the high-frequency acoustic driver 150 may be acoustically coupled to the other of the at least two second sound guiding holes 157. As used herein, a front chamber of a housing refers to a space (also referred to as a route) between the acoustic driver and one of the at least two sound guiding holes acoustically coupled to the acoustic driver, which is encapsulated by the housing. A rear chamber of the housing refers to a route between the acoustic driver and the other of the at least two sound guiding holes. For example, the front chamber of the low-frequency acoustic driver 140 may be a space between the low-frequency acoustic driver 140 and one of the first sounding guiding holes 147, which is encapsulated by the housing (e.g., the first housing). The rear chamber of the low-frequency acoustic driver 140 may be a space between the low-frequency acoustic driver 140 and the other of the first sounding guiding holes 147, which is encapsulated by the housing (e.g., the first housing). As another example, the front chamber of the high-frequency acoustic driver 150 may be a space between the high-frequency acoustic driver 150 and one of the first sounding guiding holes 157, which is encapsulated by the housing (e.g., the second housing). The rear chamber of the high-frequency acoustic driver 150 may be a space between the high-frequency acoustic driver 150 and the other of the first sounding guiding holes 157, which is encapsulated by the housing (e.g., the second housing). In some embodiments, the sound guiding holes (e.g., the first sound guiding holes 147 and the second sound guiding holes 157) may be disposed on the housing.

The above descriptions of the acoustic output device 100 may be merely some examples. Those skilled in the art may make adjustments and changes to the structure, quantity, etc. of the acoustic driver, which is not limiting in the present disclosure. In some embodiments, the acoustic output device 100 may include any number of the acoustic driver structures. For example, the acoustic output device 100 may include two sets of the high-frequency acoustic drivers 150 and two sets of the low-frequency acoustic drivers 140, or one set of the high-frequency acoustic drives 150 and two sets of the low-frequency acoustic drivers 140, and these high-frequency/low-frequency drivers may be used to generate a sound in a specific frequency range. As another example, the acoustic driver 140 and/or the acoustic driver 150 may include an additional signal processor. The signal processor may have the same or different structural components as the signal processor 120 or the signal processor 130.

It should be noted that the acoustic output device and its modules are shown in FIG. 4 may be implemented in various ways. For example, in some embodiments, the system and the modules may be implemented by hardware, software, or a combination of both. The hardware may be implemented by a dedicated logic. The software may be stored in the storage which may be executed by a suitable instruction execution system, for example, a microprocessor or dedicated design hardware. It will be appreciated by those skilled in the art that the above methods and systems may be implemented by computer-executable instructions and/or embedded in the control codes of a processor. For example, the control codes may be provided by a medium such as a disk, a CD, or a DVD-ROM, a programmable memory device, such as a read-only memory (e.g., firmware), or a data carrier such as an optical or electric signal carrier. The system and the modules in the present disclosure may be implemented not only by a hardware circuit in a programmable hardware device in an ultra-large scale integrated circuit, a gate array chip, a semiconductor such a logic chip or a transistor, a field programmable gate array, or a programmable logic device. The system and the modules in the present disclosure may also be implemented by software to be performed by various processors, and further also by a combination of hardware and software (e g., firmware).

It should be noted that the above description of the acoustic output device 100 and its components is only for the convenience of description, and not intended to limit the scope of the present disclosure. It should be understood that, for those skilled in the art, after understanding the principle of the apparatus, it is possible to combine each unit or form a substructure to connect with other units arbitrarily without departing from this principle. For example, the signal processor 120 or the signal processor 130 may be a part independent of the electronic frequency division unit 110. Those modifications may fall within the scope of the present disclosure.

Figure 5:
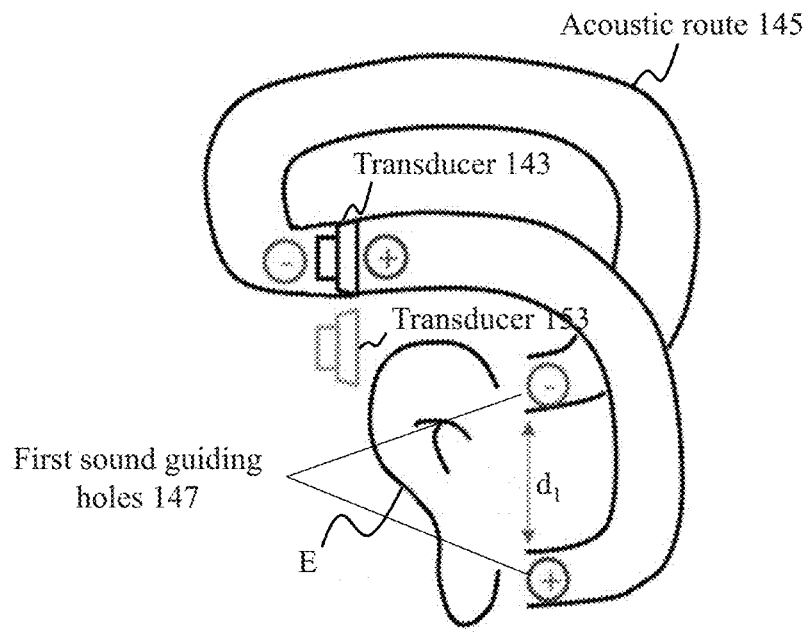
FIG. 5 is a schematic diagram illustrating an exemplary acoustic output device according to some embodiments of the present disclosure.
Figure 5:
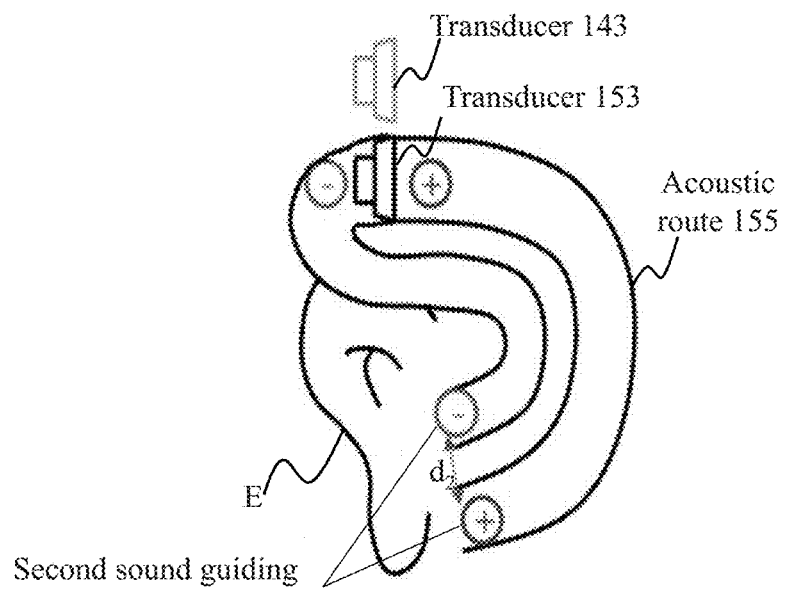

FIG. 5 is a schematic diagram illustrating an exemplary acoustic output device according to some embodiments of the present disclosure. For the purpose of illustration, an outward propagating sound formed by the same transducer coupled with different sound guiding holes may be described as an example. In FIG. 5, each transducer may have a front side and a rear side, and a corresponding front chamber (i.e., a first acoustic route) and a rear chamber (i.e., a second acoustic route) may exist on the front side or the rear side of the transducer, respectively. In some embodiments, the front chamber and the rear chamber may have the same or the substantially same equivalent acoustic impedance, such that the transducers may be loaded symmetrically. The symmetrical load of the transducer may form sound sources satisfy an amplitude and phase relationship at different sound guiding holes (such as the "two point sound sources" having the same amplitude and opposite phases as described above), such that a specific sound field may be formed in high-frequency and/or low-frequency (e.g., a near-field sound may be enhanced and a far-field leakage may be suppressed).

As shown in FIG. 5, the acoustic driver (e.g., the acoustic driver 140 or 150) may include transducers, and acoustic routes and sound guiding holes connected to the transducer. In order to describe the actual application scenarios of the acoustic output device 300 more clearly, a position of the user's ear E may also be shown in FIG. 5 for the explanation. FIG. (a) in FIG. 5 illustrates an application scenario of the acoustic driver 140. The acoustic driver 140 may include a transducer 143, and the transducer 143 may be coupled with two first sound guiding holes 147 through an acoustic route 145. FIG. (b) in FIG. 5 illustrates an application scenario of the acoustic driver 150. The acoustic driver 150 may include a transducer 153, and the transducer 153 may be coupled with two second sound guiding holes 157 through an acoustic route 155.

The transducer 143 or 153 may vibrate under the driving of an electric signal, and the vibration may generate sound with equal amplitudes and opposite phases (180 degrees inversion). The type of transducer may include, but not limited to, an air conduction speaker, a bone conduction speaker, a hydroacoustic transducer, an ultrasonic transducer, or the like, or any combination thereof. The transducer may be of a moving coil type, a moving iron type, a piezoelectric type, an electrostatic type, a magneto strictive type, or the like, or any combination thereof. In some embodiments, the transducer 143 or 153 may include a vibration diaphragm, which may vibrate when driven by an electrical signal, and the front and rear sides of the vibration diaphragm may simultaneously output a normal-phase sound and a reverse-phase sound. In FIG. 5, "+" and "−" may be used to exemplify sounds with different phases, wherein "+" may represent a normal-phase sound, and "−" may represent a reverse-phase sound.

In some embodiments, the transducer may be encapsulated by a housing (e.g., a supporting structure), and the interior of the housing may be provided with sound channels connected to the front and rear sides of the transducer, respectively, thereby forming an acoustic route. For example, the front cavity of the transducer 143 may be coupled to one of the two first sound guiding holes 147 through a first acoustic route (i.e., the first half of the acoustic route 145), and the rear cavity of the transducer 143 may acoustically be coupled to the other sound guiding hole of the two first sound guiding holes 147 through a second acoustic route (i.e., the second half of the acoustic route 145). Normal-phase sound and reverse-phase sound that output from the transducer 143 may be output from the two first sound guiding holes 147, respectively. As another example, the front cavity of the transducer 153 may be coupled to one of the two sound guiding holes 157 through a third acoustic route (i.e., the first half of the acoustic route 155), and the rear cavity of the transducer 153 may be coupled to another sound guiding hole of the two second sound guiding holes 157 through a fourth acoustic route (i.e., the second half of the acoustic route 155). The normal-phase sound and the reverse-phase sound output from the transducer 153 may be output from the two second sound guiding holes 157, respectively.

In some embodiments, acoustic routes may affect the nature of the transmitted sound. For example, an acoustic route may attenuate or change the phase of the transmitted sound to some extent. In some embodiments, the acoustic route may be composed of one of a sound tube, a sound cavity, a resonance cavity, a sound hole, a sound slit, a tuning network, or the like, or any combination of. In some embodiments, the acoustic route may also include an acoustic resistance material, which may have a specific acoustic impedance. For example, the acoustic impedance may be in the range of 5 MKS Rayleigh to 500 MKS Rayleigh. In some embodiments, the acoustic resistance material may include, but not limited to, one of plastics, textiles, metals, permeable materials, woven materials, screen materials, and mesh materials, or the like, or any combination of. In some embodiments, in order to prevent the sound transmitted by the acoustic driver's front chamber and rear chamber from being disturbed (or the same change caused by disturbance), the front chamber and rear chamber corresponding to the acoustic driver may be set to have approximately the same equivalent acoustic impedance. For example, the same acoustic resistance material, the sound guiding holes with the same size or shape, etc., may be used.

A distance between the two first sound guiding holes 147 of the low-frequency acoustic driver may be expressed as $d_1$ (i.e., a first distance). The distance between the two second sound guiding holes 157 of the high-frequency acoustic driver may be expressed as $d_2$ (i.e., a second distance). By setting the distance between the sound guiding holes corresponding to the low-frequency acoustic driver and the high-frequency acoustic driver, a higher sound volume output in the low-frequency band and a stronger ability to reduce the sound leakage in the high-frequency band may be achieved. For example, the distance between the two first sound guiding holes 147 is greater than the distance between the two second sound guiding holes 157 (i.e., $d_1 > d_2$).

In some embodiments, the transducer 143 and the transducer 153 may be housed together in a housing of an acoustic output device, and be placed in isolation in a structure of the housing.

In some embodiments, the acoustic output device 300 may include multiple sets of high-frequency acoustic drivers and low-frequency acoustic drivers. For example, the acoustic output device 300 may include a group of high-frequency acoustic drivers and a group of low-frequency acoustic drivers for simultaneously outputting sound to the left and/or right ears. As another example, the acoustic output device may include two groups of high-frequency acoustic drivers and two groups of low-frequency acoustic drivers, wherein one group of high-frequency acoustic drivers and one group of low-frequency acoustic drivers may be used to output sound to a user's left ear, and the other set of high-frequency acoustic drivers and low-frequency acoustic drivers may be used to output sound to a user's right ear.

In some embodiments, the high-frequency acoustic driver and the low-frequency acoustic driver may be configured to have different powers. In some embodiments, the low-frequency acoustic driver may be configured to have a first power, the high-frequency acoustic driver may be configured to have a second power, and the first power may be greater than the second power. In some embodiments, the first power and the second power may be arbitrary values.

Figure 6A:
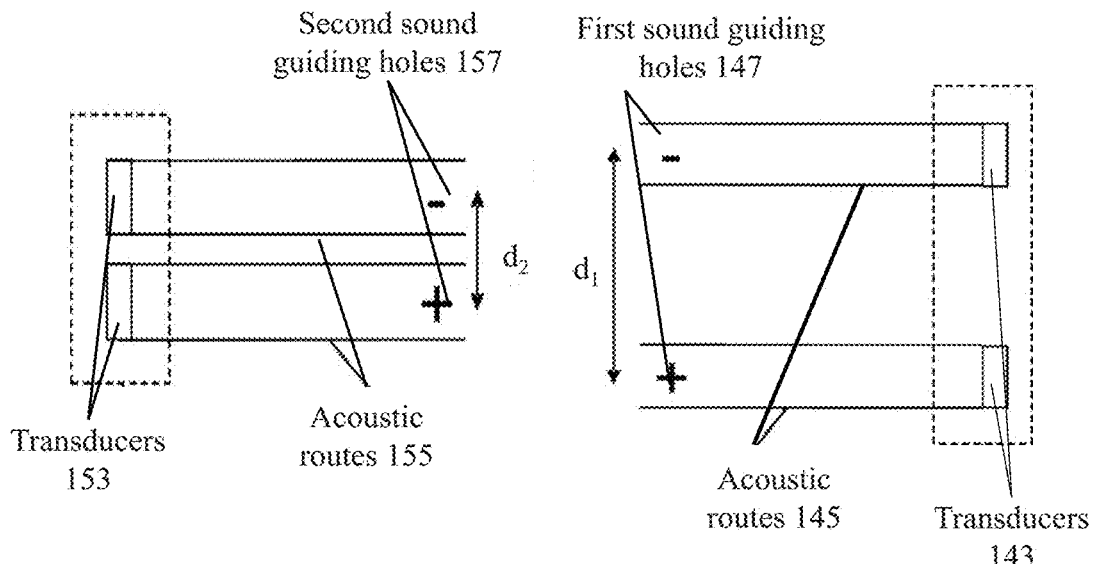
FIG. 6A and FIG. 6B are schematic diagrams illustrating exemplary processes for sound output according to some embodiments of the present disclosure.
Figure 6B:
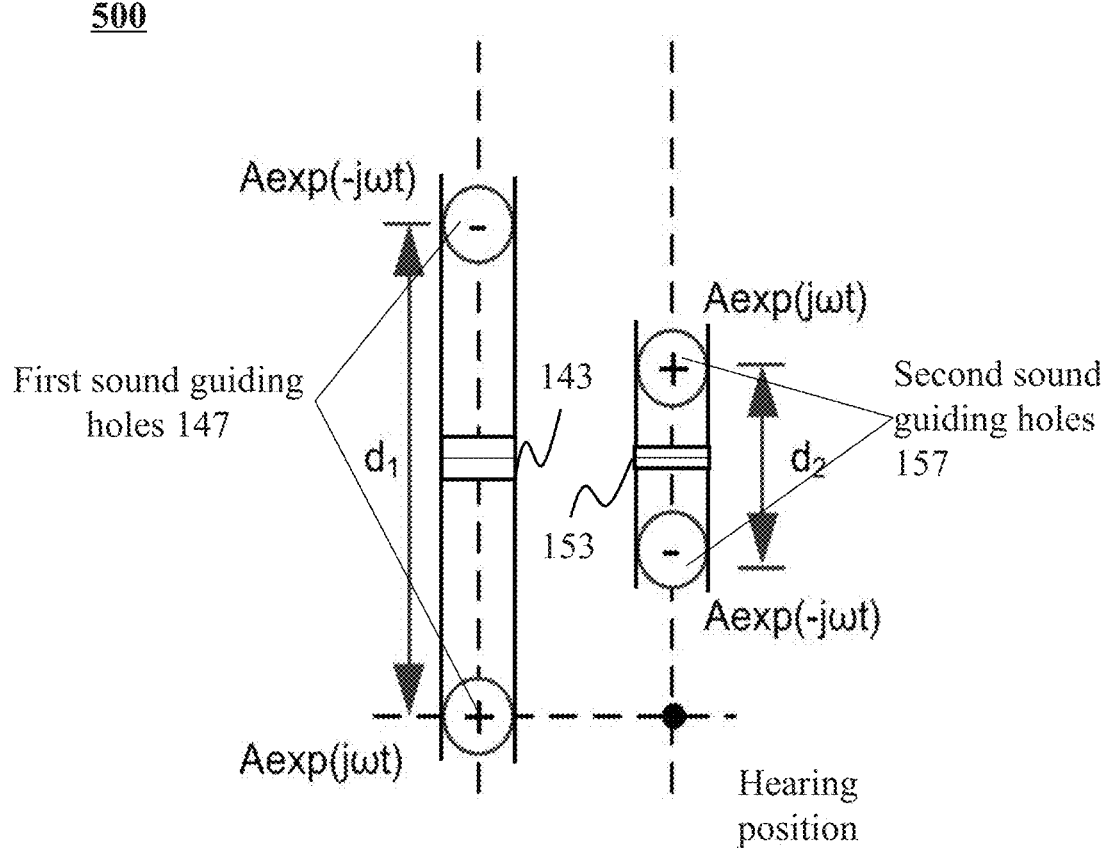

FIG. 6A is a schematic diagram illustrating a process for sound output according to some embodiments of the present disclosure. FIG. 6B is a schematic diagram illustrating another process for sound output according to some embodiments of the present disclosure.

In some embodiments, the acoustic output device may generate sounds in the same frequency range through two or more transducers, and the sounds may propagate outwards through different sound guiding holes. In some embodiments, different transducers may be controlled by the same or different controllers, respectively, and may produce sounds that satisfy certain phase and amplitude conditions (e.g., sounds with the same amplitude but opposite phases, sounds with different amplitudes and opposite phases, etc.). For example, the controller may make the electrical signals input to the two low-frequency transducers of the acoustic driver have the same amplitude and opposite phases. In this way, when a sound is formed, the two low-frequency transducers may output low-frequency sounds with the same amplitude but opposite phases.

Specifically, the two transducers in the acoustic driver (such as the low-frequency acoustic driver 140 and the high-frequency acoustic driver 150) may be arranged side by side in an acoustic output device, one of which may be used to output normal-phase sound, and the other may be used to output reverse-phase sound. As shown in FIG. 6A, the acoustic driver 140 on the right may include two transducers 143, two acoustic routes 145, and two first sound guiding holes 147. The acoustic driver 150 on the left may include two transducers 153, two acoustic routes 155, and two second sound guiding holes 157. Driven by electrical signals with opposite phases, the two transducers 143 may generate a set of low-frequency sounds with opposite phases (180 degrees inversion). One of the two transducers 143 may output normal-phase sound (such as the transducer located below), and the other may output reverse-sound (such as the transducer located above). The two sets of low-frequency sounds with opposite phases may be transmitted to the two first sound guiding holes 147 along the two acoustic routes 145, respectively, and propagate outwards through the two first sound guiding holes 147. Similarly, driven by electrical signals with opposite phases, the two transducers 153 may generate a set of high-frequency sounds with opposite phases (180 degrees inversion). One of the two transducers 153 may output normal-phase high-frequency sound (such as the transducer located below), and the other may output a reverse-phase high-frequency sound (such as the transducer located above). The high-frequency sound with opposite phases may be transmitted to the two second sound guiding holes 157 along the two acoustic routes 155, respectively, and propagate outwards through the two second sound guiding holes 157.

In some embodiments, the two transducers in the acoustic driver (e.g., the low-frequency acoustic driver 140 and the high-frequency acoustic driver 150) may be arranged relatively close to each other along the same straight line, and one of them may be used to output a normal-phase sound and the other may be used to output a reverse-sound. As shown in FIG. 6B, the left side may be the acoustic driver 140, and the right side may be the acoustic driver 150. The two transducers 143 of the acoustic driver 140 may generate a set of low-frequency sounds of equal amplitude and opposite phases under the control of the controller, respectively. One of the transducers may output normal low-frequency sound, and transmit the normal low-frequency sound along a first acoustic route to a first sound guiding hole. The other transducer may output reverse-phase low-frequency sound, and transmit the reverse-phase low-frequency sound along the second acoustic route to another first sound guiding hole. The two transducers 153 of the acoustic driver 150 may generate high-frequency sound of equal amplitude and opposite phases under the control of the controller, respectively. One of the transducers may output normal-phase high-frequency sound, and transmit the normal-phase high-frequency sound along a third acoustic route to a second sound guiding hole. The other transducer may output reverse-phase high-frequency sound, and transmit the reverse-phase high-frequency sound along the fourth acoustic route to another second sound guiding hole.

In some embodiments, the transducer 143 and/or the transducer 153 may be of various suitable types. For example, the transducer 143 and the transducer 153 may be dynamic coil speakers, which may have the characteristics of a high sensitivity in low-frequency, a large dive depth of low-frequency, and a small distortion. As another example, the transducer 143 and the transducer 153 may be moving iron speakers, which may have the characteristics of a small size, a high sensitivity, and a large high-frequency range. As another example, the transducers 143 and 153 may be air-conducted speakers, or bone-conducted speakers. As another example, the transducer 143 and the transducer 153 may be balanced armature speakers. In some embodiments, the transducer 143 and the transducer 153 may be different types of transducers. For example, the transducer 143 may be a moving iron speaker, and the transducer 153 may be a moving coil speaker. As another example, the transducer 1043 may be a moving coil speaker, and the transducer 1053 may be a moving iron speaker.

In FIGS. 6A and 6B, the distance between the two point sound sources of the acoustic driver 140 may be $d_1$, and the distance between the two point sound sources of the acoustic driver 150 may be $d_2$, and $d_1$ may be greater than $d_2$. As shown in FIG. 6B, the hearing position (that is, the position of the ear canal when the user wears an acoustic output device) may be located on a line of a set of two point sound sources. In some alternative embodiments, the hearing position may be any suitable position. For example, the hearing position may be located on a circle centered on the center point of the two point sound sources. As another example, the hearing position may be on the same side of two sets two point sound sources connection, or in the middle of a line connecting the two sets two point sound sources.

It should be understood that the simplified structure of the acoustic output device shown in FIGS. 6A and 6B may be merely by way of example, which may be not a limitation for the present disclosure. In some embodiments, the acoustic output device 400 and/or 500 may include a supporting structure, a controller, a signal processor, or the like, or any combination thereof.

Figure 7A:
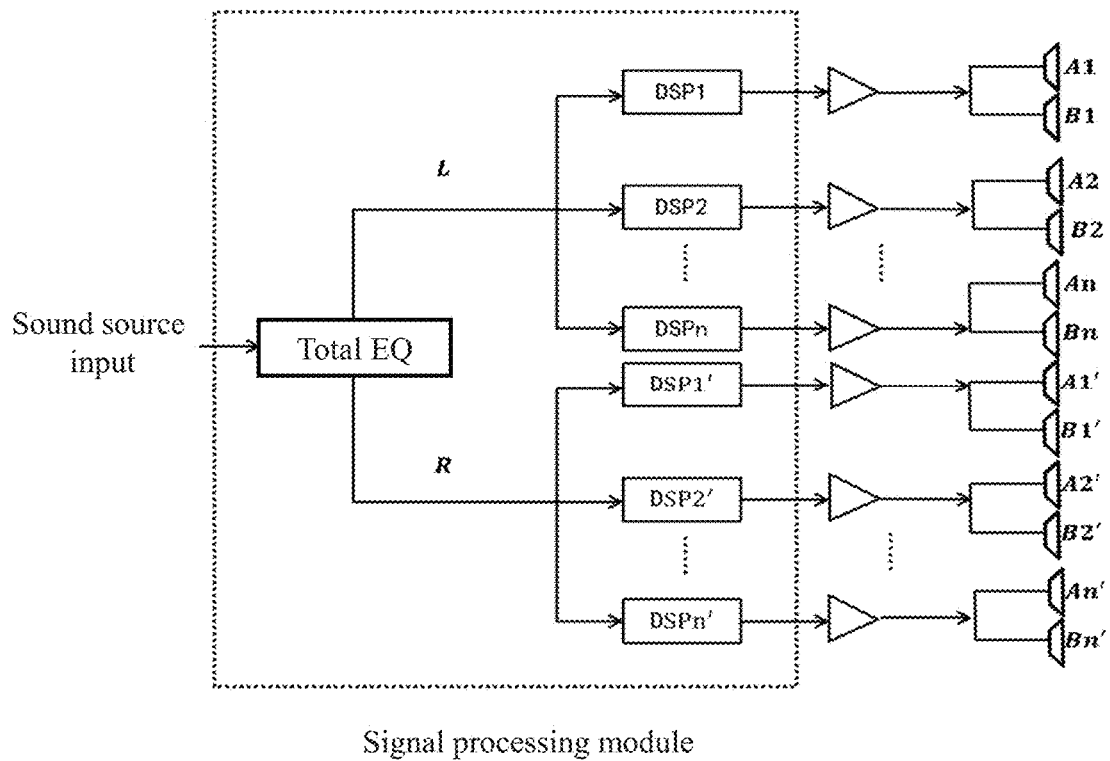
FIG. 7A and FIG. 7B are schematic diagrams illustrating exemplary acoustic output devices according to some embodiments of the present disclosure.
Figure 7B:
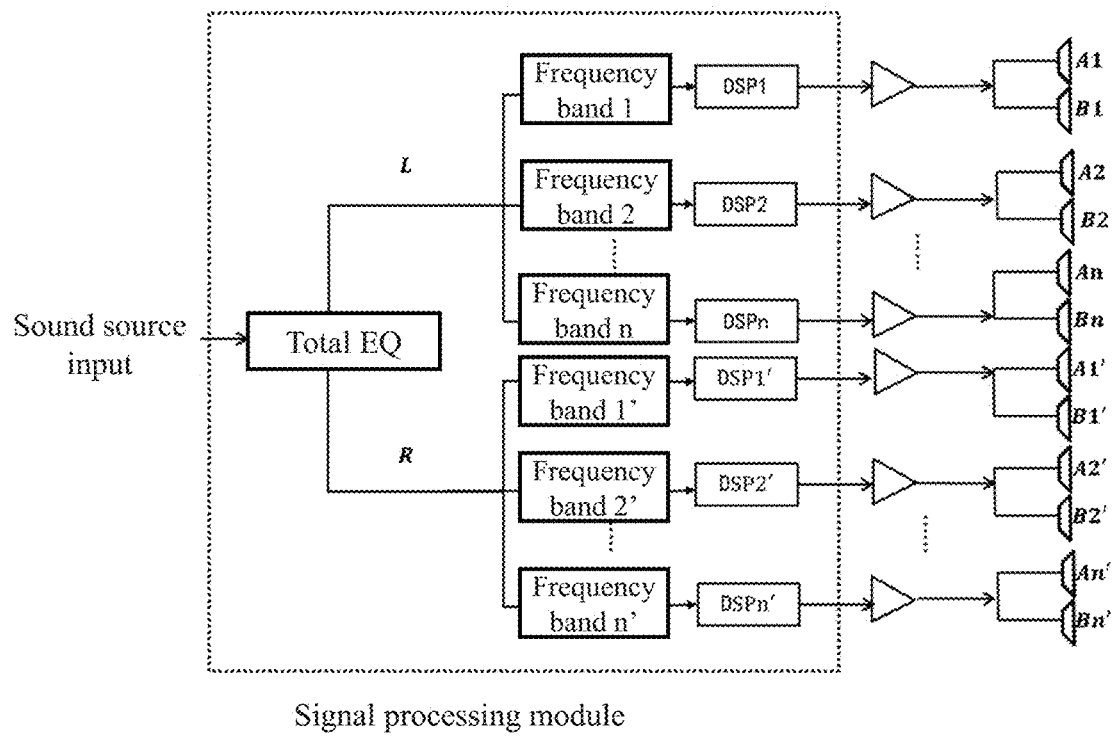

FIG. 7A is a schematic diagram illustrating an acoustic output device according to some embodiments of the present disclosure. FIG. 7B is a schematic diagram illustrating another acoustic output device according to some embodiments of the present disclosure.

In some embodiments, acoustic drivers (e.g., acoustic drivers 140 or 150) may include multiple groups of narrow-band speakers. As shown in FIG. 7A, the acoustic output device may include a plurality of groups of narrow-band speaker units and a signal processing unit. On the left or right side of the user, the acoustic output device may include n groups, respectively, with a total number of 2*n narrow-band speaker units. Each group of narrow-band speaker units may have different frequency response curves, and the frequency response of each group may be complementary and may collectively cover the audible sound frequency band. The narrow-band speaker herein may be an acoustic driver with a narrower frequency response range than the low-frequency acoustic driver and high-frequency acoustic driver. Taking the speaker unit located on the left side of the user shown in FIG. 7A as an example: A1~An and B1~Bn form n groups of two point sound sources, respectively. When the same electrical signal is an input, each two point sound sources may generate sound with different frequency ranges. By setting the distance dn of each two point sound sources, the near-field and far-field sound of each frequency band may be adjusted. For example, in order to enhance the volume of near-field sound and reduce the volume of far-field leakage, the distance between the higher-frequency two point sound sources may be less than the distance of the lower-frequency two point sound sources.

In some embodiments, the signal processing unit may include an Equalizer (EQ) processing unit, and a Digital Signal Processor (DSP) processing unit. The signal processing unit may be used to implement signal equalization and other general digital signal processing algorithms (such as amplitude modulation and equal modulation). The processed signal may output sound by being connected to a corresponding acoustic driver (e.g., a narrow-band speaker) structure. In some embodiments, the narrow-band speaker may be a dynamic moving coil speaker or a moving iron speaker. In some embodiments, the narrow-band speaker may be a balanced armature speaker. Two point sound sources may be constructed using two balanced armature speakers, and the sound output from the two speakers may be in opposite phases.

In some embodiments, the acoustic drivers (such as acoustic drivers 140 or 150) may include multiple groups of full-band speakers. As shown in FIG. 7B, the acoustic output device may include a plurality of sets of full-band speaker units and a signal processing unit. On the left or right side of the user, the acoustic output device may include n groups, respectively, with a total number of 2*n full-band speaker units. Each full-band speaker unit may have the same or similar frequency response curve, and may cover a wide frequency range.

Taking the speaker unit located on the left side of the user as shown in FIG. 7B as an example: A1~An and B1~Bn form n dual-point sound sources, respectively. The difference from FIG. 7A may be that the signal processing unit in FIG. 7B may include at least one set of filters for frequency division of the sound source signal, and the electric signals corresponding to different frequency ranges may be input into each group of full-band speakers. In this way, each group of speaker units (similar to the dual-point sound sources) may produce sounds with different frequency ranges separately.

Figure 8A:
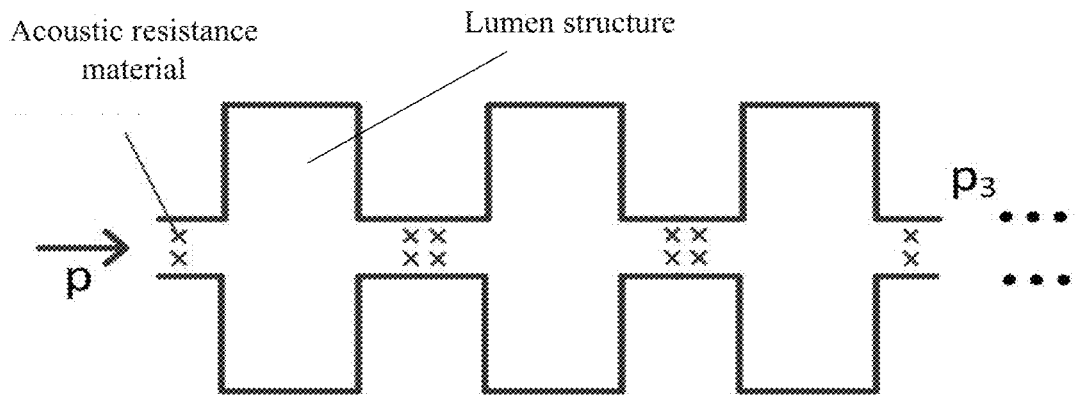
FIGS. 8A-8C are schematic diagrams illustrating exemplary acoustic routes according to some embodiments of the present disclosure.
Figure 8B:
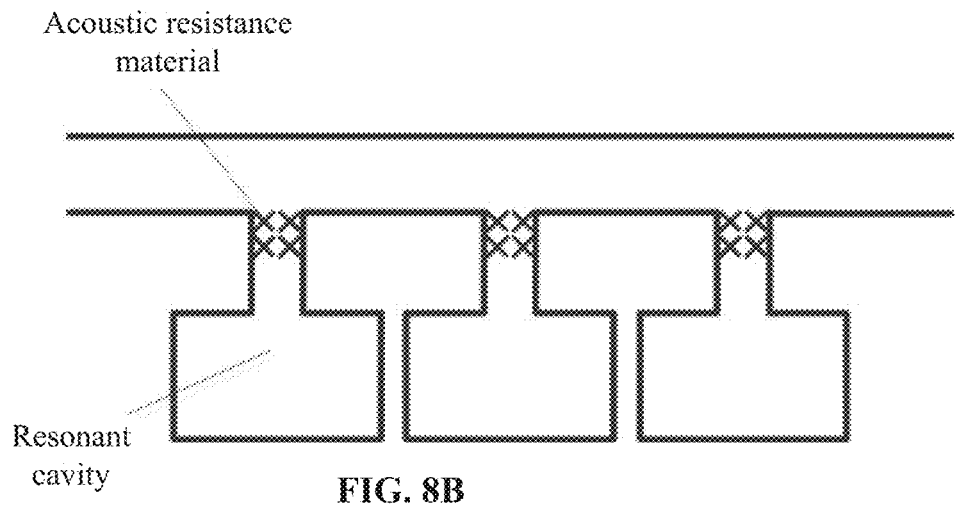
Figure 8C:
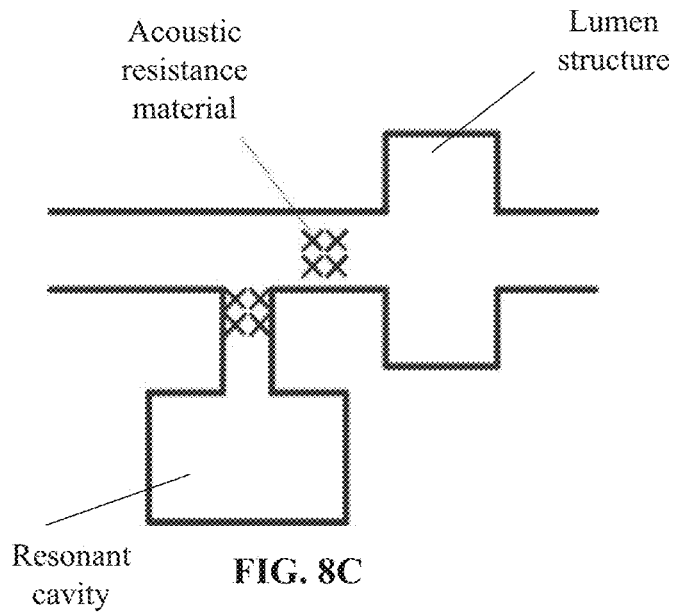

FIG. 8A is a schematic diagram illustrating an acoustic route according to some embodiments of the present disclosure. FIG. 8B is a schematic diagram illustrating another acoustic route according to some embodiments of the present disclosure. FIG. 8C is a schematic diagram illustrating a further acoustic route according to some embodiments of the present disclosure.

As described above, a corresponding acoustic filtering network may be constructed by setting structures such as a sound tube, a sound cavity, and a sound resistance in an acoustic route to achieve frequency division of sound. FIGS. 8A-8C show a schematic structural diagram of frequency division of a voice signal using an acoustic route. It should be noted that FIGS. 8A-8C may be examples of setting the acoustic route when using the acoustic route to divide the voice signal, and may not be a limitation on the present disclosure.

As shown in FIG. 8A, an acoustic route may be composed of one or more groups of lumen structures connected in series, and an acoustic resistance material may be provided in the lumen to adjust the acoustic impedance of the entire structure to achieve a filtering effect. In some embodiments, a band-pass filtering or a low-pass filtering may be performed on the sound by adjusting the size of the structures in the lumen and the acoustic resistance material to achieve frequency division of the sound. As shown in FIG. 8B, a structure with one or more sets of resonant cavities (e.g., Helmholtz cavity) may be constructed on the acoustic route branch, and the filtering effect may be achieved by adjusting the size of each structure and the acoustic resistance material. As shown in FIG. 8C, a combination of a lumen and a resonant cavity (e.g., a Helmholtz cavity) structure may be constructed in an acoustic route, and a filtering effect may be achieved by adjusting the size of each structure and the acoustic resistance material.

Figure 9:
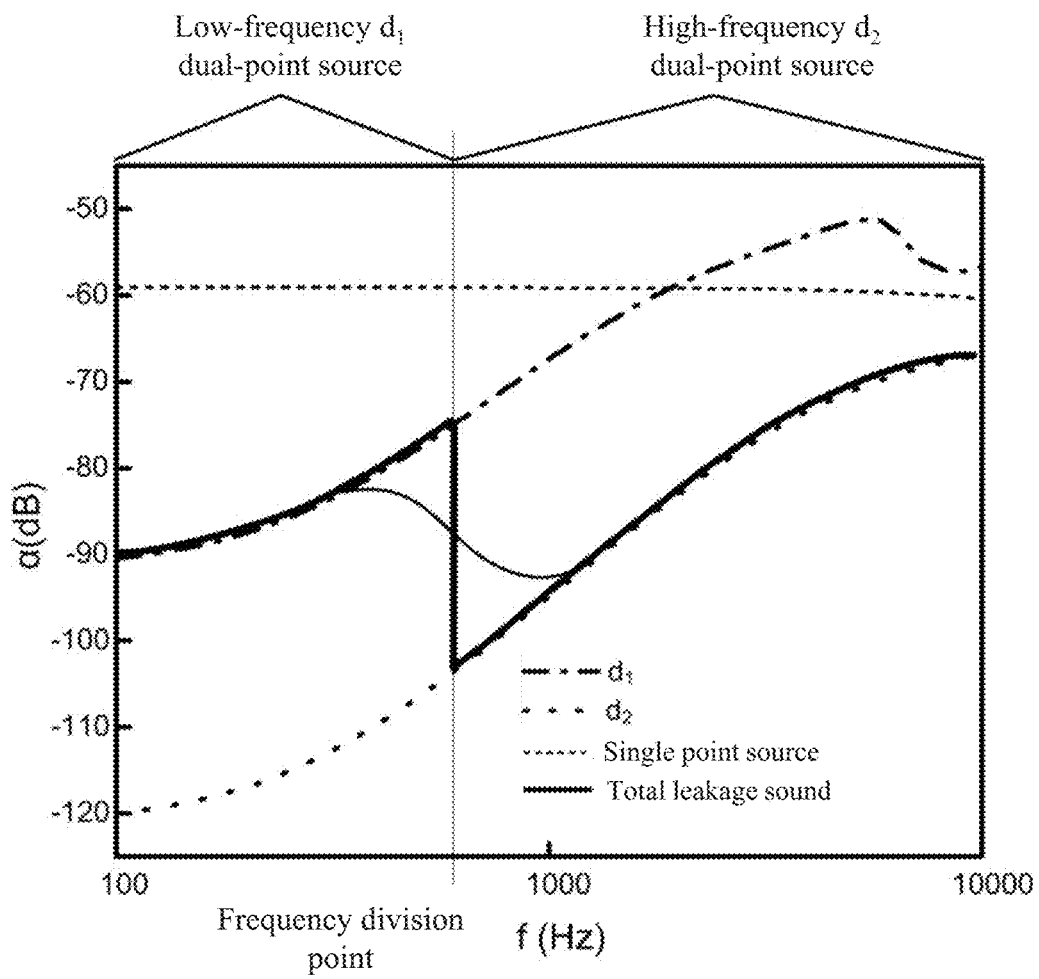
FIG. 9 is an exemplary graph illustrating sound leakage under a combined action of two sets of dual-point sound sources according to some embodiments of the present disclosure.

FIG. 9 is an exemplary graph illustrating sound leakage under a combined action of two sets of dual-point sound sources according to some embodiments of the present disclosure.

FIG. 9 shows a curve of the sound leakage of an acoustic output device (e.g., the acoustic output device 100, the acoustic output device 400, the acoustic output device 500, the acoustic output device 600, etc.) under the combined action of two sets of dual-point sound sources (e.g., a set of high-frequency dual-point sound source and a set of low-frequency dual-point sound source). The frequency division points of the two sets of dual-point sound sources may be around 700 Hz.

A normalization parameter $\alpha$ may be used to evaluate the volume of the leakage sound (for calculation of $\alpha$, see Equation (4)). As shown in FIG. 9, compared with the case of a single point sound source, the dual-point sound source may have a relatively strong ability to reduce sound leakage. In addition, compared with the acoustic output device provided with only one set of dual-point sound source, the two sets of dual-point sound sources may output high-frequency sounds and low-frequency sounds, separately. A distance between the low-frequency dual-point sound source may be greater than that of the high-frequency dual-point sound source. In the low-frequency range, by setting a larger distance ($d_1$) between two point sound sources of a dual-point sound source, increment of the volume of the near-field sound may be greater than increment of the volume of the far-field leakage and may achieve a higher volume of the near-field sound output in the low-frequency band. At the same time, in the low-frequency range, the sound leakage of the dual-point sound source may originally be relatively small. After the distance between the two point sound sources is increased, the slightly increased sound leakage may still maintain a low level. In the high-frequency range, by setting a relatively small distance ($d_2$) between the two point sound sources of the dual-point sound source, the problems of the cutoff frequency of high-frequency sound leakage reduction being too low and the audio band of the sound leakage reduction being too narrow may be overcome. By setting the distance $d_1$ between the two point sound sources of the dual-point sound source in the low-frequency band and the distance $d_2$ between the two point sound sources of the dual-point sound source in the high-frequency band, the acoustic output device provided in the embodiments of the present disclosure may obtain a stronger sound leakage suppressing capability than a single point sound source and a set of dual-point sound source.

In some embodiments, affected by factors such as the filter characteristics of the actual circuit, the frequency characteristics of the transducer, and the frequency characteristics of the acoustic channel, the actual low-frequency and high-frequency sounds of the acoustic output device may differ from those shown in FIG. 9. In addition, low-frequency and high-frequency sounds may have a certain crossover (aliasing) in the frequency band near the frequency division point, causing the total sound leakage reduction of the acoustic output device not to have a mutation at the frequency division point as shown in FIG. 9. Instead, there may be gradients and transitions in the frequency band near the frequency division point, as shown in the thin solid line in FIG. 9. It should be understood that these differences may not affect the overall leakage reduction effect of the acoustic output device provided by the embodiment of the present disclosure.

According to FIG. 4 to FIG. 9 and the related descriptions, the acoustic output device provided by the present disclosure may be used to output sounds in different frequency bands by setting at least one high-frequency dual-point sound source and at least one low-frequency dual-point sound source, so as to achieve a better sound output effect. In addition, by setting different sets of dual-point sound sources with different distances, the acoustic output device may have a relatively stronger capability to reduce the sound leakage in a high frequency band and meet the requirements of an open acoustic output device.

In another aspect of the present disclosure, another acoustic output device may be provided. The acoustic output device may include at least one set of acoustic drivers, and the sound generated by the at least one set of acoustic drivers may propagate outwards through at least two guiding holes acoustically coupled with the at least one set of acoustic drivers. In some embodiments, the acoustic output device may include a baffle, and the at least two guiding holes may be distributed on both sides of the baffle, respectively. In some embodiments, the at least two guiding holes may be distributed on both sides of the user's auricle. In this case, the auricle may serve as a baffle to separate the at least two guiding holes, and the at least two guiding holes may have different acoustic routes to the user's ear canal. More descriptions regarding the dual-point sound source and the baffle may be found in International applications No. PCT/CN2019/130921 and No. PCT/CN2019/130942, both filed on Dec. 31, 2019, the entire contents of each of which are hereby incorporated by reference.

Figure 10:
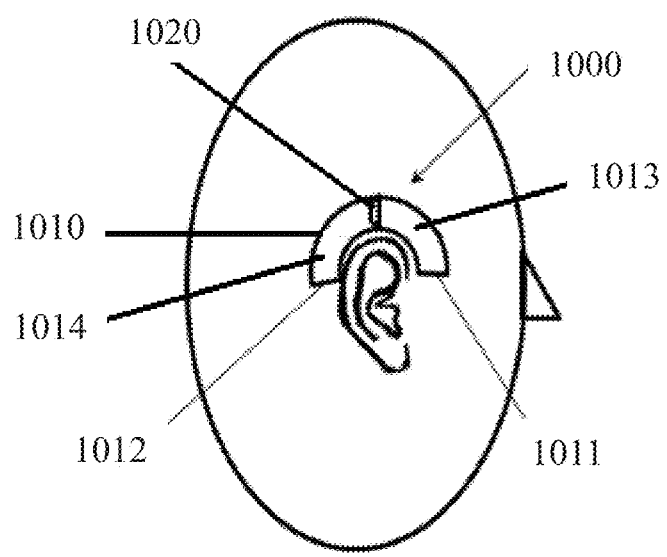
FIG. 10 is a schematic diagram illustrating an exemplary acoustic output device according to some embodiments of the present disclosure.

FIG. 10 is a schematic diagram illustrating an exemplary acoustic output device according to some embodiments of the present disclosure. As shown in FIG. 10, an acoustic output device 1000 may include a supporting structure 1010 and an acoustic driver 1020, which may be disposed in the supporting structure 1010. In some embodiments, the acoustic output device 1000 may be worn on a user's body (e.g., the head, the neck, the upper torso, etc. of the user) e.g., through the supporting structure 1010. The supporting structure 1010 and the acoustic driver 1020 may be close to and not block an ear canal of the user. The ear of the user may be in an open state. The user may hear a sound output from the acoustic output device 1000 and a sound from an external source. For example, the acoustic output device 1000 may be arranged around or partially around the user's ear and may transmit the sound via an air conduction manner or a bone conduction manner.

The supporting structure 1010 may be configured to support one or more acoustic drivers 1020. In some embodiments, the supporting structure 1010 may include an enclosed shell structure with an internal hollow, and the one or more acoustic drivers 1020 may be disposed in the supporting structure 1010. In some embodiments, the acoustic output device 1000 may be combined with a product such as a pair of glasses, a headset, a display device, an AR/VR helmet, etc. In this case, the supporting structure 1010 may be fixed near the user's ear via a hanging manner or a clamping manner. In some embodiments, the supporting structure 1010 may include a hook, a shape of the hook may be matched the shape of the auricle, and the acoustic output device 1000 may be worn on the user's ear through the hook, independently. The acoustic output device 1000, which is worn on the user's ear independently may be communicated with a signal source (e.g., a computer, a mobile phone, or other mobile devices) in a wired or wireless manner (e.g., Bluetooth). For example, the acoustic output device 1000 worn on the left ear and/or that worn on the right ear may be directly communicated with the signal source via a wireless manner. As another example, the acoustic output device 1000 worn at the left and/or right ear may include a first output part and a second output part. The first output part may be communicated with the signal source, and the second output part may be connected to the first output part via a wireless manner. The sound may be output synchronously by the first output part and the second output part controlled by one or more synchronization signals. The wireless manner may include but not limited to Bluetooth, a local area network, a wide area network, a wireless personal area network, a near-field communication, or the like, or any combination thereof.

In some embodiments, the supporting structure 1010 may include a shell structure, and a shape of the supporting structure 1010 may be matched a shape of the ear of the user. The shape of the supporting structure 1010 may include a circular ring, an oval, a (regular or irregular) polygonal, a U-shape, a V-shape, a semi-circle, etc., and the supporting structure 1010 may be directly anchored at the user's ear. In some embodiments, the supporting structure 1010 may also include one or more fixed parts. The fixed part may include an ear hook, a head beam, an elastic band, or the like, or any combination thereof, which may be used to fix the acoustic output device 1000 on the user and prevent the acoustic output device 1000 from falling. Merely by way of example, the elastic band may include a headband that may be worn around the head of the user. As another example, the elastic band may include a neckband which may be worn around the neck/shoulder of the user. In some embodiments, the elastic band may include a continuous band and be elastically stretched to be worn on the head of the user. In this case, the elastic band may also add pressure on the head of the user, thereby causing the acoustic output device 1000 to be fixed to a certain position of the head. In some embodiments, the elastic band may include a discontinuous band. For example, the elastic band may include a rigid portion and a flexible portion. The rigid portion may be made of rigid material (e.g., a plastic, a metal, etc), and the rigid portion may be fixed to the supporting structure 1010 of the acoustic output device 1000 via a physical connection (e.g., a snap connection, a screw connection, etc.). The flexible portion may be made of an elastic material (e.g., a cloth, a composite material, a neoprene, etc.).

In some embodiments, when the user wears the acoustic output device 1000, the supporting structure 1010 may be placed above or below the auricle. The supporting structure 1010 may also include a sound guiding hole 1011 and a sound guiding hole 1012, which may be configured to transmit sounds. In some embodiments, the sound guiding hole 1011 and the sound guiding hole 1012 may be placed on two sides of the user's auricle, respectively. The acoustic driver 1020 may output sound(s) through the sound guiding hole 1011 and/or the sound guiding hole 1012.

The acoustic driver 1020 may be configured to receive an electrical signal, and convert the electrical signal into a voice signal which may be output. In some embodiments, a type of the acoustic driver 1020 may include an acoustic driver with a low-frequency, an acoustic driver with a high-frequency, an acoustic driver with a full-frequency, or the like, or any combination thereof, according to the frequency of the acoustic driver 1020. In some embodiments, the acoustic driver 120 may include a moving coil acoustic driver, a moving iron acoustic driver, a piezoelectric acoustic driver, an electrostatic acoustic driver, a magnetostrictive acoustic driver according to a principle of the acoustic driver 1020.

In some embodiments, the acoustic driver 1020 may include a vibration diaphragm. When the vibration diaphragm vibrates, sounds may be transmitted from a front side and a rear side of the vibration diaphragm, respectively. In some embodiments, a front chamber 1013 may be disposed on the front side of the vibration diaphragm in the supporting structure 1010, which may be configured to transmit the sound(s). The front chamber 1013 may be acoustically coupled with the sound guiding hole 1011. The sound transmitted from the front side of the vibration diaphragm may be transmitted from the sound guiding hole 1011 through the front chamber 1013. A rear chamber 1014 may be disposed on the rear side of the vibration diaphragm in the supporting structure 1010, which may be configured to transmit the sound(s). The rear chamber 1014 may be acoustically coupled with the sound guiding hole 1012. The sound transmitted from the rear side of the vibration diaphragm may be transmitted from the sound guiding hole 1012 through the rear chamber 1014. It should be noted that, when the vibration diaphragm vibrates, the front side and the rear side of the vibration diaphragm may simultaneously generate sounds with opposite phases. After passing through the front chamber 1013 and rear chamber 1014, respectively, the sounds may be transmitted outward from the sound guiding hole 1011 and the sound guiding hole 1012. In some embodiments, the sounds output by the acoustic driver 1020, which may be transmitted through the sound guiding hole 1011 and the sound guiding hole 1012 may meet the specific requirement by setting a structure of at least one of the front chamber 1013 and the rear chamber 1014. For example, the sound guiding hole 1011 and the sound guiding hole 1012 may transmit a set of sounds with a specific phase relationship (e.g., opposite phases) by designing a length of at least one of the front chamber 1013 and the rear chamber 1014, thereby increasing a volume in the near-field of the acoustic output device 1000, avoiding sound leakage of the acoustic output device 1000, and effectively improving the performance of the acoustic output device 1000. As used herein, a length of a front chamber refers to a length of a route between the vibration diaphragm to a guiding hole coupled with the front chamber when a sound (i.e., vibration) propagates from the vibration diaphragm to the guiding hole along the route, and a length of a rear chamber refers to a length of a route between the vibration diaphragm to a guiding hole coupled with the rear chamber when a sound (i.e., vibration) propagates from the vibration diaphragm to the guiding hole along the route.

In some alternative embodiments, the acoustic driver 1020 may include a plurality of vibration diaphragms (e.g., two vibration diaphragms). The plurality of vibration diaphragms may vibrate to generate sounds, respectively. Each of the sounds may be transmitted pass through a chamber that is connected to one of the vibration diaphragms in the supporting structure and may be output from a corresponding sound guiding hole. The plurality of vibration diaphragms may be controlled by the same controller or different controllers. The plurality of vibration diaphragms may generate sounds that satisfy a requirement of certain phase(s) and/or amplitude(s) (e.g., sounds with the same amplitude and opposite phases, sounds with different amplitudes and opposite phases, etc.).

As mentioned above (e.g., FIGS. 3A, 3B and the related descriptions thereof), when a sound frequency is constant, as the distance between two point sound sources of the dual-point sound source increases, the volume of the hearing sound and the volume of the leakage sound corresponding to the dual-point sound source may increase. For a clearer description, the relationship between the volume of the hearing sound, the volume of the leakage sound, and the distance d of the two point sound sources may be further explained according to FIG. 11 to FIG. 13.

Figure 11:
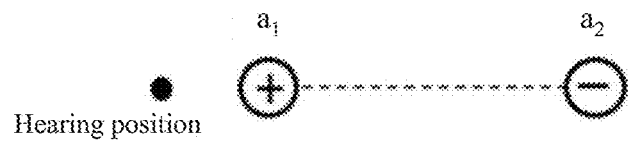
FIG. 11 is a schematic diagram illustrating two point sound sources and a hearing position according to some embodiments of the present disclosure.

FIG. 11 is a schematic diagram illustrating two point sound sources and a hearing position according to some embodiments of the present disclosure. As shown in FIG. 11, a point sound source $a_1$ and a point sound source $a_2$ may be disposed on the same side of the hearing position, and the point sound source $a_1$ may be closer to the hearing position. The point sound source $a_1$ and the point sound source $a_2$ may output sounds with the same amplitude and opposite phases.

Figure 12:
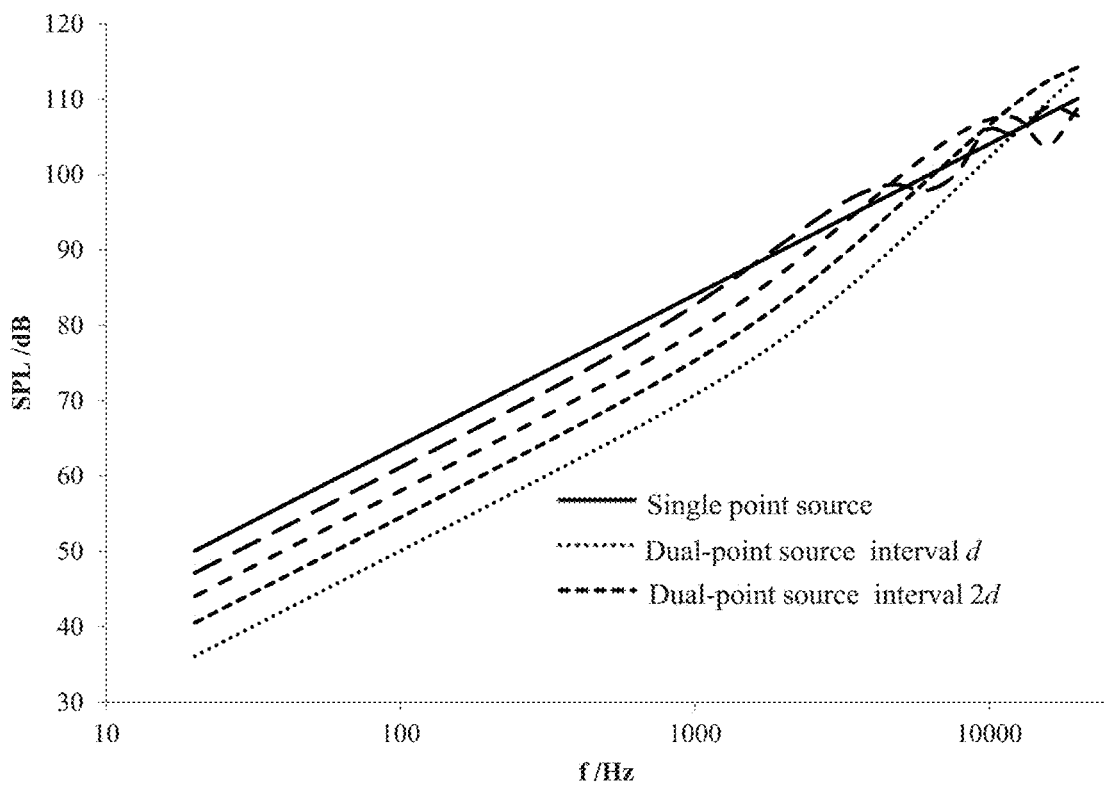
FIG. 12 is a graph illustrating a change of a volume of a hearing sound of a dual-point sound source with different distances along with a frequency according to some embodiments of the present disclosure.

FIG. 12 is a graph illustrating a change of a volume of a hearing sound of a dual-point sound source with different distances along with a frequency according to some embodiments of the present disclosure. The abscissa represents the frequency (f) of the sound output by the dual-point sound source, and the unit may be hertz (Hz). The ordinate represents the volume of the sound, and the unit may be decibel (dB). As shown in FIG. 12, as the distance between the point sound source $a_1$ and the point sound source ax gradually increases (e.g., from d to 10d), the sound volume at the hearing position may be gradually increased. As the distance between the point sound source $a_1$ and the point sound source $a_2$ increases, a difference between sound pressure amplitudes (i.e., sound pressure difference) of the two sounds reaching the hearing position may be increased, and a difference of acoustic routes may be increased, thereby reducing the sound cancellation and increasing the sound volume at the hearing position. Due to the existence of the sound cancellation, the sound volume at the hearing position may be less than that generated by a single-point sound source with the same intensity as the two-point sound sources in a middle-low-frequency (e.g., less than 1000 Hz). For a high-frequency (e.g., close to 10000 Hz), a wavelength of the sound may be decreased, a condition for enhancing the sound may be formed, and the sound volume at the hearing position generated by the two-point sound sources may be greater than a sound volume at the hearing position generated by the single-point sound source. As used herein, the sound pressure amplitude (i.e., a sound pressure) refers to a pressure generated by the sound through the vibration of the air.

Figure 13:
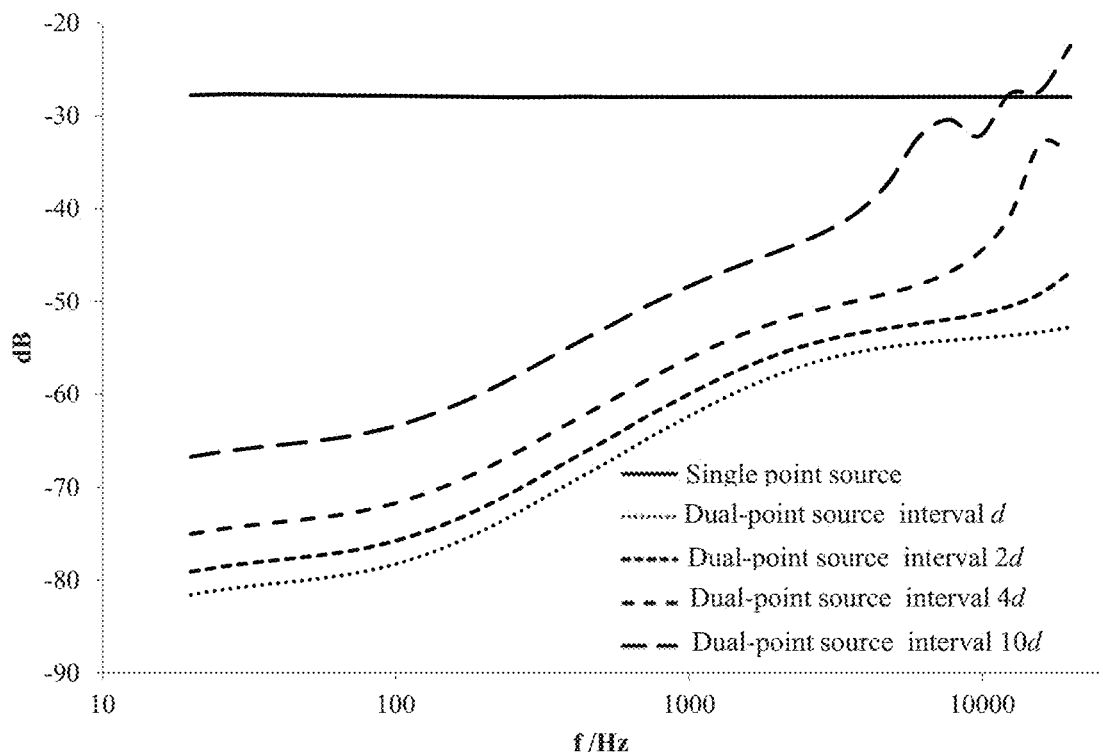
FIG. 13 is a graph illustrating a change of a normalized parameter of a dual-point sound source in a far-field along with a frequency according to some embodiments of the present disclosure.

In some embodiments, the sound volume at the hearing position may be increased by increasing the distance between the point sound sources (e.g., the point sound source $a_1$ and the point sound source $a_2$) of the dual-point sound source. As the distance increases, the sound cancellation of the dual-point sound source may be weakened, thereby increasing sound leakage in the far-field. For illustration purposes, FIG. 13 is a graph illustrating a change of a normalized parameter of a dual-point sound source in a far-field along with a frequency according to some embodiments of the present disclosure. The abscissa may represent the frequency (f) of the sound, the unit may be Hertz (Hz), the ordinate may use a normalized parameter α for evaluating the volume of the leakage sound, and the unit may be decibel (dB). As shown in FIG. 13, taking the far-field normalized parameter α of a single point sound source as a reference, as the distance between two point sound sources of the dual-point sound source increases from d to 10d, the far-field normalized parameter α may gradually increase, indicating the sound leakage may gradually increase. More descriptions regarding the normalized parameter α may be found in Equation (4) and related descriptions.

Figure 14:
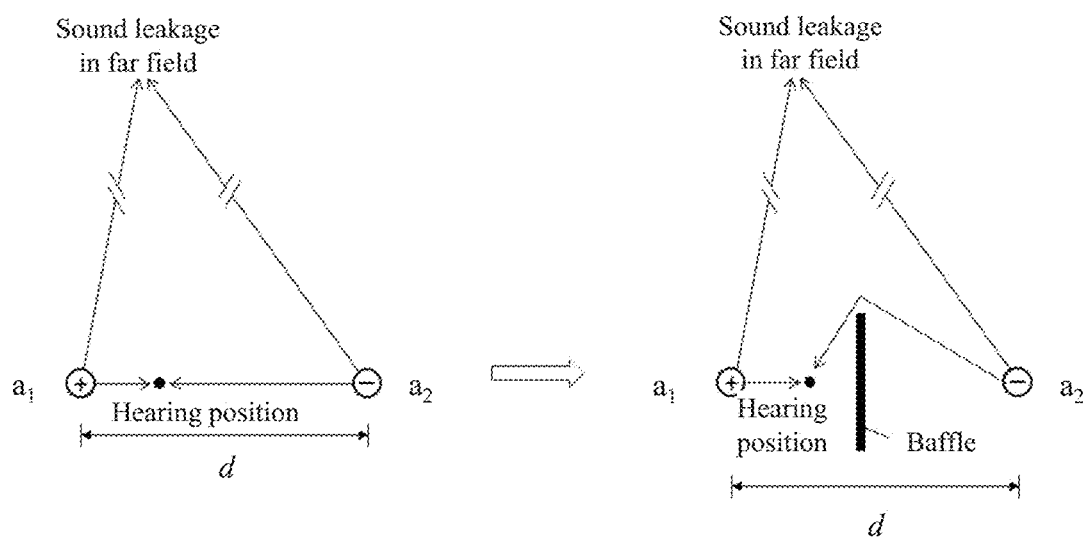
FIG. 14 is a schematic diagram illustrating an exemplary baffle disposed between two point sound sources of a dual-point sound source according to some embodiments of the present disclosure.

In some embodiments, adding a baffle to the acoustic output device may be beneficial to improve the output effect of the acoustic output device, for example, increase the sound intensity of the hearing position in the near-field and reduce the sound leakage in the far-field. For illustration purposes, FIG. 14 is a schematic diagram illustrating an exemplary baffle disposed between two point sound sources of a dual-point sound source according to some embodiments of the present disclosure. As shown in FIG. 14, when the baffle is disposed between a point sound source $a_1$ and a point sound source $a_2$, a sound field of the point sound source $a_2$ may bypass the baffle to interfere with a sound wave of the point sound source $a_1$ at a hearing position in the near-field, which may increase a length of an acoustic route between the point sound source $a_2$ and the hearing position. Assuming that the point sound source $a_1$ and the point sound source $a_2$ have the same amplitude, an amplitude difference between the sound waves of the point sound source $a_1$ and that of the point sound source $a_2$ at the hearing position may be greater than that in a case without a baffle, thereby reducing a sound cancellation of the two sounds at the hearing position, increasing a sound volume at the hearing position. In the far-field, the sound waves generated by the point sound source $a_1$ and the point sound source $a_2$ may not bypass the baffle in a relatively large space, the sound waves may be interfered (as a case without the baffle). Compared to the case without the baffle, the sound leakage in the far-field may be not increased significantly. Therefore, the baffle being disposed between the point sound source $a_1$ and the point sound source $a_2$ may significantly increase the sound volume at the hearing position in the near-field and not significantly increase that of the leakage sound in the far-field.

Figure 15:
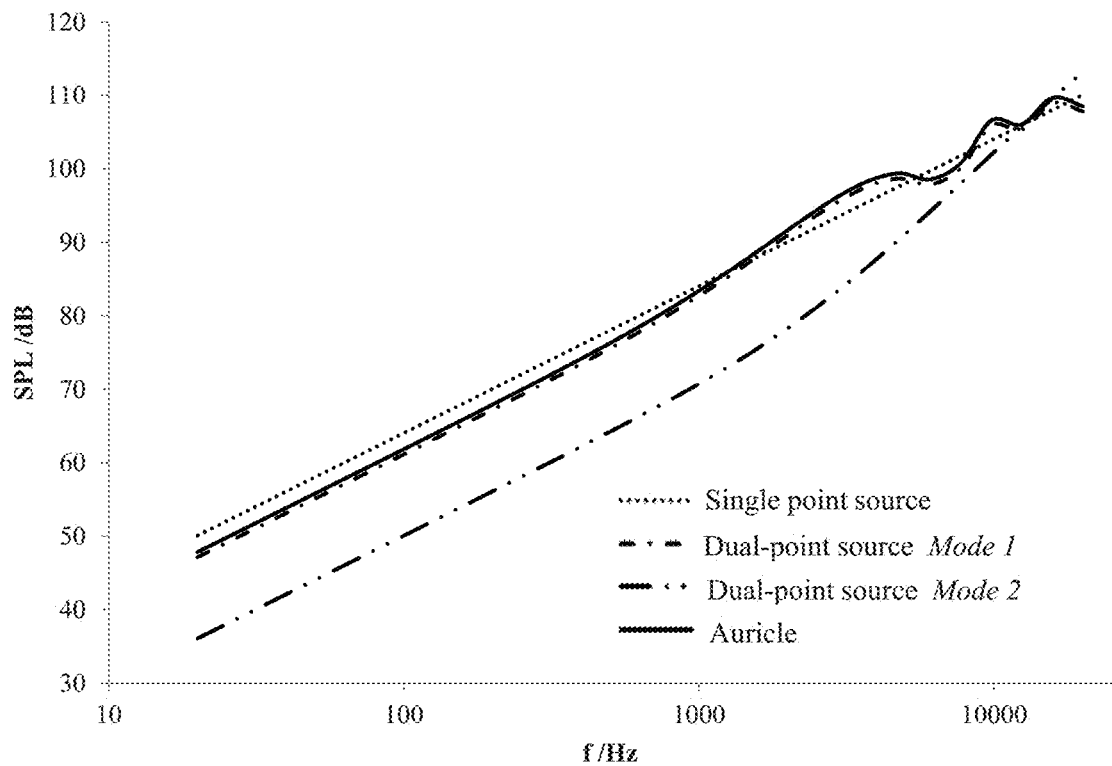
FIG. 15 is a graph illustrating a change of a volume of a hearing sound along with a frequency when an auricle is arranged between two point sound sources of a dual-point sound source according to some embodiments of the present disclosure.
Figure 16:
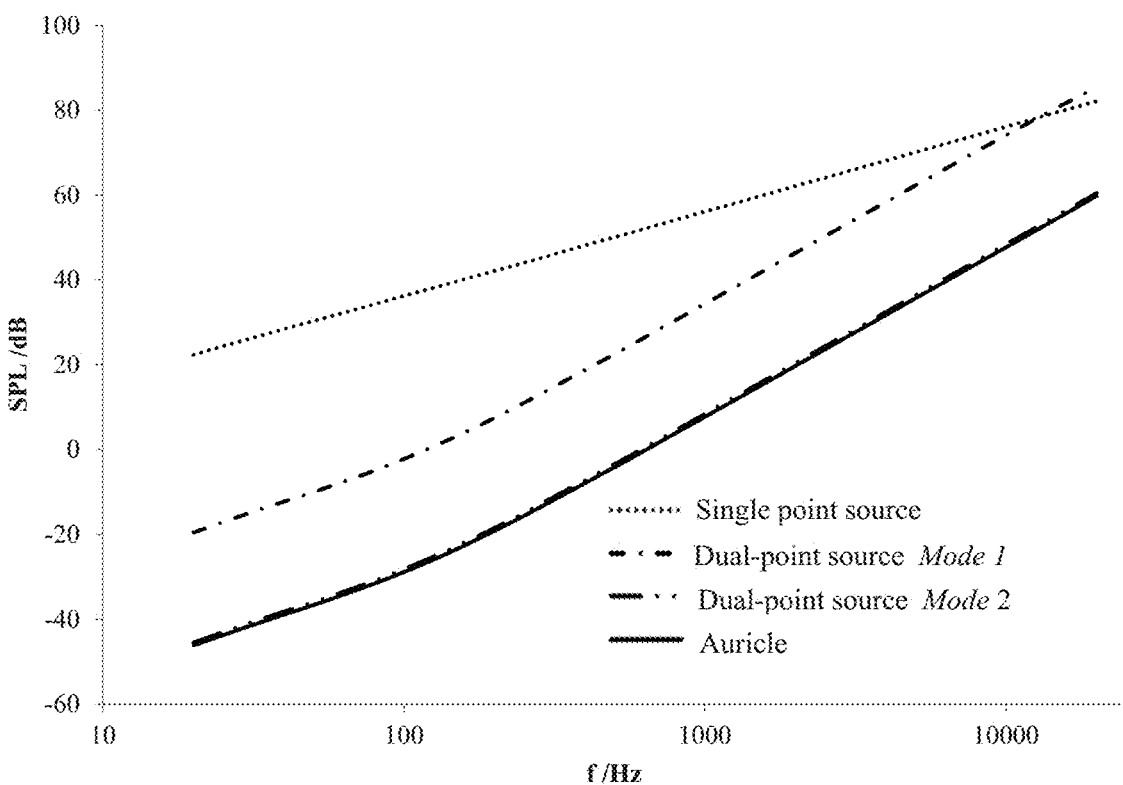
FIG. 16 is a graph illustrating a change of a volume of a leakage sound along with a frequency when an auricle is arranged between two point sound sources of a dual-point sound source according to some embodiments of the present disclosure.
Figure 17:
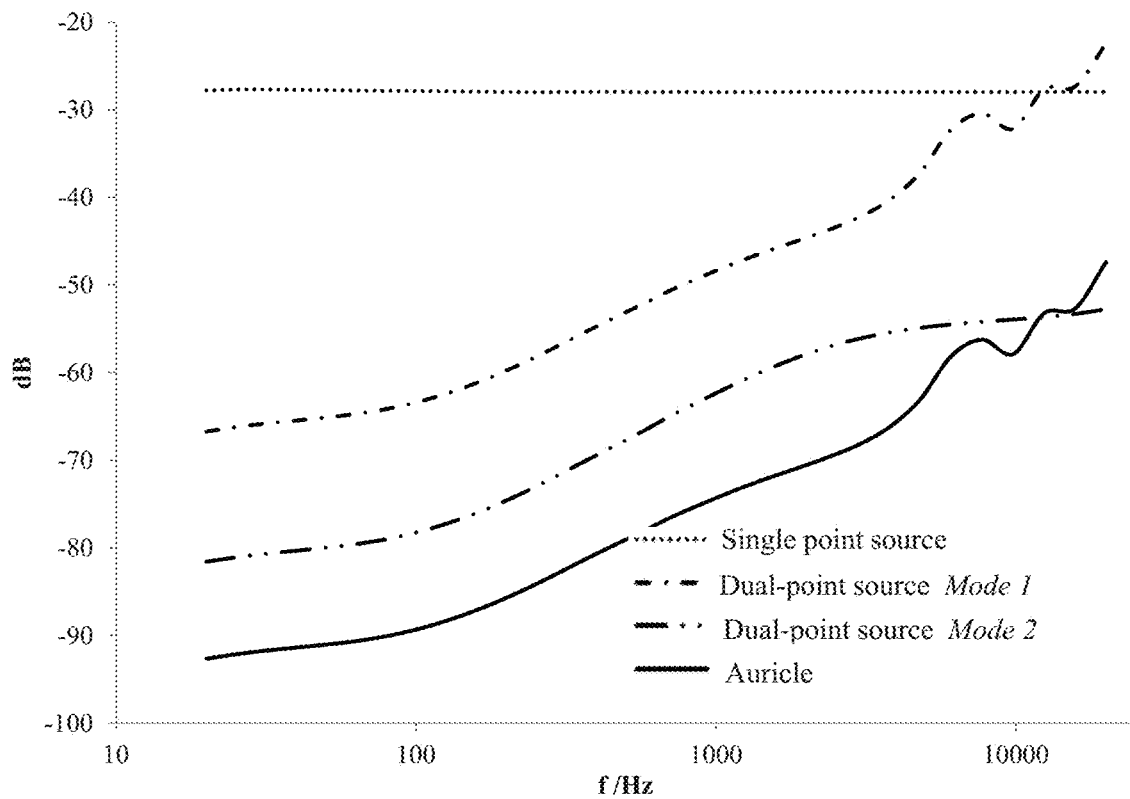
FIG. 17 is a graph illustrating a change of a normalized parameter along with a frequency when two point sound sources of a dual-point sound source of an acoustic output device are disposed on two sides of an auricle according to some embodiments of the present disclosure.

In the present disclosure, when the two point sound sources of the dual-point sound source are arranged on both sides of the auricle, the auricle may serve as a baffle, thus the auricle may also be referred to as a baffle for convenience. Merely by way of example, due to the existence of the auricle, a sound in the near-field may be generated by the dual-point sound source with a distance D1 (also referred to as Mode 1). A sound in the far-field may be generated by the dual-point sound source with a distance D2 (also referred to as Mode 2), and D1>D2. FIG. 15 is a graph illustrating a change of a volume of a hearing sound along with a frequency when a user's auricle is arranged between two point sound sources of a dual-point sound source according to some embodiments of the present disclosure. As shown in FIG. 15, for a low-frequency (e.g., a frequency less than 1000 Hz), a volume of the sound in the near-field (i.e., a sound heard by an ear of a user) may be the same as or similar to that in Mode 1 when the dual-point sound source are located on two sides of the auricle, which may be greater than a volume of a sound in the near-field in Mode 2 and may be close to a volume of a sound in a near-field of a single-point sound source. As the frequency increases (e.g., 2000 Hz~7000 Hz), the volume of the sound in the near-field in Mode 1 and generated by the two point sound sources of the dual-point sound source located on two sides of the auricle may be greater than that of the single-point sound source. It should be understood that, when the auricle is located between the two point sound sources of the dual-point sound source, the volume of the sound in the near-field transmitted from a sound source to the ear may be effectively increased. FIG. 16 is a graph illustrating a change of a volume of a leakage sound along with a frequency when an auricle is arranged between two point sound sources of a dual-point sound source according to some embodiments of the present disclosure. As shown in FIG. 16, as the frequency increases, the sound leakage in the far-field may be increased. When the dual-point sound source is located on two sides of the auricle, the sound leakage in the far-field leakage generated by the dual-point sound source may be the same as (or substantially same as) the sound leakage in the far-field in Mode 2, which may be less than the sound leakage in far-field in Mode 1 and/or the sound leakage in the far-field leakage generated by a single-point sound source. Therefore, when the auricle is located between the two point sound sources of the dual-point sound source, the sound transmitted from the sound source to the far-field may be effectively reduced, that is, the sound leakage from the sound source to the surroundings may be effectively reduced. FIG. 17 is a graph illustrating a change of a normalized parameter along with a frequency when two point sound sources of a dual-point sound source of an acoustic output device are disposed on two sides of an auricle according to some embodiments of the present disclosure. As shown in FIG. 17, when the frequency is less than 10000 Hz, the normalized parameter when two point sound sources of the dual-point sound source are distributed on both sides of the auricle may be less than the normalized parameter in the Mode 1 (in which there is no the baffle disposed between the two point sound sources of the dual-point sound source, and a distance between the two point sound sources is $D_1$), a Mode 2 (in which there is no baffle disposed between the two point sound sources of the dual-point sound source, and the distance between the two point sound sources is $D_2$), or a single point sound source, which may indicate that when the two point sound sources of the dual-point sound source are disposed on the two sides of the auricle, the acoustic output device may have a better capability to reduce the sound leakage.

In order to further explain an effect on the acoustic output of the acoustic output device 100 with or without a baffle between two point sound sources of a dual-point sound source or two sound guiding holes, a volume of a sound at the hearing position in a near-field and/or a volume of sound leakage in a far-field leakage under different conditions may be described below.

Figure 18:
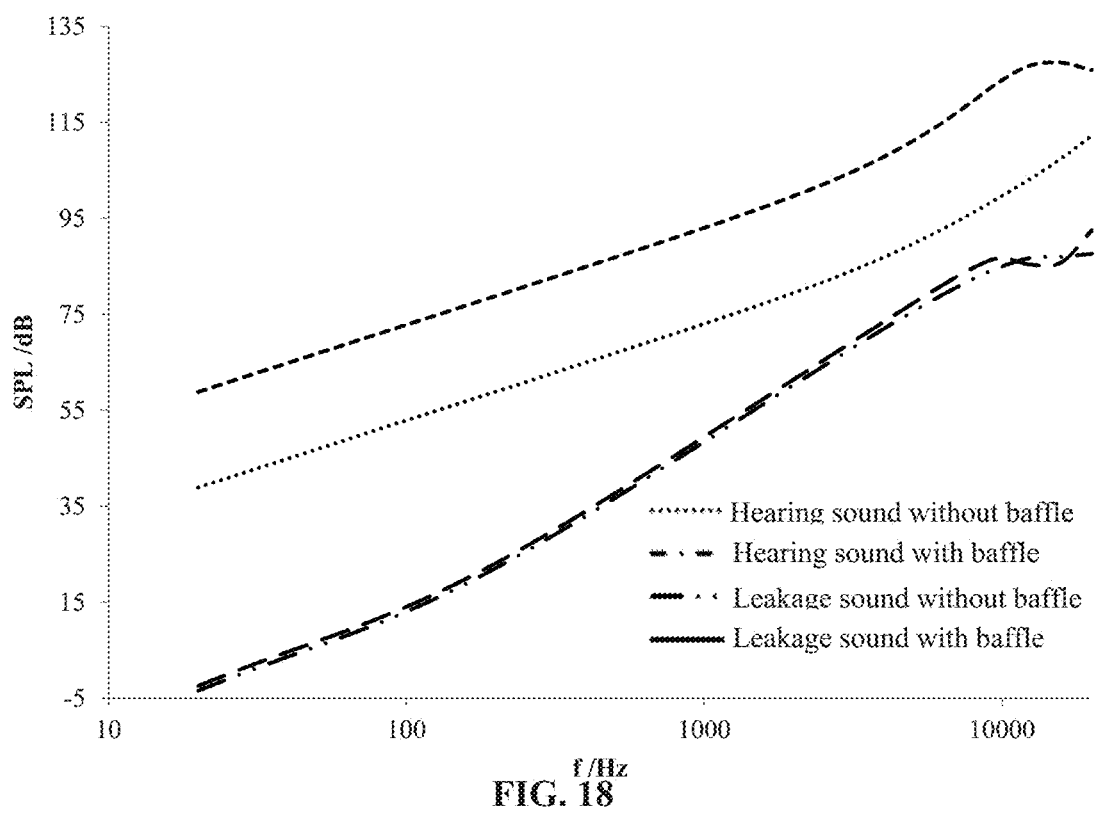
FIG. 18 is a graph illustrating a change of a volume of hearing sound and a volume of leakage sound along with a frequency with and without a baffle between two point sound sources of a dual-point sound source according to some embodiments of the present disclosure.

FIG. 18 is a graph illustrating a change of a volume of hearing sound and a volume of leakage sound along with a frequency with and without a baffle between two point sound sources of a dual-point sound source according to some embodiments of the present disclosure. As shown in FIG. 18, when the baffle is disposed between the two point sound sources of the dual-point sound source (i.e., two sound guiding holes) of the acoustic output device, a distance between the two point sound sources of the dual-point sound source may be increased in the near-field, and the volume of the sound at the hearing position in the near-field may be equivalent to being generated by dual-point sound source with a relatively large distance, thereby increasing the volume of the sound in the near-field compared to a case without the baffle. In the far-field, the interference of sound waves generated by the dual-point sound source may be not significantly affected by the baffle, the sound leakage may be regarded as being generated by a set of dual-point sound source with a relatively small distance, and the sound leakage may be not changed significantly with or without the baffle. The baffle disposed between the two sound guiding holes (the dual-point sound source) may improve the performance of the acoustic output device by reducing the sound leakage, and increase the volume of the sound in the near-field, thereby reducing requirements for a component that plays an acoustic role in the acoustic output device, reducing the electrical loss of the acoustic output device, and prolonging a working time of the acoustic output device.

Figure 19:
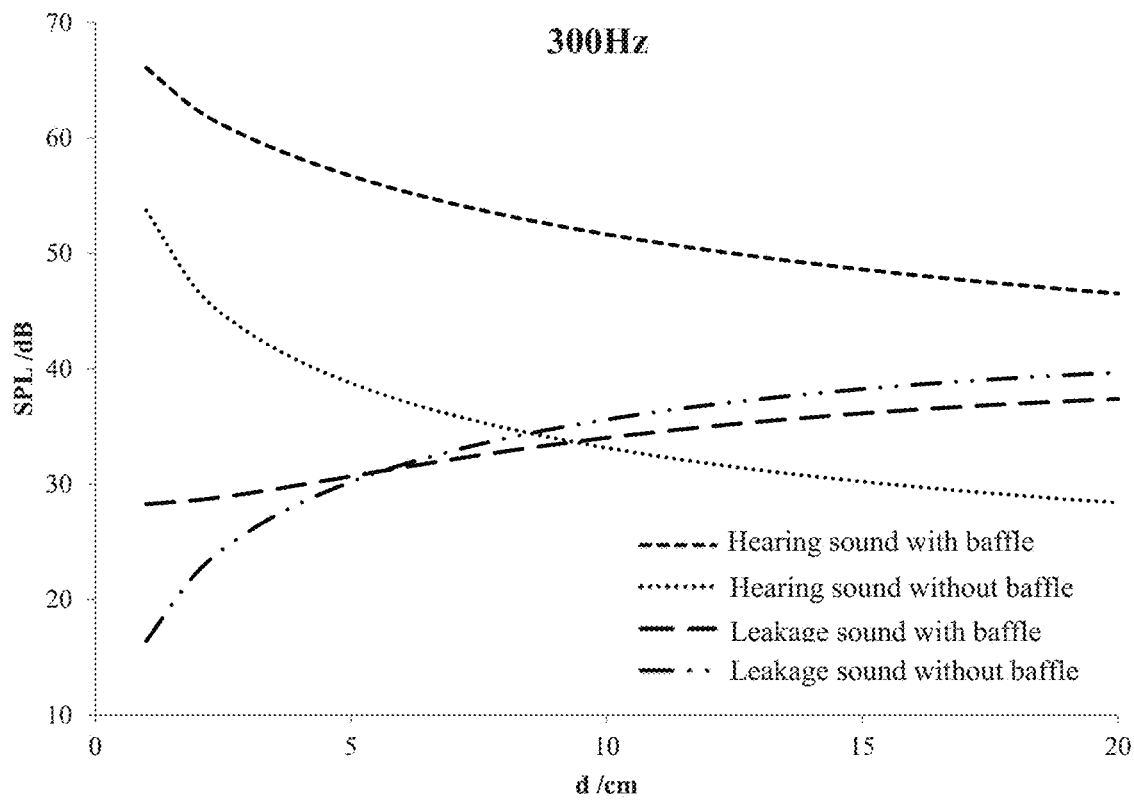
FIG. 19 is a graph illustrating changes of a volume of a hearing sound and a volume of a leakage sound along with a distance between two point sound sources of a dual-point sound source at a frequency of 300 Hz and with or without a baffle according to some embodiments of the present disclosure.
Figure 20:
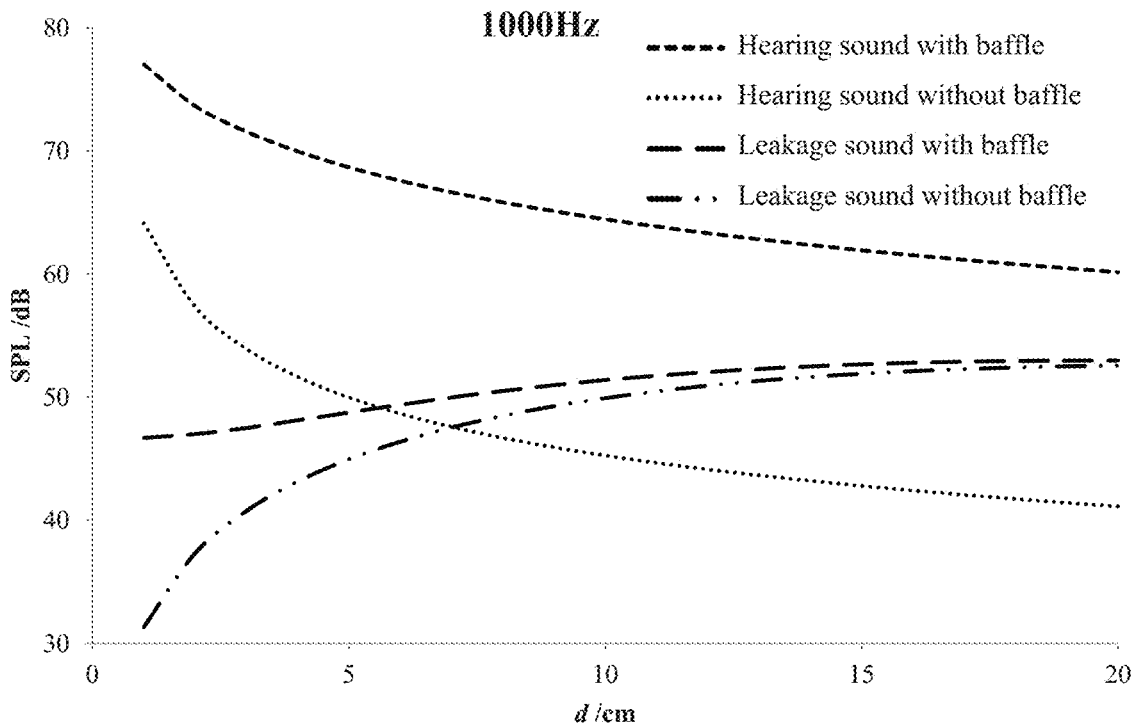
FIG. 20 is a graph illustrating changes of a volume of a hearing sound and a volume of a leakage sound along with a distance between two point sound sources of a dual-point sound source at a frequency of 1000 Hz and with or without a baffle according to some embodiments of the present disclosure.

FIG. 19 is a graph illustrating changes of a volume of a hearing sound and a volume of a leakage sound along with a distance between two point sound sources of a dual-point sound source at a frequency of 300 Hz and with or without a baffle according to some embodiments of the present disclosure. FIG. 20 is a graph illustrating changes of a volume of a hearing sound and a volume of a leakage sound along with a distance between two point sound sources of a dual-point sound source at a frequency of 1000 Hz and with or without a baffle according to some embodiments of the present disclosure. As shown in FIG. 19 and FIG. 20, in the near-field, when the frequency is 300 Hz or 1000 Hz, a volume of a beard sound when a baffle is disposed between the two point sound sources of the dual-point sound source is greater than a volume of a heard sound when the baffle is not disposed between the two point sound sources of the dual-point sound source as the distance d of the dual-point sound source is increased. In this case, the baffle disposed between the two point sound sources of the dual-point sound source may effectively increase the volume of the heard sound in the near-field when the frequency is 300 Hz or 1000 Hz. In a far-field, a volume of a leakage sound when the baffle is disposed between the two point sound sources of the dual-point sound source may be equivalent to (or substantially equivalent to) a volume of the leakage sound when the baffle is not disposed between the two point sound sources of the dual-point sound source, which may show that the baffle disposed between the two point sound sources of the dual-point sound source may not affect on the sound leakage in the far-field when the frequency is 300 Hz or 1000 Hz.

Figure 21:
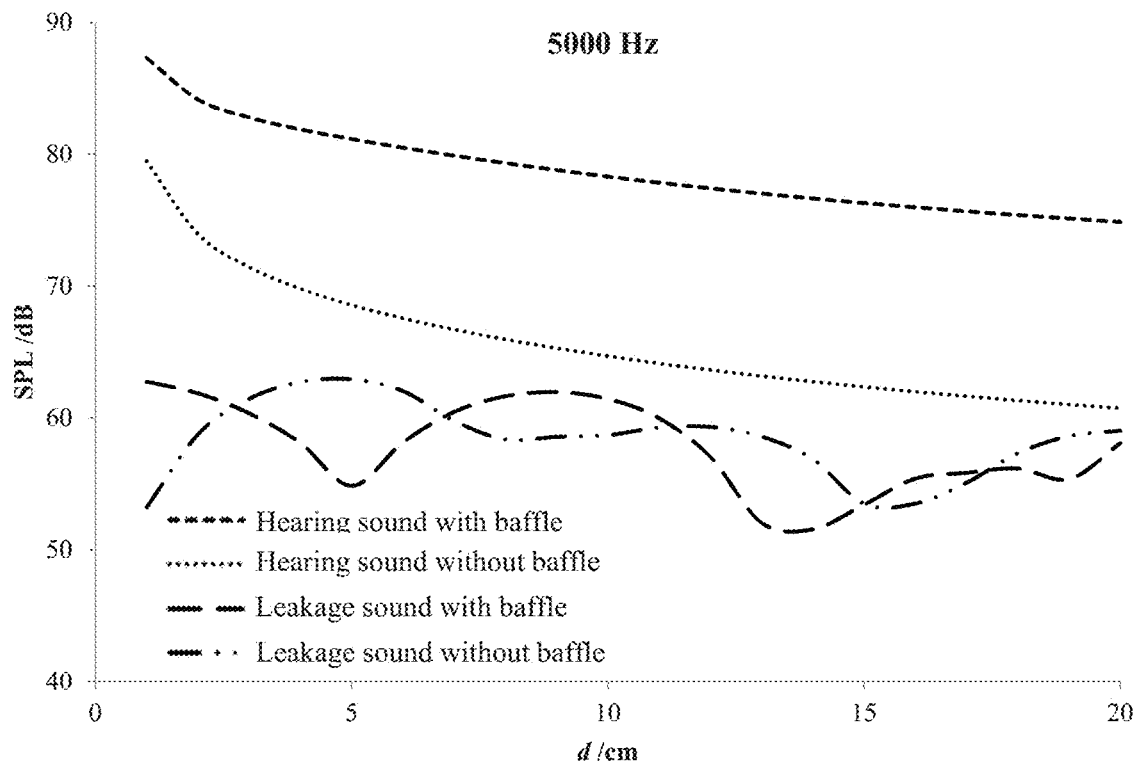
FIG. 21 is a graph illustrating changes of a volume of a hearing sound and a volume of a leakage sound along with a distance between two point sound sources of a dual-point sound source at a frequency of 5000 Hz and with or without a baffle according to some embodiments of the present disclosure.

FIG. 21 is a graph illustrating changes of a volume of a hearing sound and a volume of a leakage sound along with a distance between two point sound sources of a dual-point sound source at a frequency of 5000 Hz and with or without a baffle according to some embodiments of the present disclosure. As shown in FIG. 21, in the near-field, when the frequency is 5000 Hz, a volume of a heard sound when a baffle is disposed between the two point sound sources of the dual-point sound source is greater than a volume of a heard sound when the baffle is disposed between the two point sound sources of the dual-point sound source as the distance d of the dual-point sound source is increased. In the far-field, a volume of a leakage sound of the dual-point sound source may be fluctuant as a function of the distance d when the baffle is disposed and not disposed between the two point sound sources of the dual-point sound source. Overall, whether the baffle is disposed between the two point sound sources of the dual-point sound source may have little effect on the sound leakage in the far-field.

Figure 22:
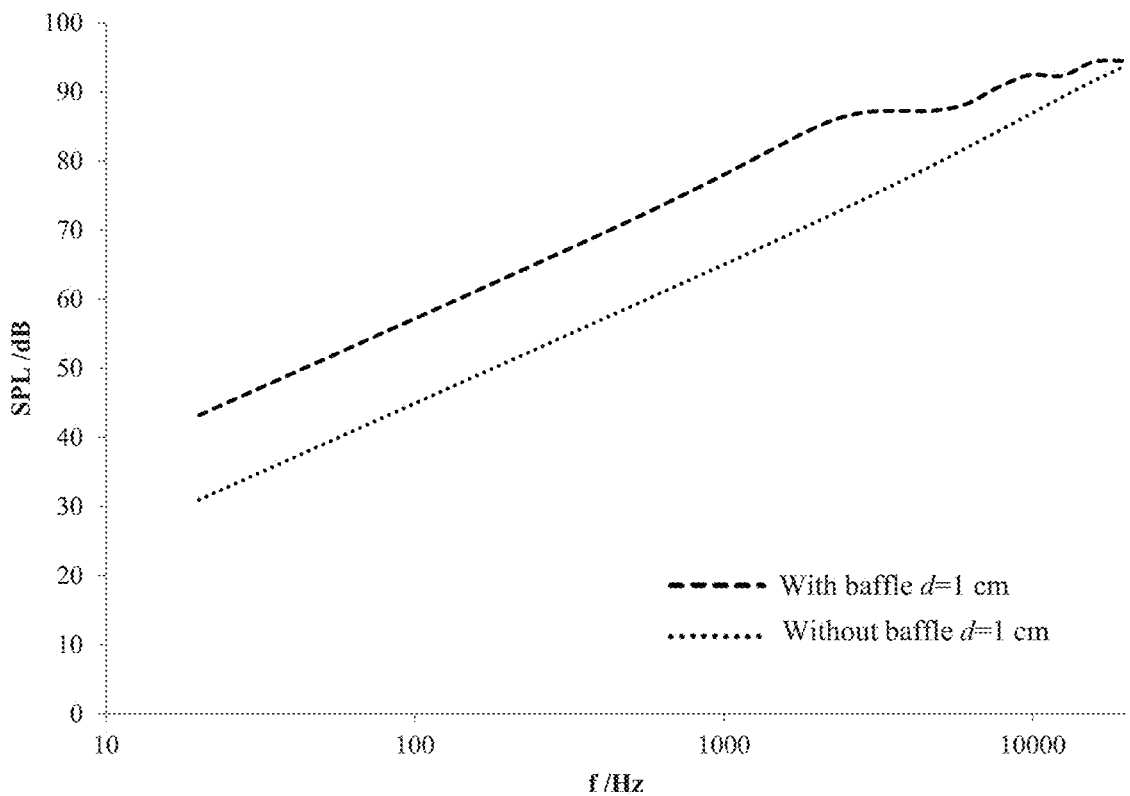
FIG. 22 is a graph illustrating a change of a volume of hearing sound along with a frequency when a distance d between two point sound sources of a dual-point sound source is 1 centimeter according to some embodiments of the present disclosure.
Figure 23:
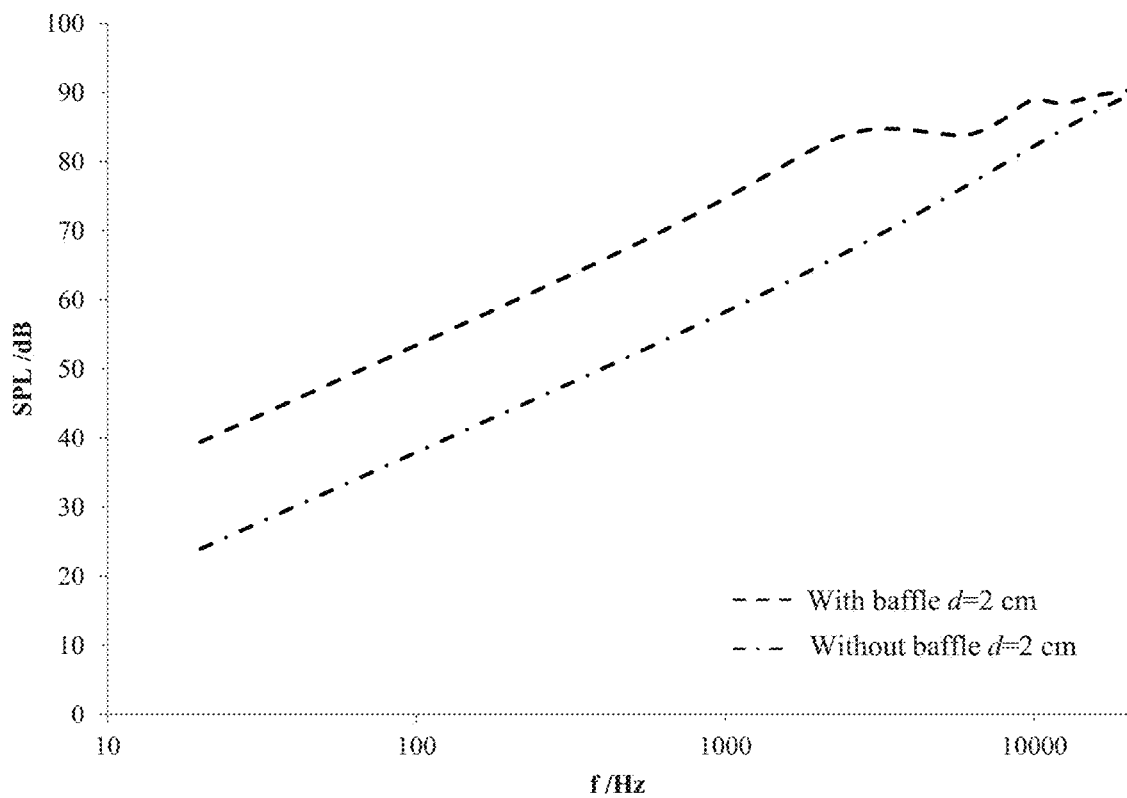
FIG. 23 is a graph illustrating a change of a volume of a hearing sound along with a frequency when a distance d between two point sound sources dual-point sound source is 2 centimeters according to some embodiments of the present disclosure.
Figure 24:
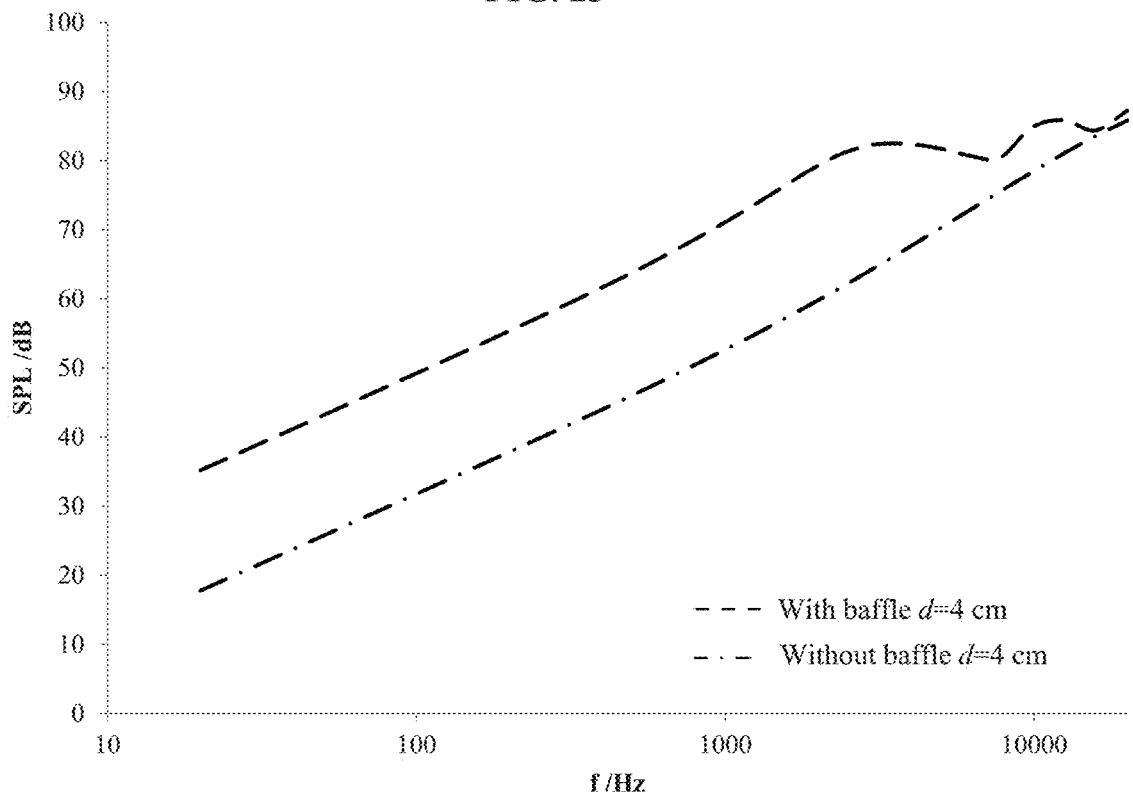
FIG. 24 is a graph illustrating a change of a volume of a hearing sound along with a frequency when a distance d of point sound sources of a dual-point sound source is 4 centimeters according to some embodiments of the present disclosure.
Figure 25:
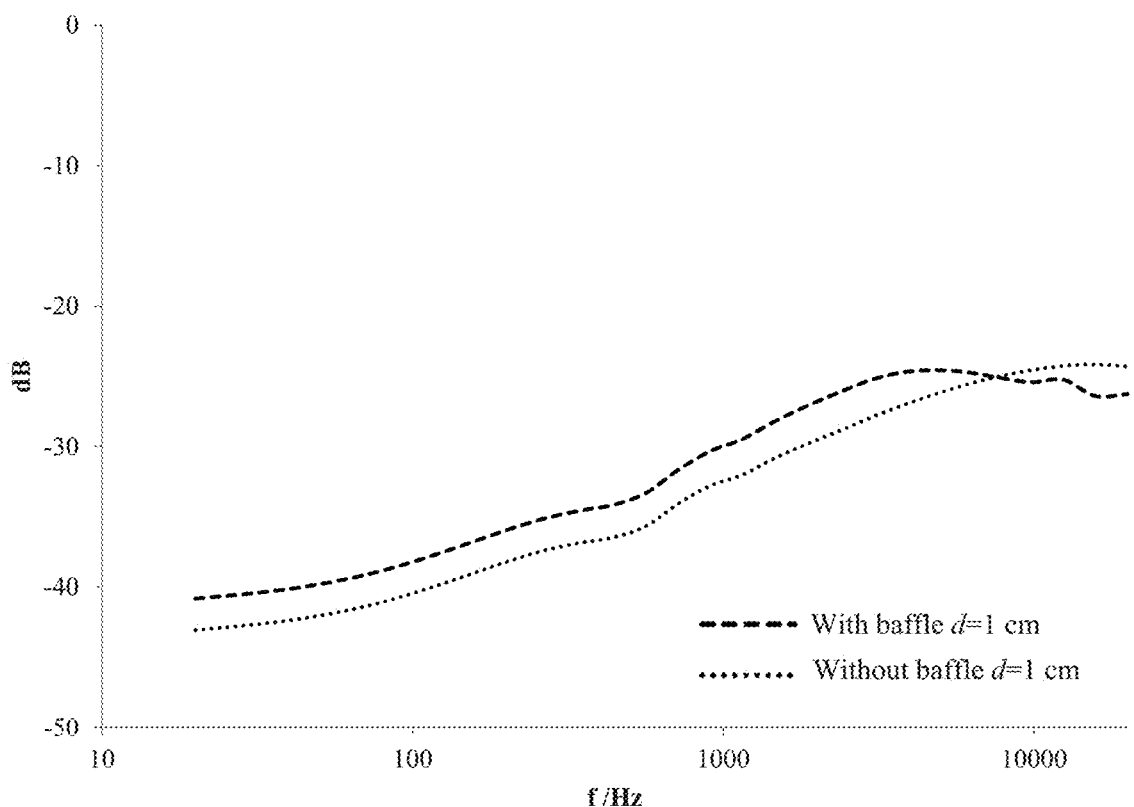
FIG. 25 is a graph illustrating a change of a normalized parameter along with a frequency when a distance d between two point sound sources of a dual-point sound source is 1 centimeter according to some embodiments of the present disclosure.
Figure 26:
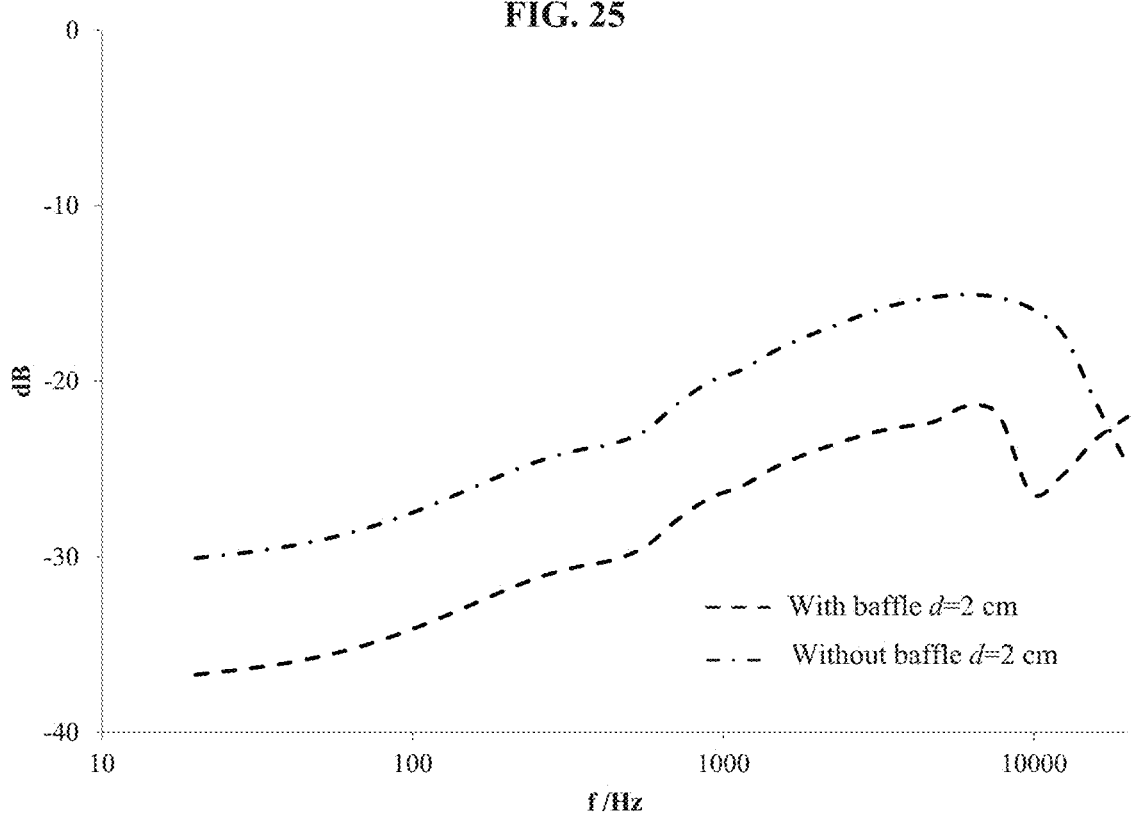
FIG. 26 is a graph illustrating a change of a normalized parameter along with a frequency when a distance d between two point sound sources of a dual-point sound source is 2 centimeters according to some embodiments of the present disclosure.
Figure 27:
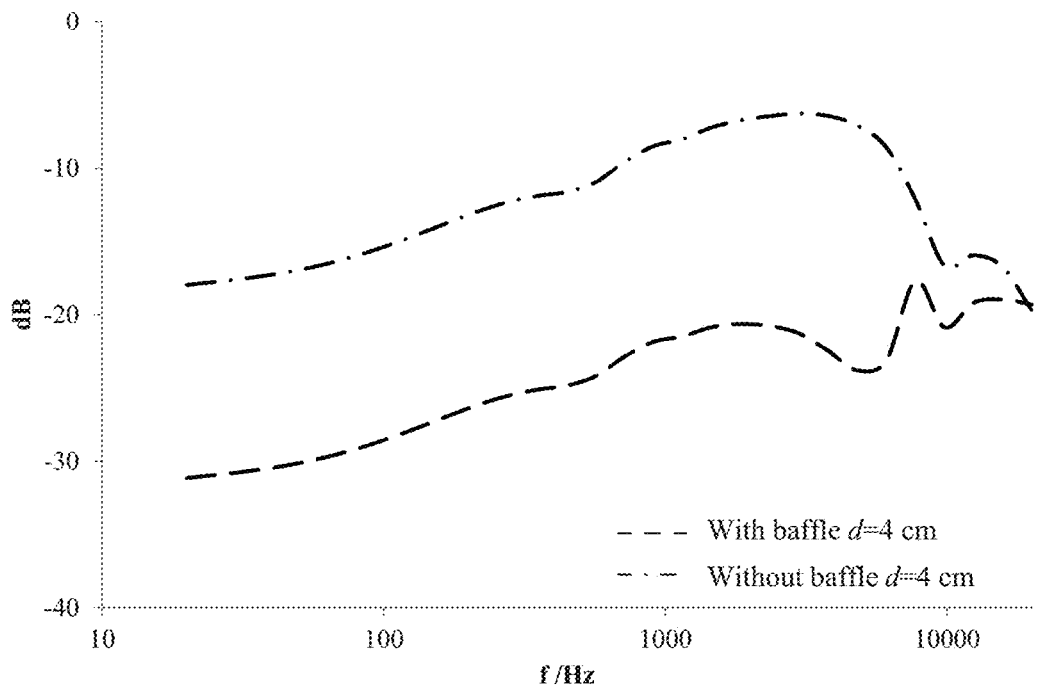
FIG. 27 is a graph illustrating a change of a normalized parameter along with a frequency when a distance d between two point sound sources of a dual-point sound source is 4 centimeters according to some embodiments of the present disclosure.

FIG. 22 is a graph illustrating a change of a volume of hearing sound along with a frequency when a distance d between two point sound sources of a dual-point sound source is 1 cm according to some embodiments of the present disclosure. FIG. 23 is a graph illustrating a change of a volume of a hearing sound along with a frequency when a distance d between two point sound sources dual-point sound source is 2 cm according to some embodiments of the present disclosure. FIG. 24 is a graph illustrating a change of a volume of hearing sound along with a frequency when a distance d between two point sound sources of a dual-point sound source is 4 cm according to some embodiments of the present disclosure. FIG. 25 is a graph illustrating a change of a normalized parameter along with a frequency when a distance d between two point sound sources of a dual-point sound source is 1 cm according to some embodiments of the present disclosure. FIG. 26 is a graph illustrating a change of a normalized parameter along with a frequency when a distance d between two point sound sources of a dual-point sound source is 2 cm according to some embodiments of the present disclosure. FIG. 27 is a graph illustrating a change of a normalized parameter along with a frequency when a distance d between two point sound sources of a dual-point sound source is 4 cm according to some embodiments of the present disclosure. As shown in FIG. 22 to FIG. 24, for different distance d (e.g., 1 cm, 2 cm, 4 cm) between sound guiding holes, at a certain frequency, in a hearing position in the near-field (e.g., an ear of a user), a volume of a sound generated by two sound guiding holes which may be disposed on two sides of the auricle (i.e., in the case of "without baffle" shown in FIGS. 22-24) may be greater than a volume of a sound generated by two sound guiding holes which may be not disposed on the two sides of the auricle. The certain frequency may be below 10000 Hz, 5000 Hz, or 1000 Hz.

As shown in FIGS. 25 to 27, for different distances d (e.g., 1 cm, 2 cm, 4 cm, etc.) between sound guiding holes, at a certain frequency, in far-field (e.g., a position away from an ear of a user), a volume of a leakage sound generated by the two sound guiding holes which may be disposed on two sides of an auricle, may be smaller than that generated by the two sound guiding holes which may be not disposed on two sides of the auricle. It should be noted that as the distance between the two sound guiding holes or two-point sound sources increases, the interference cancellation of a sound at a position in the far-field may be weakened, the sound leakage in the far-field may be increased, and the ability for reducing the sound leakage may be reduced. The distance d between the two sound guiding holes or the two-point sound sources may be not greater than a distance threshold. In some embodiments, the distance d between the two sound guiding holes may be set to be less than 20 cm to increase the volume in the near-field and reduce the sound leakage in the far-field. In some embodiments, the distance d between the two sound guiding holes may be set to be less than 12 cm. In some embodiments, the distance d between the two sound guiding holes may be set to be less than 10 cm. In some embodiments, the distance d between the two sound guiding holes may be set to be less than 6 cm. In some embodiments, considering a size of the acoustic output device and a structural requirement for the sound guiding hole(s), the distance d between the two sound guiding holes may be set to be no less than 1 cm and no greater than 12 cm. In some embodiments, the distance d between the two sound guiding holes may be set to be no less than 1 cm and no more than 10 cm. In some embodiments, the distance d between the two sound guiding holes may be set to be no less than 1 cm and no more than 8 cm. In some embodiments, the distance d between the two sound guiding holes may be set to be no less than 1 cm and no more than 6 cm. In some embodiments, the distance d between the two sound guiding holes may be set to be no less than 1 cm and no more than 3 cm.

It should be noted that the above description is merely for the convenience of description, and not intended to limit the scope of the present disclosure. It should be understood that, for those skilled in the art, after understanding the principle of the present disclosure, various modifications and changes in the forms and details of the acoustic output device may be made without departing from this principle. For example, in some embodiments, a plurality of sound guiding holes may be set on two sides of the baffle. The count of the plurality of sound guiding holes disposed on each of the two sides of the baffle may be the same or different. For example, the count of sound guiding holes disposed on one side of the baffle may be two, and the count of sound guiding holes disposed on the other side may be two or three. These modifications and changes may still be within the protection scope of the present disclosure.

Figure 28:
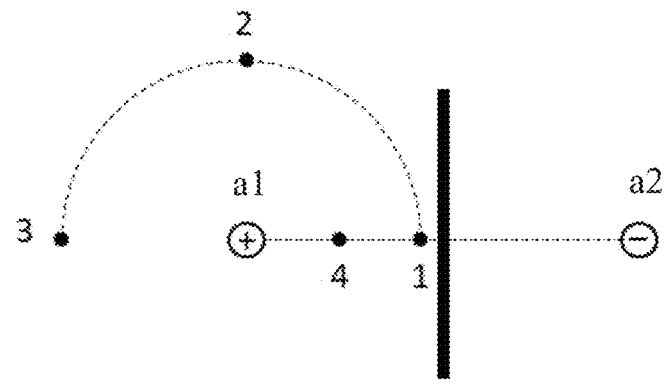
FIG. 28 is a schematic diagram illustrating hearing positions according to some embodiments of the present disclosure.

In some embodiments, for a certain distance between the two point sound sources of the dual-point sound source, a relative position of the hearing position to the dual-point sound source may affect the volume of the sound in the near-field and the sound leakage in the far-field. To improve the acoustic output performance of the acoustic output device, in some embodiments, the acoustic output device may include at least two sound guiding holes. The at least two sound guiding holes may include two sound guiding holes which may be disposed on a front side and/or a rear side of the auricle of a user, respectively. In some embodiments, a sound propagated from the sound guiding hole disposed on the rear side of the auricle may bypass the auricle to an ear canal of the user, and an acoustic route between the sound guiding hole disposed on the front side of the auricle and the ear canal (i.e., the acoustic distance from the sound guiding hole to an ear canal entrance) may be shorter than an acoustic route between the sound guiding hole disposed on the rear side of the auricle and the ear. FIG. 28 is a schematic diagram illustrating hearing positions according to some embodiments of the present disclosure. In order to further explain an effect of the hearing position on the acoustic output, four hearing positions (i.e., a hearing position 1, a hearing position 2, a hearing position 3, and a hearing position 4) may be selected as shown in FIG. 28, which may be used to describe the effect and criteria of the hearing positions. A distance between each of the hearing position 1, the hearing position 2, and the hearing position 3 and a point sound source $a_1$ may be equal, which may be denoted by $r_1$. A distance between the hearing position 4 and the point sound source $a_1$ may be denoted by $r_2$, and $r_2 < r_1$. The point sound source $a_1$ and a point sound source $a_2$ may generate sounds with opposite phases.

Figure 29:
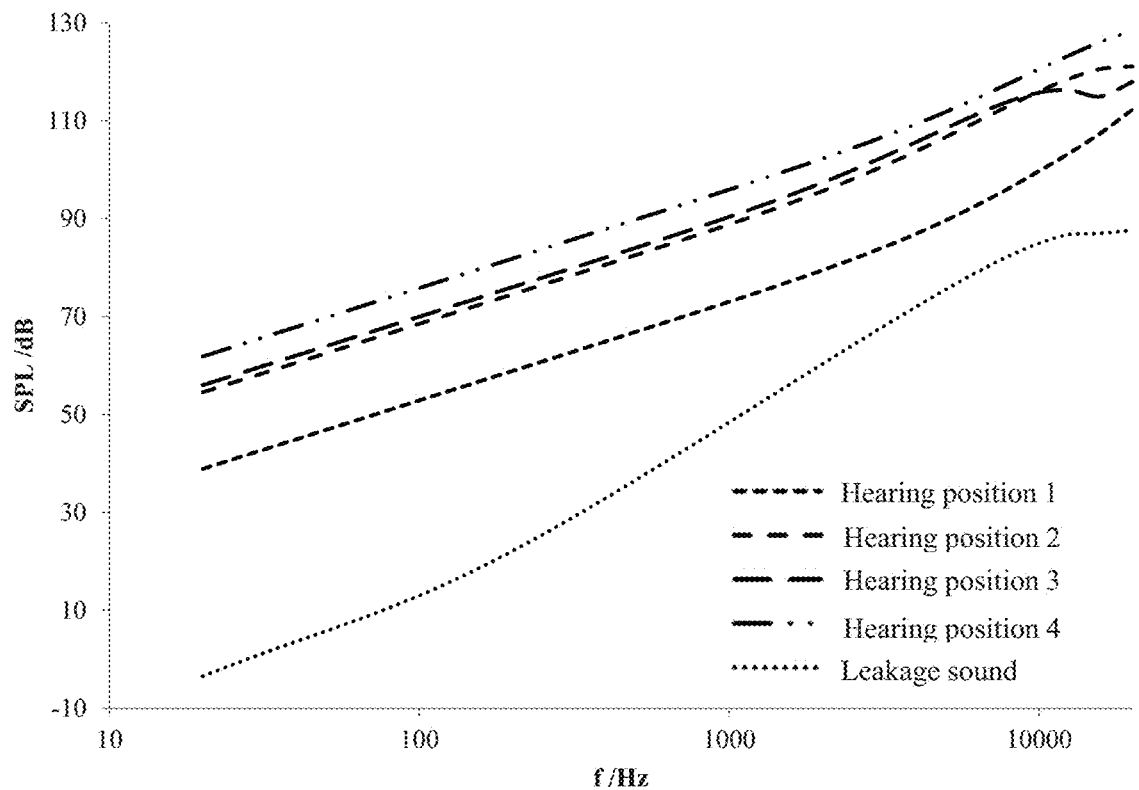
FIG. 29 is a graph illustrating a volume of a hearing sound generated by a dual-point sound source without baffle at different hearing positions in a near field along with a frequency according to some embodiments of the present disclosure.
Figure 30:
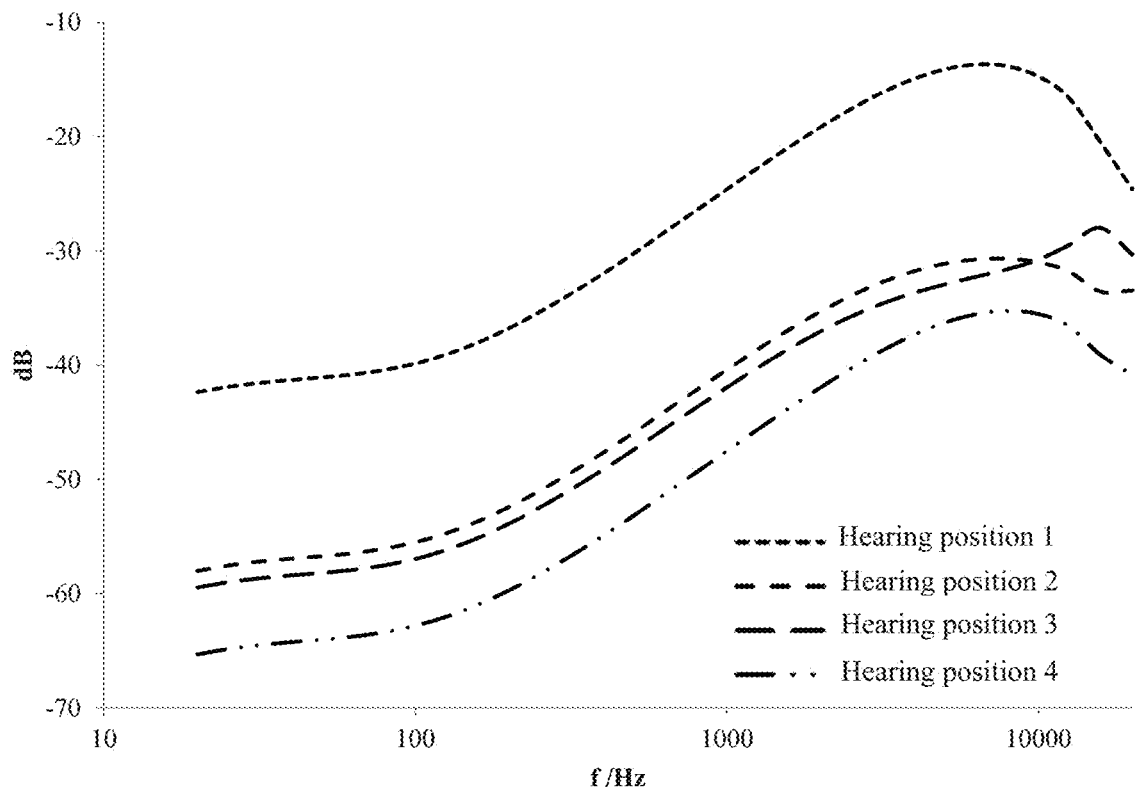
FIG. 30 is a graph illustrating a change of a normalized parameter of a hearing sound at different hearing positions in a near field of a dual-point sound source without baffle along with a frequency according to some embodiments of the present disclosure.

FIG. 29 is a graph illustrating a volume of a hearing sound generated by a dual-point sound source without baffle at different hearing positions in a near field along with a frequency according to some embodiments of the present disclosure. FIG. 30 is a graph illustrating a normalized parameter at different hearing positions obtained with reference to Equation (4) on the basis of FIG. 29 along with a frequency. As shown in FIGS. 29 and 30, an acoustic route difference between an acoustic route from the point sound source $a_1$ to the hearing position 1 and an acoustic route from the point sound source $a_2$ to the hearing position 1 is relatively small, and accordingly an interference of sounds generated by the dual-point sound source $a_2$ the hearing position 1 may decrease the volume of a heard sound at the hearing position 1 to be relatively smaller than that of other hearing positions. For a hearing position 2, compared with the hearing position 1, a distance between the hearing position 2 and the point sound source $a_1$ may be the same as that between the hearing position 1 and the point sound source $a_1$, that is, an acoustic route from the point sound source $a_1$ to the hearing position 2 may be the same as that from the point sound source $a_2$ to the hearing position. A distance between the hearing position 2 and the point sound source $a_2$ may be longer than that between the hearing position 1 and the point sound source $a_2$, and an acoustic route from the point sound source $a_2$ to the hearing position 2 may be greater than that from the point sound source $a_2$ to the hearing position 1. An amplitude difference between the sound generated by the point sound source $a_1$ and the sound generated by the point sound source a may be increased at the hearing position 2. Accordingly, a volume of the sound transmitted from the dual-point sound source after being interfered at the hearing position 2 may be greater than that at the hearing position 1. Among a plurality of positions on an arc with a radius of $r_1$, a difference between the acoustic route from the point sound source $a_1$ to the hearing position 3 and the acoustic route from the point sound source $a_2$ to the hearing position 3 may be the longer than other acoustic routes. Compared with the hearing position 1 and the hearing position 2, a volume of a heard sound at the hearing position 3 may be higher than that at other hearing positions. For the hearing position 4, a distance between the hearing position 4 and the point sound source $a_1$ may be relatively short, a sound amplitude of a sound generated by the point sound source $a_1$ at the hearing position 4 may be greater than the sound amplitude of the sound generated by the point sound source $a_1$ at other hearing positions, and a volume of a heard sound at the hearing position 4 may be greater than other volumes of heard sounds at other hearing positions. In closing, the volume of the heard sound at the hearing position in the near-field may be changed when the hearing position and/or a relative position of the dual-point sound source is changed. When the hearing position (e.g., hearing position 3) is on the line between the two point sound sources of the dual-point sound source and on the same side of the dual-point sound source, the acoustic route difference between the two point sound sources of the dual-point sound source $a_2$ the hearing position may be the largest (the acoustic route difference may be the distance d between the two point sound sources of the dual-point sound source). In this case (i.e., when the auricle is not used as a baffle), the volume of the heard sound at the hearing position may be greater than that at other positions. According to Equation (4), the sound leakage in the far-field is constant, the normalized parameter corresponding to the hearing position may be relatively small, and a capability for reducing the sound leakage may be relatively strong. Further, the distance $r_1$ between the hearing position (e.g., the hearing position 4) and the point sound source $A_1$ may be decreased, thereby increasing the volume of the heard sound at the hearing position, reducing the sound leakage parameter, and improving the capability of reducing sound leakage.

Figure 31:
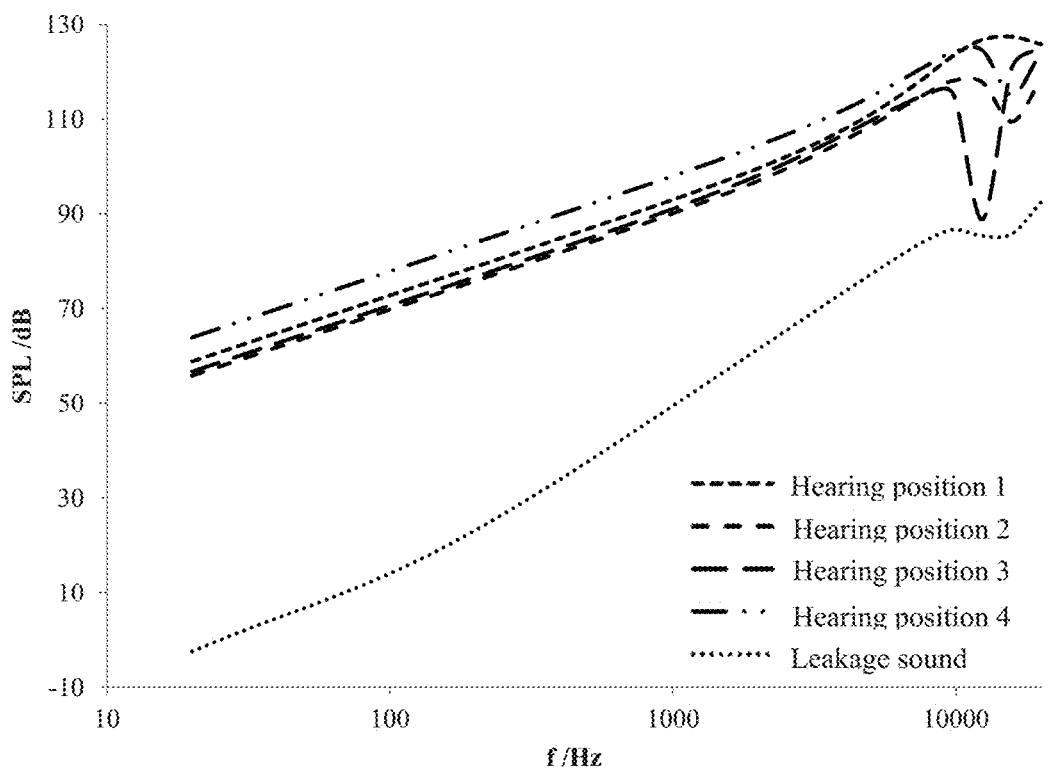
FIG. 31 is a graph illustrating a volume of a hearing sound at different hearing positions in a near field of a dual-point sound source with a baffle along with a frequency according to some embodiments of the present disclosure.
Figure 32:
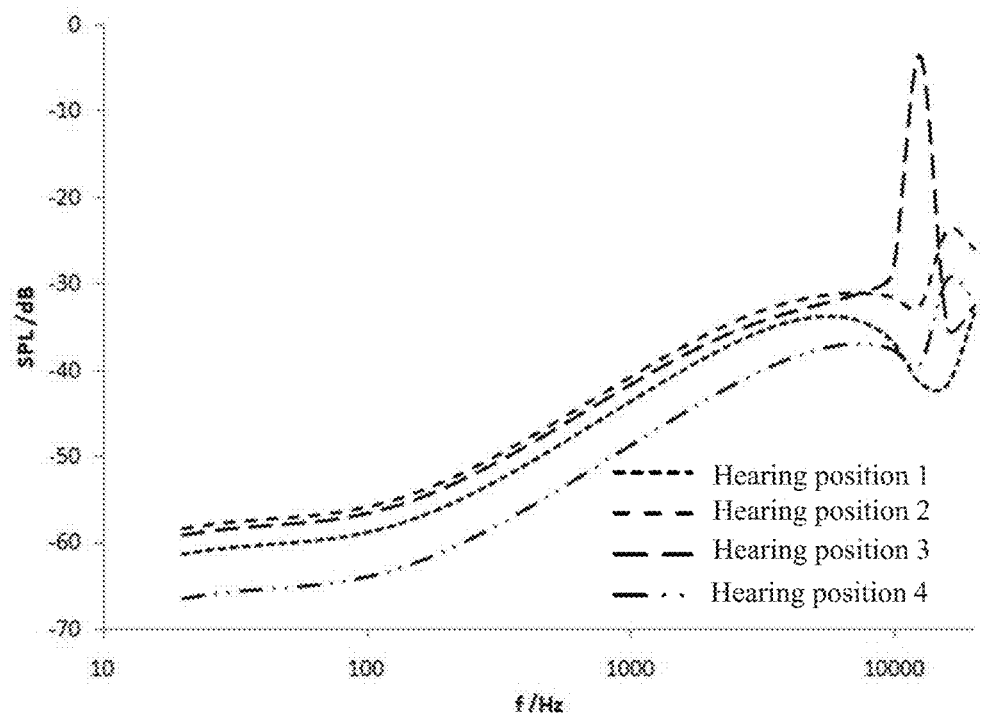
FIG. 32 is a graph illustrating a normalized parameter at different hearing positions of a dual-point sound source with a baffle along with a frequency according to some embodiments of the present disclosure.

FIG. 31 is a graph illustrating a volume of a hearing sound at different hearing positions in a near field of a dual-point sound source (shown in FIG. 28) with a baffle along with a frequency according to some embodiments of the present disclosure. FIG. 32 is a graph illustrating a normalized parameter at different hearing positions obtained with reference to Equation (4) on the basis of FIG. 31 along with a frequency. As shown in FIGS. 31 and 32, compared to a case without a baffle, a volume of a heard sound generated by the dual-point sound source $a_2$ the hearing position 1 may be increased when the baffle is disposed between the two point sound sources of the dual-point sound source. The volume of the heard sound at the hearing position 1 may be greater than that at the hearing position 2 and/or the hearing position 3. An acoustic route from the point sound source $a_2$ to the hearing position 1 may be increased when the baffle is disposed between the two point sound sources of the dual-point sound source, and accordingly, an acoustic route difference between the two point sound sources of the dual-point sound source and the hearing position 1 may be increased. An amplitude difference between the sounds generated by the dual-point sound source $a_2$ the hearing position 1 may be increased, and the sound interference cancellation may be not formed, thereby increasing the volume of the heard sound generated at the hearing position 1. At the hearing position 4, a distance between the hearing position 4 and the point sound source $a_1$ may be decreased, the sound amplitude of the point sound source $a_1$ at the hearing position may be relatively great. The volume of the heard sound at the hearing position 4 may be greater than that at other hearing positions (i.e., the hearing position 1, the hearing position 2, and/or the hearing position 3). For the hearing position 2 and the hearing position 3, an effect of the baffle on the acoustic route from the point sound source $a_2$ to the hearing positions may be not obvious, the increase of the volume of the heard sound at the hearing position 2 and the hearing position 3 may be less than that at the hearing position 1 and the hearing position 4 which are located close to the baffle.

The volume of leakage sound in the far-field may be not changed, and the volume of the heard sound at the hearing position in the near-field may be changed when the hearing position is changed. In this case, according to Equation (4), the normalized parameter of the acoustic output device may be different at different hearing positions. Specifically, a hearing position with a relatively large volume of the heard sound (e.g., the hearing position 1 and/or the hearing position 4) may correspond to a small normalized parameter ad a strong capability for reducing the sound leakage. A hearing position with a low volume of the heard sound (e.g., the hearing position 2 and hearing position 3) may correspond to a large normalized parameter and a weak capability for reducing the sound leakage.

According to an actual application scenario of the acoustic output device, an auricle of a user may be served as the baffle. In this case, the two sound guiding boles on the acoustic output device may be arranged on a front side and a rear side of the auricle, respectively, and an ear canal may be located between the two sound guiding holes as a hearing position. In some embodiments, a distance between the sound guiding hole on the front side of the auricle and the ear canal may be smaller than a distance between the sound guiding hole on the rear side of the auricle and the ear canal by adjusting positions of the two sound guiding holes on the acoustic output device. In this case, the acoustic output device may produce a relatively large sound amplitude at the ear canal since the sound guiding hole on the front side of the auricle is close to the ear canal. The sound amplitude formed by the sound guiding hole on the rear side of the auricle may be smaller at the ear canal, which may avoid the interference cancellation of the sounds from the two sound guiding holes at the ear canal, thereby ensuring a relatively large volume of the heard sound at the ear canal. In some embodiments, the acoustic output device may include one or more contact points (e.g., "an inflection point" on a supporting structure to match a shape of the ear) which may contact with the auricle when the acoustic output device is worn. The contact point(s) may be located on a line connecting the two sound guiding holes or on one side of the line connecting the two sound guiding holes. And a ratio of a distance between the sound guiding hole disposed on the front side of the auricle and the contact point(s) and a distance between the sound guiding hole disposed on the rear side of the auricle and the contact point(s) may be 0.05-20. In some embodiments, the ratio may be 0.1-10. In some embodiments, the ratio may be 0.2-5. In some embodiments, the ratio may be 0.4-2.5.

Figure 33:
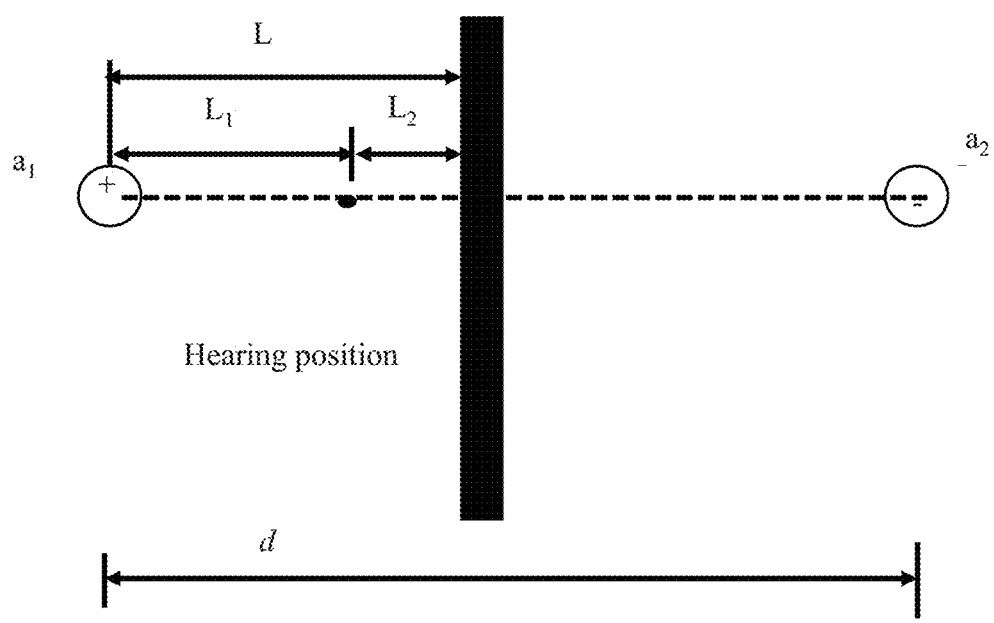
FIG. 33 is a schematic diagram illustrating a dual-point sound source and a baffle according to some embodiments of the present disclosure.

FIG. 33 is a schematic diagram illustrating a dual-point sound source and a baffle (e.g., an auricle) according to some embodiments of the present disclosure. In some embodiments, a position of the baffle disposed between the two sound guiding holes may affect the acoustic output of an acoustic output device Merely by way of example, as shown in FIG. 33, the baffle may be disposed between a point sound source $a_1$ and a point sound source $a_2$, a hearing position may be located on a line connecting the point sound source $a_1$ and the point sound source $a_2$. In addition, the hearing position may be located between the point sound source $a_1$ and the baffle A distance between the point sound source $a_1$ and the baffle may be L. A distance between the point sound source $a_1$ and the point sound source $a_2$ may be d. A distance between the point sound source $a_1$ and the heard sound may be $L_1$. A distance between the hearing position and the baffle may be $L_2$. When the distance $L_1$ is constant, a movement of the baffle may change a ratio of L to d, and a volume of the heard sound at the hearing position and/or a volume of a sound leakage in a far-field may be obtained.

Figure 34:
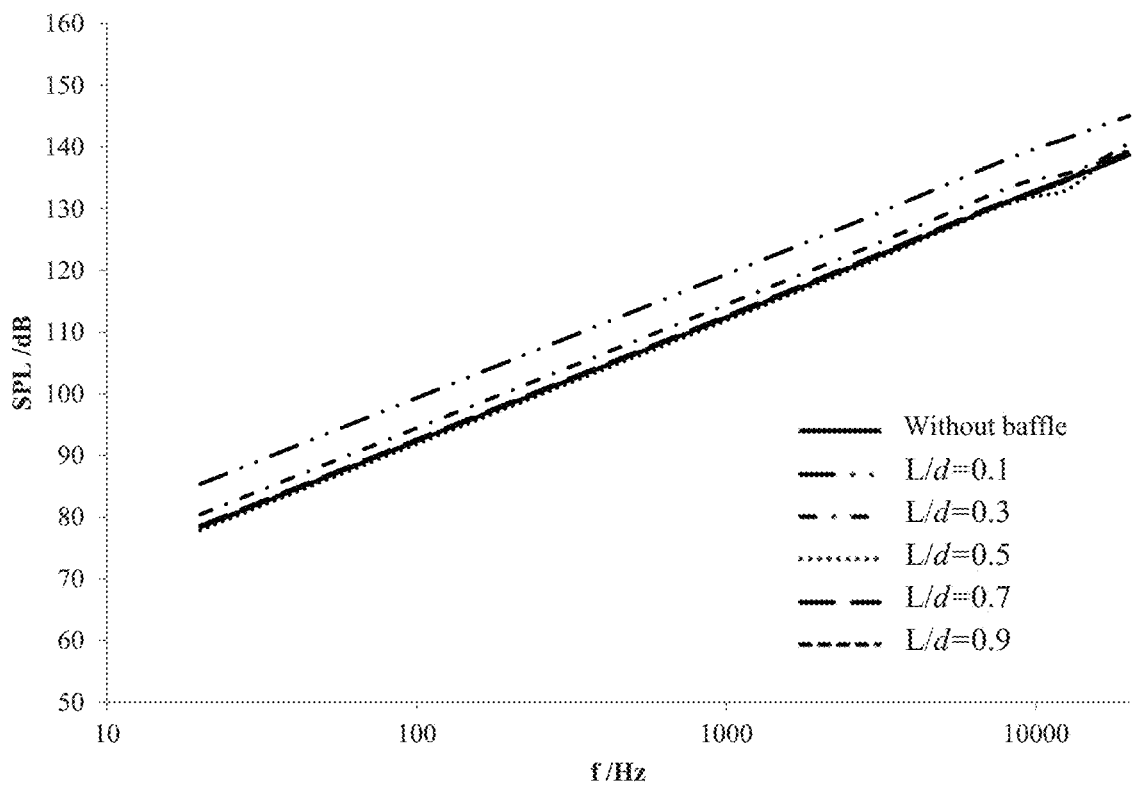
FIG. 34 is a graph illustrating a change of a volume of a sound in a near-field along with a frequency when a baffle is at different positions according to some embodiments of the present disclosure.
Figure 35:
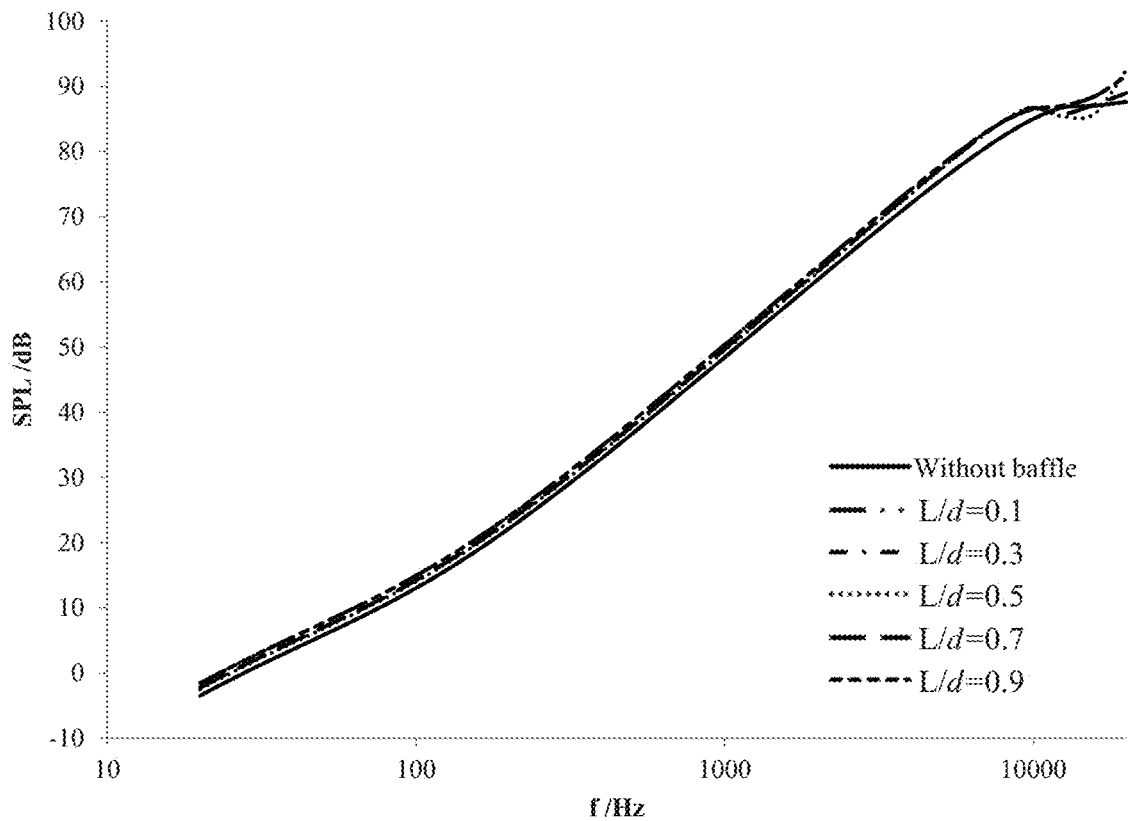
FIG. 35 is a graph illustrating a change of a volume of a leakage sound in a far-field along with a frequency when a baffle is at different positions according to some embodiments of the present disclosure.
Figure 36:
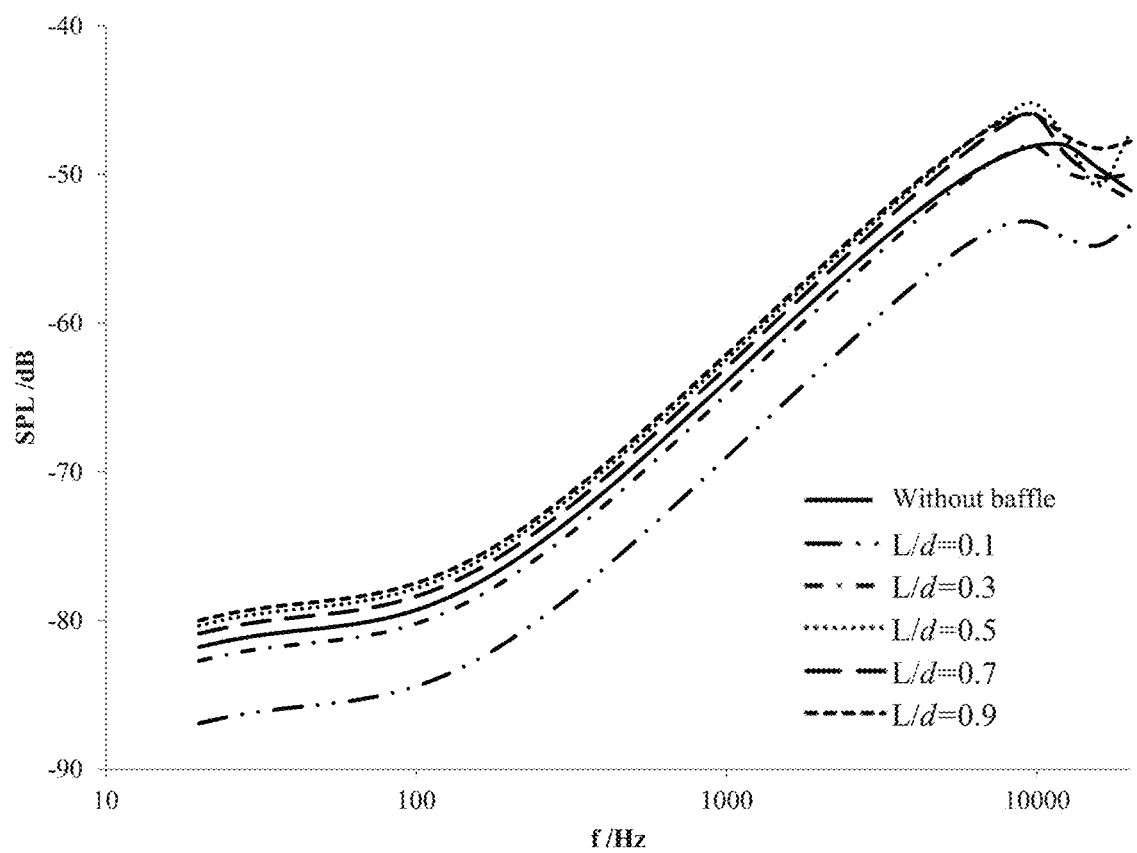
FIG. 36 is a graph illustrating a change of a normalized parameter along with a frequency when a baffle is at different positions according to some embodiments of the present disclosure.

FIG. 34 is a graph illustrating a change of a volume of a sound in a near-field along with a frequency when a baffle is at different positions according to some embodiments of the present disclosure. FIG. 35 is a graph illustrating a change of a volume of a leakage sound in a far-field along with a frequency when a baffle is at different positions according to some embodiments of the present disclosure. FIG. 36 is a graph illustrating a change of a normalized parameter along with a frequency when a baffle is at different positions according to some embodiments of the present disclosure. As shown in FIGS. 34-36, the sound leakage in the far-field may be not changed or a change of the sound leakage in the far-field may be less than a sound threshold when the position of the baffle is changed between the two point sound sources of the dual-point sound source. When a distance d between the point sound source $a_1$ and the point sound source $a_2$ is constant, when L is decreased, a volume of a sound at a hearing position may be increased, the normalized parameter may be decreased, and the capability for reducing sound leakage may be enhanced. When L increases, the volume at the hearing position may be increased, the normalized parameter may be increased, and the capability for reducing the sound leakage may be weakened. When L is relatively small, the hearing position may be close to the baffle, an acoustic route of a sound wave from the point sound source $a_2$ to the hearing position may be increased in the existence of the baffle. In this case, an acoustic route difference between an acoustic route from the point sound source $a_2$ to the hearing position and an acoustic route from the point sound source $a_2$ to the hearing position may be increased and the interference cancellation of the sound may be reduced. The volume of the sound at the hearing position may be increased in the existence of the baffle. When L is relatively large, the hearing position may be far away from the baffle. The baffle may not affect (or barely affect) the acoustic route difference. The volume at the hearing position may be not changed when the baffle is added.

As described above, by adjusting positions of the sound guiding holes on the acoustic output device, the auricle of the user may be served as the baffle to separate sound guiding holes when the user wears the acoustic output device. In this case, the structure of the acoustic output device may be simplified, and the output effect of the acoustic output device may be further improved. In some embodiments, the positions of the two sound guiding holes may be determined so that a ratio of a distance between the sound guiding hole on the front side of the auricle and the auricle (or a contact point on the acoustic output device for contact with the auricle) to a distance between the two sound guiding holes may be less than or equal to 0.5 when the user wears the acoustic output device. In some embodiments, the ratio of the distance between the sound guiding hole on the front side of the auricle and the auricle to the distance between the two sound guiding holes may be less than or equal to 0.3. In some embodiments, the ratio of the distance between the sound guiding hole on the front side of the auricle and the auricle to the distance between the two sound guiding holes may be less than or equal to 0.1. In some embodiments, the ratio of the distance between the sound guiding hole on the front side of the auricle and the auricle to the distance between the two sound guiding holes may be larger than or equal to 0.05. In some embodiments, a ratio of the distance between the two sound guiding holes to a height of the auricle may be greater than or equal to 0.2. In some embodiments, the ratio may be less than or equal to 4. In some embodiments, the height of the auricle may refer to a length of the auricle in a direction perpendicular to a sagittal plane.

It should be noted that an acoustic route from an acoustic driver to a sound guiding hole in the acoustic output device may affect the volume of the sound in the near-field and sound leakage in the far-field. The acoustic route may be changed by adjusting a length of a chamber between a vibration diaphragm in the acoustic output device and the sound guiding hole. In some embodiments, the acoustic driver may include the vibration diaphragm. A front side and a rear side of the vibration diaphragm may be coupled to two sound guiding holes through a front chamber and a rear chamber, respectively. The acoustic route from the vibration diaphragm to each of the two sound guiding holes may be different. In some embodiments, a ratio of the acoustic route from the vibration diaphragm to one of the two sound guiding holes to the acoustic route from the vibration diaphragm to another of the two sound guiding holes may be 0.5-2. In some embodiments, the ratio may be 0.6-1.5. In some embodiments, the ratio may be 0.8-1.2.

In some embodiments, when the two sound guiding holes transmit the sounds with opposite phases, amplitudes of the sounds may be adjusted to improve the output performance of the acoustic output device. Specifically, the amplitude of the sound transmitted by each of the two sound guiding holes may be adjusted by adjusting an impedance of an acoustic route between the sound guiding hole and an acoustic driver. In some embodiments, the impedance may refer to a resistance that an acoustic wave overcomes when the acoustic wave is transmitted in a medium. In some embodiments, the acoustic route may be or may not be filled with damping material (e.g., a tuning net, tuning cotton, etc.) to adjust the sound amplitude. For example, a resonance cavity, a sound hole, a sound slit, a tuning net, a tuning cotton, or the like, or any combination thereof, may be disposed in the acoustic route to adjust the acoustic resistance, thereby changing the impedance of the acoustic route. As another example, a hole size of each of the two sound guiding holes may be adjusted to change the acoustic resistance of the acoustic route. In some embodiments, a ratio of acoustic impedance between the acoustic driver (e.g., the vibration diaphragm of the acoustic driver) and the two sound guiding holes may be 0.5-2. In some embodiments, the ratio of the acoustic impedance between the acoustic driver and the two sound guiding holes may be 0.8-1.2.

It should be noted that the above descriptions are merely for illustration purposes, and not intended to limit the present disclosure. It should be understood that, for those skilled in the art, after understanding the principle of the present disclosure, various modifications and changes may be made in the forms and details of the acoustic output device without departing from this principle. For example, the hearing position may not be on the line connecting the dual-point sound source, but may also be above, below, or in an extension direction of the line connecting the dual-point sound source. As another example, a method for measuring the distance between a point sound source and the auricle, and a method for measuring the height of the auricle may also be adjusted according to different conditions. These similar changes may be all within the protection scope of the present disclosure.

Figure 37:
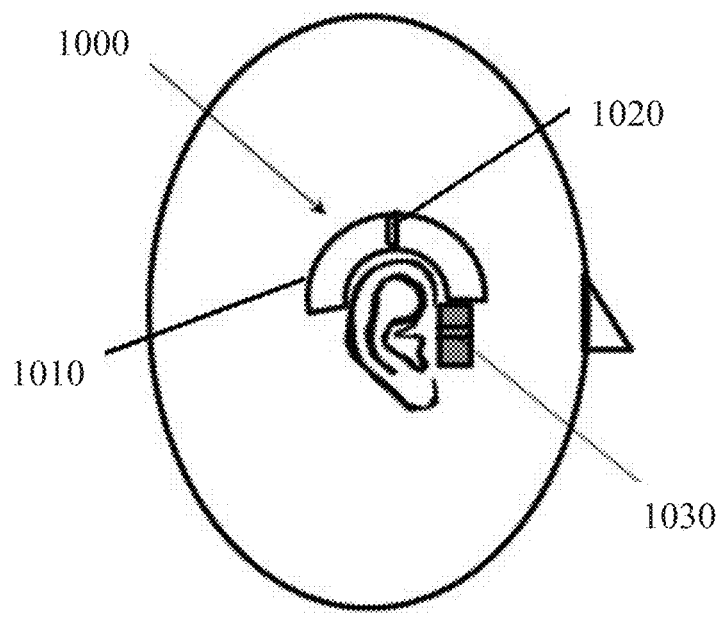
FIG. 37 is a structural diagram illustrating an exemplary acoustic output device according to some embodiments of the present disclosure.

FIG. 37 is a structural diagram illustrating an exemplary acoustic output device according to some embodiments of the present disclosure.

For a human ear, a frequency band of a sound that can be heard may be in a middle-low-frequency band. An optimization goal of the acoustic output device in the mid-low-frequency bands may be to increase a volume of a heard sound. When a hearing position is fixed, parameters of the dual-point sound source may be adjusted to increase the volume of the heard sound and not increase a volume of a leakage sound (e.g., an increase of the volume of the heard sound may be greater than an increase of the volume of the leakage sound). In a high-frequency band, a sound leakage of the dual-point sound source may be not decreased significantly. In the high-frequency band, an optimization goal of the acoustic output device may be reducing the sound leakage. The sound leakage may be further reduced and a leakage-reducing frequency band may be expanded by adjusting the parameters of the dual-point sound source of different frequencies. In some embodiments, the acoustic output device 1000 may include an acoustic driver 1030. The acoustic driver 1030 may output sound through two of the second sound guiding holes. More descriptions regarding the acoustic driver 1030, the second sound guiding holes, and a structure therebetween may be described with reference to the acoustic driver 1020 and/or the first sound guiding holes and the relevant descriptions thereof. In some embodiments, the acoustic driver 1030 and the acoustic driver 1020 may output sounds with different frequencies, respectively. In some embodiments, the acoustic output device 1000 may include a controller configured to cause the acoustic driver 1020 to output a sound within a first frequency range and cause the acoustic driver 1030 to output a sound within a second frequency range. Each frequency within the second frequency range may be higher than each frequency within the first frequency range. For example, the first frequency range may be 100 Hz-1000 Hz, and the second frequency range may be 1000 Hz-10000 Hz.

In some embodiments, the acoustic driver 1020 may be a low-frequency speaker, and the acoustic driver 1030 may be a middle-high-frequency speaker. Due to different frequency response characteristics of the low-frequency speaker and the middle-high-frequency speaker, frequency bands of sounds output by the acoustic driver 1020 and the acoustic driver 1030 may be different. A high-frequency band and a low-frequency band may be divided using the low-frequency speaker and the middle-high-frequency speaker, and accordingly, a dual-point sound source with a low-frequency and a dual-point sound source with a middle-high-frequency may be constructed to output sound in the near-field output and/or reduce sound leakage in the far-field. For example, the dual-point sound source for outputting low-frequency sound may be formed when the acoustic driver 1020 outputs the low-frequency sound through the sound guiding hole 1011 and the sound guiding hole 1012 shown in FIG. 1. The dual-point sound source with low-frequency may be disposed on two sides of an auricle to increase a volume heard by an ear near the near-field. A dual-point sound source for outputting middle-high-frequency sound may be formed when the acoustic driver 1030 outputs the middle-high-frequency sound through two second sound guiding holes. A middle-high-frequency sound leakage may be reduced by adjusting a distance between the two second sound guiding holes. The dual-point sound source with middle-high-frequency may be disposed on two sides of the auricle, or the same side of the auricle. Alternatively, the acoustic driver 1020 may provide a dual-point sound source for outputting full-frequency sound through the sound guiding hole 1011 and the sound guiding hole 1012 to increase the volume of the sound in the near-field.

Further, a distance $d_2$ between the two second sound guiding boles may be less than a distance $d_1$ between the sound guiding hole 1011 and the sound guiding hole 1012, that is, $d_1$ may be greater than $d_2$. For illustration purposes, as shown in FIG. 9, two sets of dual-point sound sources may have a stronger sound leakage reduction capability than that of a single point sound source and that of one single set of dual-point sound source, and the two sets of dual-point sound sources may include one set of a low-frequency dual-point sound source and one set of a high-frequency dual-point sound source, and a distance between two point sound sources of each set of the dual-point sound sources may be different.

It should be noted that the sound guiding holes of the acoustic output device may be not limited to the two sound guiding holes 1011 and 1012 corresponding to the acoustic driver 1720 shown in FIG. 37 distributed on two sides of the auricle, and the two sound guiding holes corresponding to the acoustic driver 1030 may be distributed on the front side of the auricle. For example, in some embodiments, the two second sound guiding holes corresponding to the acoustic driver 1030 may be disposed on the same side of the auricle (e.g., a rear side, an upper side, or a lower side of the auricle). As another example, the two second sound guiding holes corresponding to the acoustic driver 1030 may be disposed on two sides of the auricle. In some embodiments, when the sound guiding holes 1011 and the sound guiding hole 1012 and/or the two second sound guiding holes are disposed on the same side of the auricle, a baffle may be disposed between the sound guiding holes 1011 and the sound guiding hole 1012 and/or the two second sound guiding holes to further increase the volume of the sound in the near-field and reduce the sound leakage in the far-field. As yet another example, the two sound guiding boles corresponding to the acoustic driver 1020 may be disposed on the same side of the auricle (e.g., the front side, the rear side, the upper side, the lower side, etc. of the auricle).

Figure 38:
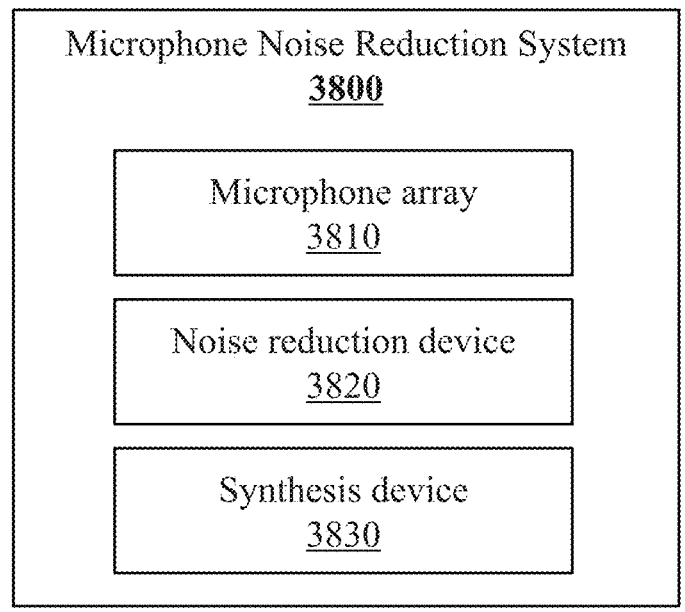
FIG. 38 is a schematic diagram illustrating an exemplary microphone noise reduction system according to some embodiments of the present disclosure.

FIG. 38 is a schematic diagram illustrating an exemplary microphone noise reduction system according to some embodiments of the present disclosure. The microphone noise reduction system 3800 may be configured to reduce or eliminate noises that is not required during microphone sound collection. In some embodiments, the noises may include a background sound existing when a user wears the audio device or a sound (e.g., a traffic noise, a wind noise, a water noise, an external voice, etc.) that are not needed to be collected. The microphone noise reduction system 3800 may be applied to various fields and/or devices, for example, a headset, a smart device (e.g., VR glasses, smart glasses), a muffler, an anti-snoring device, or the like, or any combination thereof. In some embodiments, the microphone noise reduction system 3800 may be an active noise reduction system configured to reduce the noises in voice by generating a noise reduction signal (e.g., a signal having a phase opposite to that of the noises). In some embodiments, the microphone noise reduction system 3800 may be a passive noise reduction system configured to reduce the noise by performing a difference on voice signals collected by two microphone arrays at different position.

As shown in FIG. 38, the microphone noise reduction system 3800 may include a microphone array 3810, a noise reduction device 3820, and a synthesis device 3830. In some embodiments, two or more components of the microphone noise reduction system 3800 may be connected with and/or communicated with each other. For example, the noise reduction device 3820 may be electrically and/or wirelessly connected with each microphone in the microphone array 3810. As used herein, the connection between two components may include a wireless connection, a wired connection, or any other communication connection that can be used for data transmission and/or data collection. The wireless connection may include a Bluetooth link, a Wi-Fi link, a WiMax link, a WLAN link, a Zigbee link, a mobile network link (e.g., 3G, 4G, 5G, etc.), or the like, or a combination thereof. The wired connection may include a coaxial cable connection, a communication cable (e.g., communication cable) connection, a flexible cable connection, a spiral cable connection, a non-metal sheathed cable connection, a metal sheathed cable connection, a multi-core cable connection, a twisted pair cable connection, a ribbon cable connection, a shielded cable connection, a twin-strand cable connection, an optical fiber connection, a cable connection, an optical cable connection, a telephone line connection, or the like, or any combination thereof.

The microphone array 3810 may include at least one low-frequency microphone and at least one high-frequency microphone. The at least one low-frequency microphone may be configured to collect a low-frequency voice signal. The at least one high-frequency microphone may be configured to collect a high-frequency voice signal. In some embodiments, the at least one low-frequency microphone and the at least one high-frequency microphone may be integrated into one device. For example, at least one low-frequency microphone and/or the at least one high-frequency microphone may be integrated and disposed as a microphone device in a form of a straight line, a ring, etc., to form a centralized microphone array. In some embodiments, the at least one low-frequency microphone and/or the at least one high-frequency microphone may be distributed in an audio device to form a distributed microphone array. For example, the at least one low-frequency microphone and/or the at least one high-frequency microphone may be disposed at any position of the audio device, and the microphones on the audio device may be connected wirelessly.

In some embodiments, each microphone in the microphone array 3810 may be configured to detect a voice signal (e.g., a voice signal including a target voice and noise), and process the detected voice signal into at least two sub-band voice signals. In some embodiments, each microphone in the microphone array 3810 may correspond to a filter, and the voice signal may be processed to generate at least two sub-band voice signals through the filter. As used herein, the voice signal may be an audio signal having a specific frequency band. The generated sub-band voice signals may have a narrower frequency band than a frequency band of the voice signal, and the frequency bands of the sub-band voice signals may be within the frequency band of the voice signal. For example, the voice signal may have a frequency band in a range from 10 Hz to 30 KHz. The frequency band of a sub-band voice signal may be 100 Hz to 200 Hz, which may be narrower than the frequency band of the voice signal and within the frequency band of the voice signal. In some embodiments, a combination of the frequency bands of the sub-band voice signals may cover the frequency band of the voice signal. Additionally or alternatively, at least two of the sub-band voice signals may have different frequency bands. In some embodiments, each of the sub-band voice signals may have a characteristic frequency band different from that of other sub-band voice signals. Different sub-band voice signals may have the same frequency bandwidth or different frequency bandwidths. In the sub-band voice signals, two sub-band voice signals whose center frequencies are adjacent to each other may be considered to be adjacent to each other in a frequency domain. More descriptions regarding the frequency bands of a pair of adjacent sub-band voice signals may be found elsewhere in the present disclosure. See, e.g., FIGS. 40A and 40B, and the relevant descriptions thereof.

In some embodiments, the signal generated by the microphone array 3810 may include a digital signal, an analog signal, or the like, or any combination thereof. In some embodiments, each microphone in the microphone array 3810 may be a MEMS (Micro Electro Mechanical System) microphone which may have a low operating current, relatively stable performance, and high voice quality. In some embodiments, some or all of the microphones in the microphone array 3810 may be other types of microphones, which may be not limited here.

The noise reduction device 3820 may be configured to perform noise reduction processing on the sub-band voice signals collected by the microphone array 3810. In some embodiments, the noise reduction device 3820 may perform noise estimation, adaptive filtering, voice enhancement, etc., on the collected sub-band voice signals, so as to realize voice noise reduction. Specifically, the noise reduction device 3820 may generate the sub-band noise signals according to a noise estimation algorithm, generate a sub-band noise correction signal according to the sub-band noise signal and generate a target sub-band voice signal based on the sub-band voice signals and the sub-band noise correction signal, thereby reducing the noise in the sub-band voice signal. The sub-band noise correction signal may include an analog signal, a digital signal, etc., which may have a phase opposite to that of the sub-band noise signal. In some embodiments, the noise estimation algorithm may include a time recursive average noise estimation algorithm, a minimum tracking noise estimation algorithm, or the like, or any combination thereof. In some embodiments, the microphone array 3810 may include at least one pair of low-frequency microphones and at least one pair of high-frequency microphones. Each pair of the low-frequency microphones and/or the high-frequency microphones may correspond to sub-band voice signals in the same frequency band. The noise reduction device 3820 may regard a voice signal collected by a microphone of each pair of microphones, which is close to a main sound source (e.g., a human mouth), as a sub-band voice signal, and regard a voice signal collected by another microphone of the pair of microphones, which is far from the main sound source, as a sub-band noise signal. The noise reduction device 3820 may reduce the noise of the sub-band voice signal by performing a difference operation on the sub-band voice signal and the sub-band noise signal. More descriptions regarding the noise reduction device 3820 and sub-band noise signals may be found elsewhere in the present disclosure. See, e.g., FIG. 39A, FIG. 41, and FIG. 42, and the relevant descriptions thereof.

The synthesis device 3830 may be configured to combine the target sub-band voice signals to generate a target signal. The synthesis device 3830 may include any component which can combine the at least two signals. For example, the synthesis device 3830 may generate a mixed signal (i.e., the target signal) according to a signal combination technique such as a frequency division multiplexing technique.

It should be noted that the above description of the microphone noise reduction system 3800 is intended to be illustrative, not to limit the scope of the present disclosure. Various substitutions, modifications, and changes are obvious to those skilled in the art. The features, structures, methods, and other features of the exemplary embodiments described herein may be combined in various ways to obtain additional and/or alternative exemplary embodiments. For example, the microphone noise reduction system 3800 may include one or more additional components. One or more components of the microphone noise reduction system 3800 described above may be omitted. Merely by way of example, a residual noise reduction device may be added to the noise reduction device 3820. As another example, two or more components of the microphone noise reduction system 3800 may be integrated into a single component. Merely by way of example, in the microphone noise reduction system 3800, the synthesis device 3830 may be integrated into the noise reduction device 3820.

Figure 39A:
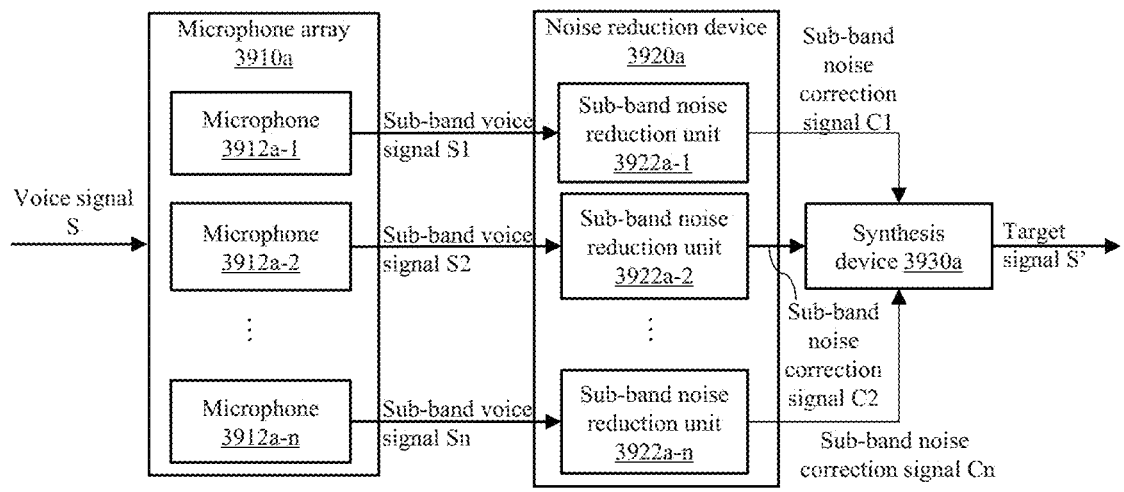
FIG. 39A is a schematic diagram illustrating an exemplary microphone noise reduction system according to some embodiments of the present disclosure.

FIG. 39A is a schematic diagram illustrating an exemplary microphone noise reduction system 3900A according to some embodiments of the present disclosure. As shown in FIG. 39A, the microphone noise reduction system 3900A may include a microphone array 3910a, a noise reduction device 3920a, and a synthesis device 3930a. The microphone array 3910a may include at least two microphones (e.g., a microphone 3912a-1, a microphone 3912a-2, . . . , a microphone 3912a-n). The count of the microphones 3912a may be equal to the count of sub-band voice signals. The count of sub-band voice signals (i.e., n) may be related to a frequency band of a voice signal S and frequency bands of generated sub-band voice signals. For example, a certain count of the microphones 3912a may be used, and the combination of the frequency bands of the sub-band voice signals may cover the frequency band of the voice signal. In some embodiments, the frequency bands of any pair of adjacent sub-band voice signals in the sub-band voice signals may be not overlapped.

The microphones 3912a may have different frequency responses to the voice signal S and may be configured to generate the sub-band voice signals by processing the voice signal S. For example, when a microphone 3912a-1 responds to a voice signal with a frequency of 20 Hz to 3 kHz, a full-band voice signal S (e.g., with a frequency from 2 Hz to 30 kHz) may be processed by the microphone 3912a-1 to generate a sub-band voice signal, and the frequency band range of the sub-band voice signal may be 20 Hz~3 kHz. In some embodiments, the sub-band voice signals generated by the microphone array 3910a may include a digital signal, an analog signal, or the like, or any combination thereof.

In some embodiments, at least one of the microphones 3912a may include an acoustic channel element and a sound sensitive element. The acoustic channel element may include an acoustic route through which the voice signal S (e.g., the target voice signal, a noise signal) may be transmitted to the sound sensitive element. For example, the acoustic channel element may include one or more chambers, one or more tubes, or the like, or any combination thereof. The sound sensitive element may convert the voice signal S transmitted from the acoustic channel element (e.g., an original voice, a voice processed by the acoustic channel element) into an electrical signal. For example, the sound sensitive element may include a diaphragm, a board, a cantilever, etc. The diaphragm may be configured to convert a sound pressure change caused by the voice signal on a surface of the diaphragm into mechanical vibration of the diaphragm. The sound sensitive element may be made of one or more materials, such as plastic, metal, piezoelectric material, or the like, or any combination thereof.

In some embodiments, the frequency response of at least one of the microphones 3912a may be associated with an acoustic structure of the acoustic channel element of the at least one of the microphones 3912a. For example, the acoustic channel element of the microphone 3912a-1 may have a specific acoustic structure that may process the sound before the sound reaches the sound sensitive element of the microphone 3912a-1. In some embodiments, the acoustic structure of the acoustic channel element may have a specific acoustic impedance, thus the acoustic channel element may be used as a filter for filtering voice and generate sub-band voice signals. The sound sensitive element of the microphone 3912a may convert the sub-band voice signals into a sub-band voice electrical signal.

In some embodiments, the acoustic impedance of an acoustic structure may be disposed according to the frequency band of a voice. In some embodiments, an acoustic structure mainly including a chamber may be configured as a high-pass filter, and an acoustic structure mainly including a tube may be configured as a low-pass filter. Merely by way of example, an acoustic channel element may have a chamber and tube structure. The chamber and tube structure may be a combination of sound capacity and acoustic quality in series and may form an inductor-capacitor (LC) resonance circuit. When an acoustic resistance material is used in the chamber, a resistor-inductor-capacitor (RLC) series loop may be formed, and the acoustic impedance of the RLC series loop may be represented by Equation (5) below:

$$Z = R_a + j\left(\omega M_a - \frac{1}{\omega C_a}\right), \tag{5}$$

where Z represents the acoustic impedance, w represents an angular frequency of the chamber and tube structure, j represents a unit imaginary number, $M_a$ represents acoustic quality, $C_a$ represents sound capacity, and $R_a$ represents an acoustic resistance of the RLC series loop. The chamber and tube structure may be used as a band-pass filter (also referred to as a band-pass filter F1). A bandwidth of the band-pass filter F1 may be adjusted by adjusting the acoustic resistance $R_a$. A center frequency of the band-pass filter F1 may be adjusted by adjusting the acoustic quality $M_a$ and/or the sound capacity $C_a$. For example, the center frequency of the band-pass filter F1 may be represented by Equation (6) below.

$$\omega_0 = \sqrt{M_a C_a}, \tag{6}$$

In some embodiments, the frequency response of at least one of microphones 3912a may be associated with one or more physical characteristics (e.g., material, structure) of a sound sensitive element of the microphone. The sound sensitive element with specific physical characteristics may be sensitive to a certain frequency band of an audio. For example, mechanical vibration of one or more elements of a sound sensitive element may cause a change of electrical parameters of the sound sensitive element. The sound sensitive element may be sensitive to a certain frequency band of a voice signal. The frequency band of the voice signal may cause corresponding changes of the electrical parameters of the sound sensitive element. In other words, at least one of the microphones 3912a may be used as a filter for processing a sub-band voice signal of the voice signal S. In some embodiments, the voice may be sent to a sound sensitive element through an acoustic channel element without (or substantially not) being filtered by the acoustic channel element. The physical characteristics of the sound sensitive element may be adjusted, and the sound sensitive element may be used as a filter for filtering the voice and converting the filtered voice into one or more sub-band voice electrical signals.

Merely by way of example, the sound sensitive element may include a diaphragm, which may be configured as a band-pass filter (also referred to as a band-pass filter F2). A center frequency of the band-pass filter F2 may be represented by Equation (7) as below:

$$\omega'_0 = \sqrt{\frac{K_m}{M_m}}, \tag{7}$$

where $M_m$ represents to the mass of the diaphragm, and $K_m$ represents an elasticity coefficient of the diaphragm. In some embodiments, a bandwidth of the band-pass filter F2 may be adjusted by adjusting the damping ($R_m$) of the diaphragm. The center frequency of the band-pass filter F2 may be adjusted by adjusting the mass of the diaphragm $M_m$ and/or the elasticity coefficient of the diaphragm $K_m$.

As described above, the acoustic channel element or the sound sensitive element of at least one of the microphones 3912a may be used as a filter. The frequency response of the at least one of microphones 3912a may be adjusted by adjusting the parameters (e.g., $R_a$, $M_a$ and/or $C_a$) of the acoustic channel element or the parameters (e.g., $K_m$ and/or $R_m$) of the sound sensitive element. In some embodiments, the combination of the acoustic channel element and the sound sensitive element may be used as a filter. By adjusting the parameters of the acoustic channel element and the sound sensitive element, the frequency response of the combination of the acoustic channel element and the sound sensitive element may be adjusted accordingly. More descriptions regarding the acoustic channel element and/or the sound sensitive element used as a band-pass filter may be found in, for example, International Application No. PCT/CN2018105161, entitled "SIGNAL PROCESSING DEVICE HAVING MULTIPLE ACOUSTIC-ELECTRIC TRANSDUCERS", filed on Sep. 12, 2018, the entire contents of which are hereby incorporated by reference.

The noise reduction device 3920a may include at least two sub-band noise reduction units 3922a (e.g., a sub-band noise reduction unit 3922a-1, a sub-band noise reduction unit 3922a-2, . . . , a sub-band noise reduction unit 3922a-n). Each of the sub-band noise reduction units 3922a may correspond to one of the microphones 3912a. The at least two sub-band noise reduction units 3922a may be configured to generate sub-band noise correction signals based on noises in a sub-band voice signal, reduce noises in the sub-band voice signal, and generate a target sub-band voice signal. For example, a sub-band noise reduction unit 3922a-i (i and n are any integer greater than 1 and i is equal to or less than n) may receive a sub-band voice signal Si from a microphone 3912a-i, and generate a sub-band noise correction signal Ci, thereby reducing the noise of the sub-band voice signal Si. In some embodiments, at least one of the at least two sub-band noise reduction units 3922a may include a sub-band noise estimation sub-unit (not shown in FIG. 39A) and a sub-band noise suppression sub-unit (not shown in FIG. 39A). The sub-band noise estimation sub-unit may be configured to estimate the noise in the sub-band voice signal. The sub-band noise suppression sub-unit may be configured to receive the noise in the sub-band voice signal from the sub-band noise estimation sub-unit and generate a sub-band noise correction signal, thereby reducing the sub-band noise signal in the sub-band voice signal.

In some embodiments, a sub-band voice signal may be sent from one of the microphones 3912a to one of the at least two sub-band noise reduction units 3922a through a parallel transmitter. In some embodiments, the sub-band voice signal may be transmitted via the parallel transmitter according to a specific communication protocol for transmitting a digital signal. An exemplary communication protocol may include Audio Engineering Society (AES3), European Broadcasting Union (AES/EBU), European Broadcasting Union (EBU), Automatic Data Accumulator and Propagation (ADAT), Inter-IC Sound (I2S), Time-division Multiplexing (TDM), Musical Instrument Digital Interface (MIDI), CobraNet, Ethernet Audio/Video Patch Cord (Ethernet AVB), Dante, International Telecommunication Union (ITU)-T G. 728, ITU-T G. 711, ITU-T G. 722, ITU-T G. 722.1, ITU-T G. 722.1 Advanced Audio Coding (Annex C, AAC)-LD, or the like, or any combination thereof. The digital signal may be transmitted via various manners, such as Compact Disc (CD), WAVE, Audio Interchange File Format (AIFF), Moving Picture Experts Group (MPEG)-1, MPEG-2, MPEG-3, MPEG-4, Musical Instrument Digital Interface (MIDI), Windows Media Audio (WMA), RealAudio, Transform-domain Weighted Nterleave Vector Quantization (VQF), Adaptive Multi-rate (AMR), APE, Free Lossless Audio Codec (FLAC), Advanced Audio Coding (AAC), or the like, or any combination thereof. In some embodiments, a sub-band voice signal may be processed into a single-channel signal using, for example, a frequency division multiplexing technique, and the single-channel signal may be transmitted to at least one of the at least two sub-band noise reduction units 3922a.

In some embodiments, the sub-band noise reduction unit 3922a-i may estimate a sub-band noise signal $N_i$, and perform phase modulation and/or amplitude modulation on the sub-band noise signal $N_i$ to generate a sub-band noise correction signal $N_i'$. In some embodiments, the phase modulation and the amplitude modulation may be sequentially or simultaneously performed on the sub-band noise signal $N_i$. For example, the sub-band noise reduction unit 3922a-i may perform the phase modulation on the sub-band noise signal $N_i$ to generate a phase modulation signal, and perform the amplitude modulation on the phase modulation signal to generate the sub-band noise correction signal $N_i'$. The phase modulation of the sub-band noise signal $N_i$ may include inversion of the phase of the sub-band noise signal $N_i$. In some embodiments, a phase of the noises may shift during propagation of the noise from a position of the microphone 3912a-i to a position of the sub-band noise reduction unit 3922a-i. The phase modulation of the sub-band noise signal $N_i$ may also include compensating for the phase shift of the sub-band noise signal $N_i$ during propagation of the sub-band noise signal $N_i$. Specifically, the sub-band noise reduction unit 3922a-i may perform amplitude modulation on the sub-band noise signal $N_i$ to generate an amplitude modulation signal, and perform phase modulation on the amplitude modulation signal to generate the sub-band noise correction signal $N_i'$. More descriptions regarding the sub-band noise reduction unit 3922a-i may be found elsewhere in the present disclosure. See, e.g., FIGS. 41 and 42, and the relevant descriptions thereof.

In some embodiments, the noise reduction device 3920a may use two sets of microphones with the same configuration (e g., two microphone arrays 3910a) to perform noise reduction according to the principle of dual-microphone noise reduction. Each set of microphones may include microphones corresponding to a plurality of sub-band voice signals with different frequency bands. For illustration purposes, one of the two sets of microphones with the same configuration may be referred to as a first microphone set, and the other set of microphones may be referred to as a second microphone set. A distance between the first microphone set and a main sound source (e.g., the human mouth) may be closer than a distance between the second microphone set and the main sound source. As used herein, a distance between a microphone set and the main sound source refers to a distance between a microphone in the microphone set or a position in an area configured with the microphone set and the main sound source. For example, the distance between the first microphone set and the main sound source (e.g., the human mouth) may include a distance between a center microphone arranged in the first microphone set and the main sound source, and the distance between the second microphone set and the main sound source (e.g., the human mouth) may include a distance between a center microphone arranged in the second microphone set and the main sound source. Each microphone in the first microphone set may correspond to a microphone in the second microphone one to one. For example, a first microphone in the first microphone set with a frequency band of 20 Hz-3 kHz may correspond to a second microphone in the second microphone set with a frequency band of 20 Hz-3 kHz. The signal collected by the first microphone in the first microphone set may be regarded as a sub-band voice signal, and the signal collected by the second microphone in the second microphone set may be regarded as a sub-band noise signal. The noise reduction device 3920a may generate a target sub-band voice signal according to the sub-band voice signal and the sub-band noise signal. More descriptions regarding performing noise reduction using two microphone arrays may be found elsewhere in the present disclosure. See, e.g., FIG. 46A or FIG. 46B and the relevant descriptions thereof.

The synthesis device 3930a may be configured to combine one or more target sub-band voice signals to generate a target signal S'.

It should be noted that the descriptions of the microphone array 3910a and/or the noise reduction device 3920a may be intended to be illustrative, which does not limit the scope of the present disclosure. Various substitutions, modifications, and changes may be obvious to those skilled in the art. The features, structures, methods, and other features of the exemplary embodiments described herein may be combined in various ways to obtain additional and/or alternative exemplary embodiments. For example, the microphone array 3910a and/or the noise reduction device 3920a may include one or more additional components. As another example, one or more components of the microphone array 3910a and/or noise reduction device 3920a may be omitted. As yet another example, two or more components of the microphone array 3910a and/or the noise reduction device 3920a may be integrated into a single component.

Figure 39B:
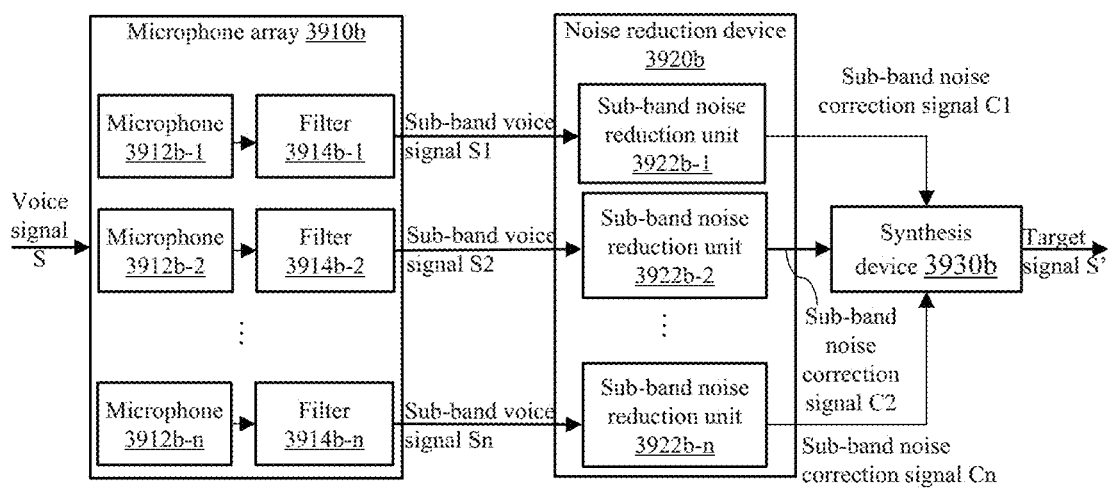
FIG. 39B is a schematic diagram illustrating an exemplary microphone noise reduction system according to some embodiments of the present disclosure.

FIG. 39B is a schematic diagram illustrating an exemplary microphone noise reduction system according to some embodiments of the present disclosure. As shown in FIG. 39B, a microphone noise reduction system 3900B may include a microphone array 3910b, a noise reduction device 3920b, and a synthesis device 3930b. The microphone array 3910b may include at least two microphones 3912b (e.g., a microphone 3912b-1, a microphone 3912b-2, . . . , microphone 3912b-n) and at least two filters 3914b (e.g., a filter 3914b-1, a filter 3914b-2, . . . , a filter 3914b-n). The count of the microphones 3912b, the count of filters 3914b, and the count of sub-band voice signals may be equal. The at least two microphones 3912b may have the same configuration. In other words, each of the microphones 3912b may have the same frequency response to a voice signal S. When a microphone of the microphones 3912b receives the voice signal S, the microphone may transmit the voice signal S to one of the filters 3914b corresponding to the microphone, and the sub-band voice signal may be generated through the one of the filters 3914b. The filters 3914b corresponding to each of the microphones 3912b may have different frequency responses to the voice signal S. In some embodiments, at least one of the filters 3914b may include a passive filter, an active filter, an analog filter, a digital filter, etc., or any combinations thereof.

The noise reduction device 3920b may include at least two sub-band noise reduction units 3922b (e.g., a sub-band noise reduction unit 3922b-1, a sub-band noise reduction unit 3922b-2, . . . , a sub-band noise reduction unit 3922b-n). Each of the sub-band noise reduction units 3922b may correspond to a filter of the filters 3914b (or a microphone of the microphones 3912b). More descriptions regarding the noise reduction device 3920b and the synthesis device 3930b may be found elsewhere in the present disclosure. See, e.g., FIG. 39A and the relevant descriptions thereof.

Figure 40A:
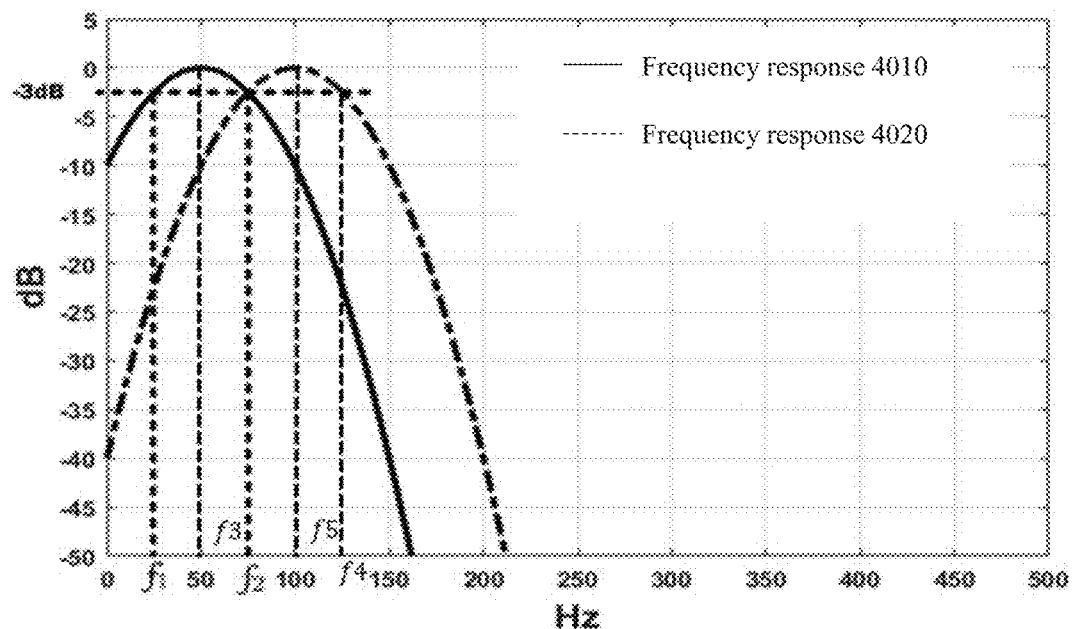
FIG. 40A is a schematic diagram illustrating an exemplary frequency response of a first microphone and an exemplary frequency response of a second microphone according to some embodiments of the present disclosure.
Figure 40B:
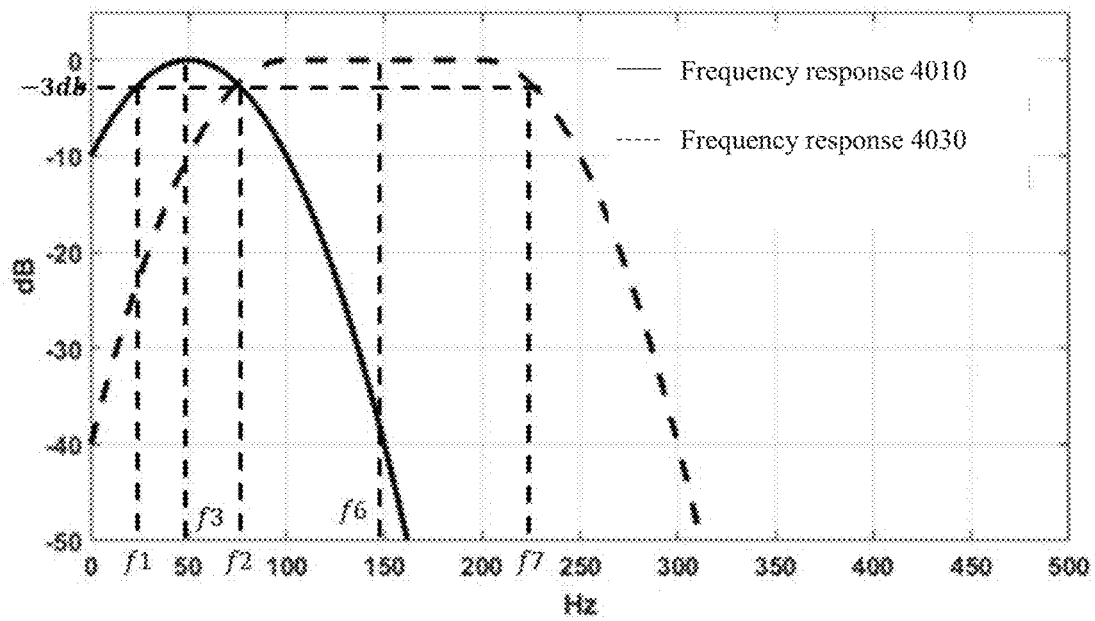
FIG. 40B is a schematic diagram illustrating an exemplary frequency response of a first microphone and an exemplary frequency response of a second microphone according to some embodiments of the present disclosure.

FIG. 40A is a schematic diagram illustrating an exemplary frequency response 4010 of a first microphone and an exemplary frequency response 4020 of a second microphone according to some embodiments of the present disclosure. FIG. 40B is a schematic diagram illustrating the frequency response 4010 of the first microphone and another exemplary frequency response 4030 of the second microphone according to some embodiments of the present disclosure. The first microphone may be configured to process a voice signal to generate a first sub-band voice signal. The second microphone may be configured to process a voice signal to generate a second sub-band voice signal. In sub-band voice signals, the second sub-band voice signal may be adjacent to the first sub-band voice signal in a frequency domain.

In some embodiments, the frequency responses of the first microphone and the second microphone may have the same frequency bandwidth. For example, as shown in FIG. 40A, the frequency response 4010 of the first microphone may have a low half power point f1, a high half power point f2, and a center frequency f3. As used herein, a half power point of a frequency response refers to a frequency point with a specific power suppression (e.g., −3 dB). A frequency bandwidth of the frequency response 4010 may be equal to a difference between the high half power point f2 and the low half power point f1. The frequency response 4020 of the second microphone may have a low half power point f2, a high half power point f4, and a center frequency f5. A frequency bandwidth of the frequency response 4020 may be equal to a difference between the high half power point f4 and the low half power point f2. The frequency bandwidth of the first microphone may be equal to the frequency bandwidth of the second microphone.

In some embodiments, the frequency response of the first microphone and the frequency response of the second microphone may have different frequency bandwidths. For example, as shown in FIG. 40B, the frequency response of the second microphone 4030 may have the low half power point f2, a high half power point f7 (which is greater than f4), and a center frequency f6. The frequency bandwidth of the frequency response 4030 of the second microphone may be equal to a difference between the high half power point f7 and the low half power point f2 and the difference between the high half power point f7 and the low half power point f2 (i.e., the frequency bandwidth of the frequency response 4030 of the second microphone) may be greater than the frequency bandwidth of the frequency response 4010 of the first microphone. Accordingly, relatively few microphones may be needed in the microphone array 3910a to generate the sub-band voice signals to cover the frequency band of an original voice signal.

In some embodiments, the frequency response of the first microphone and the frequency response of the second microphone may intersect at a frequency point. The intersection of the frequency response of the first microphone and the frequency response of the second microphone may indicate that an overlapping range exists between the first frequency response and second frequency response. On an ideal occasion, the frequency response of the first microphone and the frequency response of the second microphone may have no overlapping range. The frequency response of the first microphone and the frequency response of the second microphone having an overlapping range may cause an interference range between the first sub-band voice signal and the second sub-band voice signal and affect the quality of the first sub-band voice signal and the second sub-band voice signal. For example, the larger the overlapping range is, the larger the interference range may be, and the lower the quality of the first sub-band voice signal and the second sub-band voice signal may be.

In some embodiments, the frequency point at which the frequency responses of the first microphone and the second microphone intersect may be close to the half power point of the frequency response of the first microphone and/or the half power point of the frequency response of the second microphone. As shown in FIG. 40A, the frequency response 4010 and the frequency response 4020 intersect at the high half power point f2 of the frequency response 4010, which may be the low half power point of the frequency response 4020. It should be noted that when a power level difference between the frequency point and the half power point is not greater than a threshold (e.g., 2 dB), it may be considered that the frequency point is close to the half power point. In this case, the frequency response of the first microphone and the frequency response of the second microphone may have relatively little energy loss or repetition, which may result in an overlapping range between the frequency response of the first microphone and the frequency response of the second microphone. Merely by way of example, when the half power point is −3 dB and the threshold is −2 dB, when the frequency response of the first microphone and the frequency response of the second microphone intersects at a frequency point with a power level greater than −5 dB and/or less than −1 dB, the overlapping range may be considered to be relatively small. In some embodiments, the center frequency and/or the bandwidth of the frequency response of the first microphone and the center frequency and/or the bandwidth of the frequency response of the second microphone may be adjusted to generate a relatively narrow or an required overlapping range between the frequency response of the first microphone and that of the second microphone, thereby avoiding the overlapping between the frequency band of the first sub-band voice signal and that of the second sub-band voice signal.

It should be noted that the descriptions of the embodiments in FIG. 40A and FIG. 40B are intended to be illustrative, which does not limit the scope of the present disclosure. Various substitutions, modifications, and changes may be obvious to those skilled in the art. The features, structures, methods, and other features of the exemplary embodiments described herein may be combined in various ways to obtain additional and/or alternative exemplary embodiments. For example, one or more parameters (e.g., the frequency bandwidth, the high half power point, the low half power point, and/or the center frequency) of the frequency response of the first microphone and/or that of the frequency response of the second microphone may be determined based on actual needs.

Figure 41:
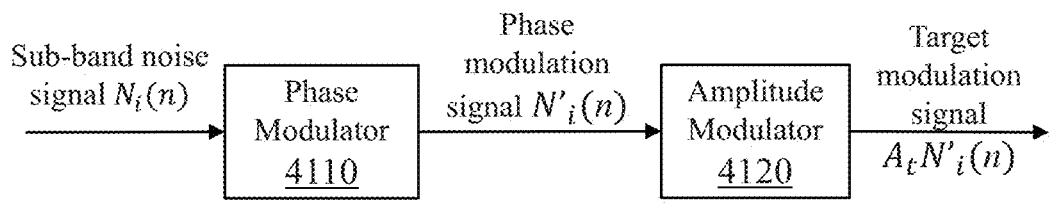
FIG. 41 is a schematic diagram illustrating an exemplary sub-band noise suppression sub-unit according to some embodiments of the present disclosure.

FIG. 41 is a schematic diagram illustrating an exemplary sub-band noise suppression sub-unit 4100 according to some embodiments of the present disclosure. The sub-band noise suppression sub-unit 4100 may be configured to receive a sub-band noise signal $N_i(n)$ from a sub-band noise estimation sub-unit and generate a sub-band noise correction signal $A_rN'_i(n)$, thereby modulating a frequency of the sub-band noise signal $N_i(n)$ and reducing an amplitude of the sub-band noise signal $N_i(n)$. $A_r$ refers to an amplitude suppression coefficient, which is related to noises to be reduced.

Figure 42:
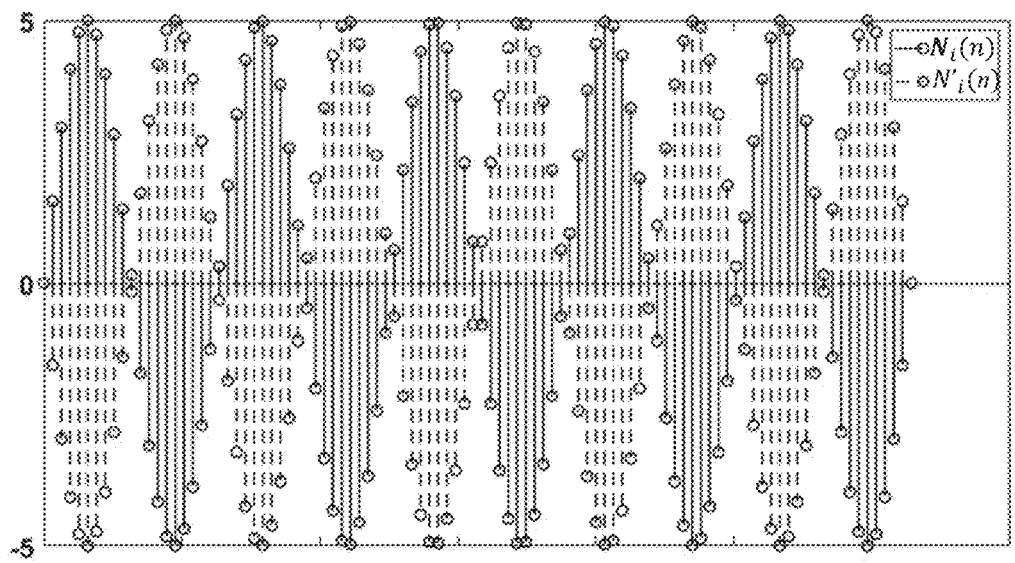
FIG. 42 is a schematic diagram illustrating an exemplary phase modulation signal according to some embodiments of the present disclosure.

As shown in FIG. 41, the sub-band noise suppression sub-unit 4100 may include a phase modulator 4110 and an amplitude modulator 4120. The phase modulator 4110 may be configured to receive the sub-band noise signal $N_i(n)$ and generate a phase modulation signal $N'_i(n)$ by inverting the phase of the sub-band noise signal $N_i(n)$. For example, as shown in FIG. 42, a phase modulation signal $N'_i(n)$ may be generated by inverting the phase of the sub-band noise signal $N_i(n)$. In some embodiments, the phase of the noise may be shifted during the nose is propagated from a position of a microphone (e.g., the microphone 3912a-i) to a position of a sub-band noise reduction unit (e.g., the sub-band noise reduction unit 3922a-i). In some embodiments, the phase shift of the noise may be ignored. For example, when the noise is propagated in a single direction in a form of a plane wave while the noise is propagated from the position of the microphone to the position of the sub-band noise reduction unit (or a part thereof), and the phase shift during the propagation of the noise is less than a threshold, it may be considered that the phase of the noise is not shifted and may be ignored when the phase modulation signal $N'_i(n)$ is generated. When the phase shift of the noise is greater than the threshold, it may be considered that the phase of the noise is shifted. In some embodiments, when the phase shift of a sub-band noise is negligible, the phase modulator 4110 may generate the phase modulation signal $N'_i(n)$ by performing phase inversion on the sub-band noise signal $N_i(n)$.

In some embodiments, when the phase shift of the sub-band noise is not negligible, the phase modulator 4110 may consider the phase shift of the sub-band noise when the phase modulator 4110 generates the phase modulation signal $N'_i(n)$. For example, the phase of the sub-band noise signal $N_i(n)$ may have a phase shift $\Delta\varphi$ in a propagation process. The phase shift $\Delta\varphi$ may be determined according to Equation (8) below:

$$\Delta\varphi = \frac{2\pi f_0}{c}\Delta d, \tag{8}$$

where $f_0$ represents the center frequency of the sub-band noise signal $N_i(n)$, c represents a speed of the sound. When the noise is a near-field signal, $\Delta d$ represents a difference between the distance from the sound source to the microphone 3912a-i and the distance from the sound source to the sub-band noise reduction unit 3922a-i (or a part thereof). When the noise is a far-field signal, $\Delta d$ may be equal to d cos θ, wherein d represents the distance between the microphone 3912a-i and the sub-band noise reduction unit 3922a-i (or a part thereof), and θ represents an angle between the sound source and the microphone 3912a-i or an angle between the sound source and the sub-band noise reduction unit 3922a-i (or a part thereof).

To compensate for the phase shift $\Delta\varphi$, the phase modulator 4110 may perform the phase inversion and phase compensation on the sub-band noise signal $N_i(n)$ to generate the phase modulation signal $N'_i(n)$. In some embodiments, the phase modulator 4110 may include an all-pass filter. The function of the all-pass filter may be denoted as $|H(w)|$, wherein w represents an angular frequency. On an ideal occasion, an amplitude response of the all-pass filter may be equal to 1, and a phase response of the all-pass filter may be equal to the phase shift $\Delta\varphi$. The all-pass filter may delay the sub-band noise signal $N_i(n)$ by $\Delta T$ to perform the phase compensation. In some embodiments, $\Delta T$ may be determined according to Equation (9) below:

$$\Delta T = \frac{\Delta\varphi}{2\pi f_0} = \frac{\Delta d}{c}, \tag{9}$$

In this case, the phase modulator 4110 may perform the phase inversion and the phase compensation on the sub-band noise signal $N_i(n)$ to generate the phase modulation signal $N'_i(n)$.

The amplitude modulator 4120 may be configured to receive the phase modulation signal $N'_i(n)$ and generate a target modulation signal $A_rN'_i(n)$ by modulating the phase modulation signal $N'_i(n)$. In some embodiments, the noise may be suppressed during the propagation of the noise from the position of the microphone $3912a$-$i$ to the position of the sub-band noise reduction unit $3922a$-$i$ (or a part thereof). The amplitude suppression coefficient $A_t$ may be determined to measure the amplitude suppression of the noise during propagation. The amplitude suppression coefficient $A_t$ may be associated with one or more factors, including: for example, the material and/or structure of an acoustic channel element for sound transmission, the position of the microphone $3912a$-$i$ relative to the sub-band noise reduction unit $3922a$-$i$ (or a part thereof), or the like, or any combination thereof.

In some embodiments, the amplitude suppression coefficient $A_t$ may be a default of the microphone noise reduction system 3800 as shown in FIG. 38, or may be predetermined based on an actual or simulated experiment. For example, the amplitude suppression coefficient $A_t$ may be determined by comparing an amplitude of an audio signal near the microphone $3912a$-$i$ (e.g., before the audio signal entering an audio broadcasting device) with the amplitude after the audio signal is transmitted to the position of the sub-band noise reduction unit $3922a$-$i$. In some embodiments, the amplitude suppression of the noise may be ignored. For example, when the amplitude suppression during propagation of the noise is less than a threshold and/or the amplitude suppression coefficient $A_t$ may be equal to (or substantially equal to) 1, the phase modulation signal $N'_i(n)$ may be designated as the sub-band noise correction signal (i.e., the target modulation signal $A_t N'_i(n)$) of the sub-band noise signal $N_i(n)$.

In some embodiments, the sub-band noise suppression sub-unit 4100 may include a sub-band voice signal generator (not shown in FIG. 41). The sub-band voice signal generator may generate a target sub-band voice signal $C_i(n)$ according to the sub-band noise correction signal $A_t N'_i(n)$ and a sub-band voice signal $S_i(n)$, and transmit the target sub-band voice signal to the synthesis device 3830 as shown in FIG. 38. The synthesis device 3830 may combine at least two target sub-band voice signals into one target signal $S(n)$ according to Equation (10) below:

$$S(n) = \sum_{i=1}^{m} C_i(n), \qquad (10)$$

It should be noted that the descriptions of the embodiments in FIGS. 41 and 42 and FIG. 40B may be intended to be illustrative, which does not limit the scope of the present disclosure. Various substitutions, modifications, and changes may be obvious to those skilled in the art. The features, structures, methods, and other features of the exemplary embodiments described herein may be combined in various ways to obtain additional and/or alternative exemplary embodiments. For example, the sub-band noise suppression sub-unit 4100 may include one or more additional components, such as a signal synthesis unit. As another example, one or more components in the sub-band noise suppression sub-unit 4100, such as the amplitude modulator 4120, may be omitted.

Figure 43A:
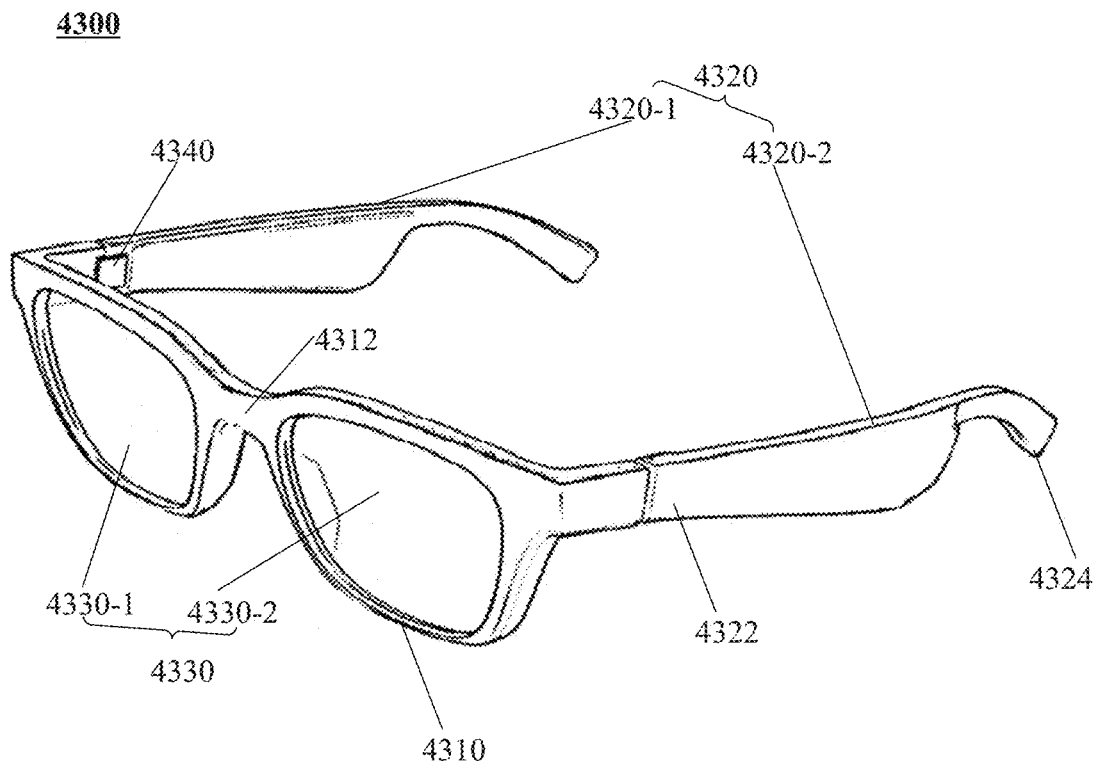
FIG. 43A is a schematic diagram illustrating exemplary smart glasses according to some embodiments of the present disclosure.
Figure 43B:
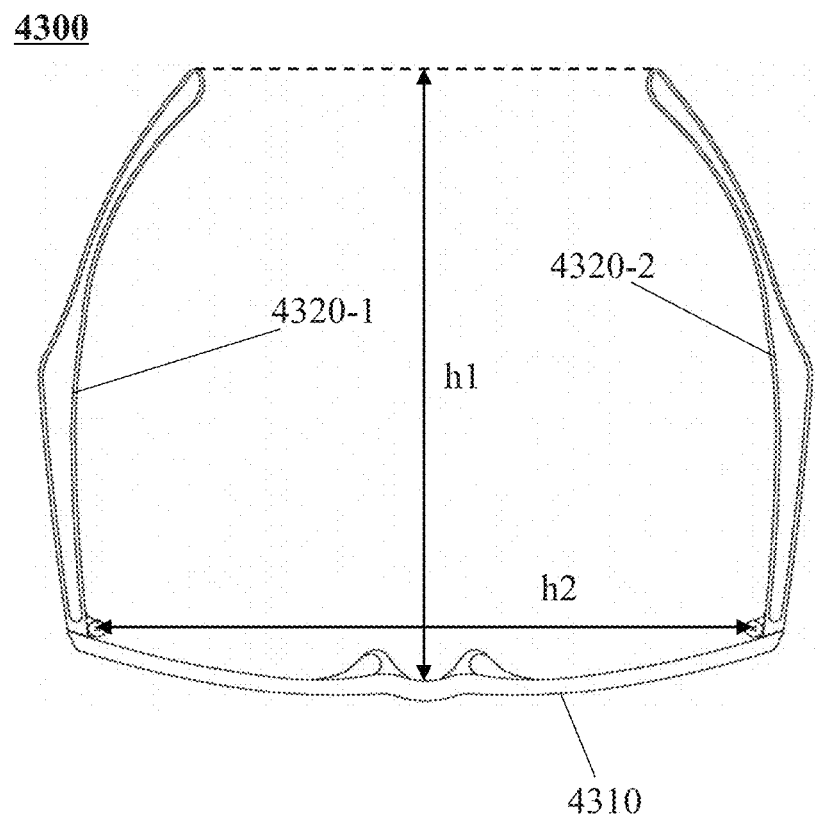
FIG. 43B is a schematic diagram illustrating exemplary smart glasses according to some embodiments of the present disclosure.

FIGS. 43A and 43B are schematic diagrams illustrating exemplary smart glasses 4300 according to some embodiments of the present disclosure. The smart glasses 4300 may include a frame 4310, one or more temples 4320 (e.g., a temple 4320-1 and a temple 4320-2), and one or more lenses 4330 (e.g., a lens 4330-1 and a lens 4330-2). The frame 4310 and the temples 4320 may be called a glasses support together. The frame 4310 may be configured to support the lens 4330. A bridge 4312 may be disposed in the middle of the frame 4310. The bridge 4312 may be placed on the bridge of the nose of a user when the user wears the smart glasses 4300. The temples 4320 may be placed on the user's ears when the user wears the smart glasses 4300. The temples 4320 may cooperate with the bridge 4312 to support the frame 4310. In some embodiments, the frame 4310 and the temples 4320 may be connected via a connection unit 4340, and the temples 4320 may be folded. In some embodiments, the frame 4310 may be detachably connected to the temples 4320. The connection unit 4340 may include a snap connection unit, a plug connection unit, a hinge connection unit, or the like, or any combination thereof. In some embodiments, the frame 4310 and the temples 4320 may not be connected via the connection unit 4340. In other words, the glasses support (e.g., the frame 4310 and the temples 4320) may be integrally formed.

A type of the lens(es) 4330 may be determined according to actual needs. For example, the lenses 4330 may include plane lenses, diopter lenses (e.g., hyperopia lenses, myopia lenses), sunglass lenses, 3D lenses, or the like. As another example, the lenses 4330 may include lenses with an augmented reality (AR) function and/or lenses with a virtual reality (VR) function. In some embodiments, the smart glasses 4300 may receive a user instruction (e.g., a switching instruction for switching between a normal mode, a VR mode, an AR mode, etc.). According to the received user instructions, the lenses 4330 may automatically adjust light transmittance and/or haze degree, and activate or close a mini projection device (not shown in FIG. 43A or FIG. 43B) to realize mode switch between the normal mode, the VR mode, the AR mode, etc. For example, after receiving the instruction for switching the mode to the AR mode, the light transmittance of the lens(es) 4330 may be reduced, and an image or a video to be projected may be projected outside the lens(es) 4330 in a user's gaze direction through the mini projection device. As another example, after receiving the instruction for switching to the AR mode, the haze degree of the lens(es) 4330 may be increased to (or substantially) 100%, and an image or a video to be projected may be projected inside the lens(es) 4330 through the mini projection device. In some embodiments, the lens(es) 4330 may include a spherical surface, an aspheric surface, a toric surface, or the like, or any combination thereof. In some embodiments, the lens(es) 4330 may be made of a plastic material (e.g., polyurethane, epoxy-based plastic, allyl diethylene glycol carbonate plastic, etc.), a glass material (e.g., mineral glass, organic glass, etc.), or the like, or any combination thereof.

At least one of the temples 4320 (e.g., the temple 4320-2) may include a front end 4322 connected with the frame 4310 and a hook-shaped structure. A first end of the hook-shaped structure may be integrally formed with the front end 4322, and a second end 4324 of the hook-shaped structure away from the frame 4310 may be bent downward. The hook-shaped structure may be hooked on a rear end 4324 of the user's ear when the user wears the smart glasses 4300. In some embodiments, to save material of the smart glasses 4300 and improve wearing comfort of the user, a sectional area of the second end 4324 may be smaller than a sectional area of the first end 4322, that is, the second end 4324 may be thinner than the first end 4322. In some embodiments, an immobilization unit (e.g., an immobilization unit 4660 in FIG. 46A) may be disposed in a center of at least one of the temples 4320. The fixing unit may be configured to immobilize the smart glasses 4300 on the user's ears and may be not easy to loosen.

In some embodiments, the temples 4320 and/or the frame 4310 may be made of metal material (e.g., copper, aluminum, titanium, gold, etc.), alloy material (e.g., aluminum alloys, titanium alloys, etc.), plastic material (e.g., polyethylene, polypropylene, epoxy resin, nylon, etc.), fiber material (e.g., acetate fiber, propionic acid fiber, carbon fiber, etc.), or the like, or any combination thereof. The material of the frame 4310 and that of the temples 4320 may be the same or different. For example, the frame 4310 may be made of plastic material, and the temples 4320 may be made of metal material. As another example, the frame 4310 may be made of plastic material, and the temples 4320 may be made of metal and plastic material. In some embodiments, a protective cover may be disposed on the temple 4320-1 and/or the temple 4320-2. The protective cover may be made of soft material with certain elasticity, such as soft silica gel, rubber, etc., to provide a soft touch sense for the user.

In some embodiments, as shown in FIG. 43B, a vertical distance h1 between a symmetry center of the frame 4310 and a center point of a line connecting a second end of the temple 4320-1 and a second end of the temple 4320-2 may be 8 centimeters-20 centimeters. In some embodiments, the vertical distance h1 may be 8.5 centimeters-19 centimeters. In some embodiments, the vertical distance h1 may be 9 centimeters-18 centimeters. In some embodiments, the vertical distance h1 may be 9.5 centimeters-17 centimeters. In some embodiments, the vertical distance h1 may be 10 centimeters-16 centimeters. In some embodiments, the range of h1 may be 10.5 centimeters -15 centimeters. In some embodiments, the vertical distance h1 may be 11 centimeters -14 centimeters. In some embodiments, the vertical distance h1 may be 11.5 centimeters-13 centimeters. As shown in FIG. 43B, a distance h2 between center points of the connection units corresponding to the temple 4320-1 and the temple 4320-2 may be 7 centimeters-17 centimeters. In some embodiments, the distance h2 may be 7.5 centimeters-16 centimeters. In some embodiments, the distance h2 may be 8 centimeters-15 centimeters. In some embodiments, the distance h2 may be 8.5 centimeters-14 centimeters. In some embodiments, the distance h2 may be 9 centimeters-13 centimeters. In some embodiments, the distance h2 may be 9.5 centimeters-12 centimeters. In some embodiments, the distance h2 may be 10 centimeters-11 centimeters.

The glasses support (e.g., the frame 4310 and/or the temples 4320) may include a hollow structure. An acoustic output device (e.g., the acoustic output device 100, the acoustic output device 300, the acoustic output device 400, the acoustic output device 500, the acoustic output device 600, etc.), a microphone noise reduction system (e.g., the microphone noise reduction system 3800, the microphone noise reduction system 3900A, the microphone noise reduction system 3900B, etc), a circuit board, a battery slot, etc., may be disposed in the hollow structure.

Figure 46A:
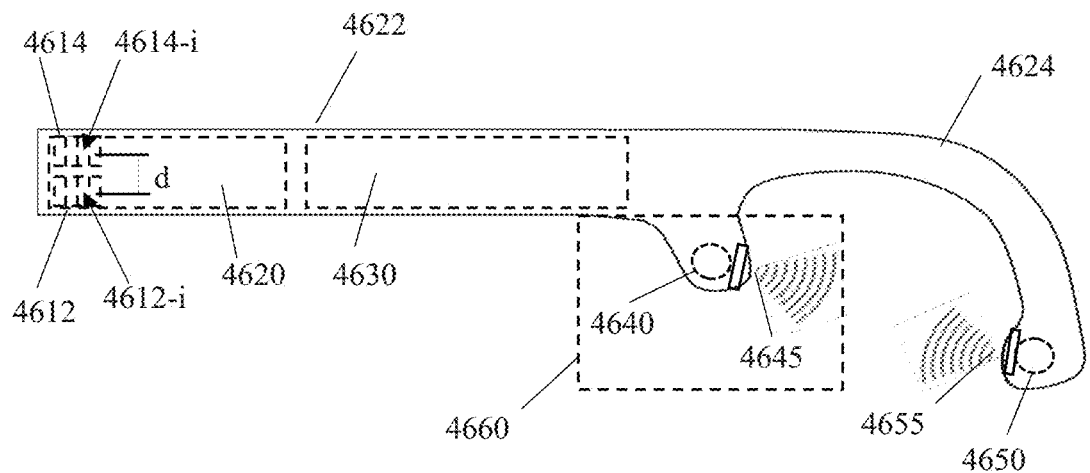
FIG. 46A is a schematic diagram illustrating a temple of exemplary smart glasses according to some embodiments of the present disclosure.

The acoustic output device may be configured to output sound to the user. In some embodiments, the acoustic output device may include at least one set of low-frequency acoustic drivers and at least one set of high-frequency acoustic drivers. In some embodiments, when a distance between guiding holes corresponding to the high-frequency acoustic drivers is smaller than a distance between guiding holes corresponding to the low-frequency acoustic drivers, a sound volume heard by the user's ears may be increased, and a small sound leakage may be generated, thereby preventing the sound from being heard by others near the user of the acoustic output device. In some embodiments, the acoustic output device may include at least one set of acoustic drivers. For example, as shown in FIG. 46A, the at least one set of acoustic drivers may include an acoustic driver 4640 and an acoustic driver 4650. A temple 4600A may include a sound hole 4645 and a sound hole 4655 that cooperate with the acoustic driver 4640 and the acoustic driver 4650, respectively. The acoustic driver 4650 and the sound hole 4655 may be disposed at a rear end 4624 of the temple 4600A. The sound hole 4645 and the sound hole 4655 may be (or approximately be) regarded as two-point sound sources (i.e., a dual-point sound source). Generally, a baffle disposed between the dual-point sound source may increase the volume of the near-field sound and not significantly increase the volume of the far-field leakage sound, thereby improving the user's hearing experience. When the smart glasses 4300 equipped with the temple 4600A is worn by the user, the sound hole 4645 may be on a front side of an ear, and the sound hole 4655 may be on a rear side of the ear. The auricle of the user may be regarded as the baffle between the sound hole 4645 and the sound hole 4655. The auricle may increase a distance between the sound hole 4645 and the sound hole 4655. When the smart glasses are playing voice, the baffle may significantly increase the volume of the near-field sound, thereby improving the user's hearing experience. More descriptions regarding the acoustic output device may be found elsewhere in the present disclosure. See, e.g., FIG. 1 to FIG. 37 and the relevant descriptions thereof.

The microphone noise reduction system may include at least one microphone array, a noise reduction device, a synthesis device, etc. Each microphone of the at least one microphone array may be configured to collect sub-band voice signals. The noise reduction device may be configured to generate a phase modulation signal with a phase opposite to one of the sub-band noise signal according to the sub-band noise signals in the collected sub-band voice signals, thereby reducing the noise of the sub-band voice signal. Denoised sub-band voice signals corresponding to the collected sub-band voice signals may be transmitted to the synthesis device to be synthesized to generate a target voice signal. More descriptions regarding the microphone noise reduction system may be found elsewhere in the present disclosure. See, e.g., FIG. 38, FIG. 39A, and/or FIG. 39B, and the relevant descriptions thereof. In some embodiments, the microphone array may be disposed on at least one of the temples 4320 or the frame 4310. More descriptions regarding the disposition of the at least one microphone array may be found elsewhere in the present disclosure. See, e.g., FIG. 44 A, FIG. 44 B, FIG. 45 A, and FIG. 45 B, and the relevant descriptions thereof. In some embodiments, positions of the noise reduction device and the synthesis device in the smart glasses 4300 may be disposed according to actual needs. For example, the noise reduction device and the synthesis device may be integrated together on the circuit board. As another example, the noise reduction device and the synthesis device may be disposed on at least one of the temples 4320 or the frame 4310, respectively. In some embodiments, a Bluetooth module may be integrated into the circuit board. The battery slot may be configured to install the battery which may be configured to provide power to the circuit board. Through the integrated Bluetooth module, the smart glasses 4300 may realize a function such as making and/or answering a call, listening to music, etc.

Figure 44A:
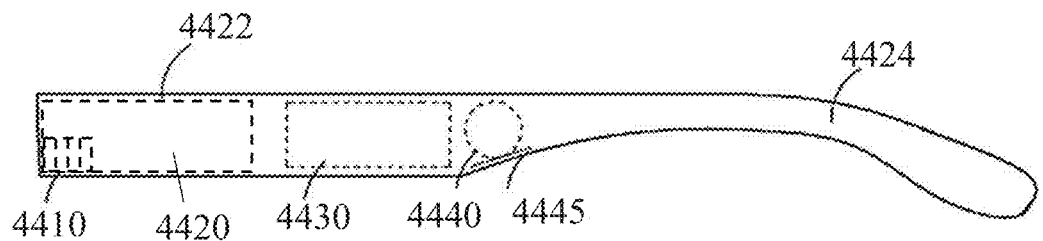
FIG. 44A is a schematic diagram illustrating a temple of exemplary smart glasses according to some embodiments of the present disclosure.
Figure 44B:
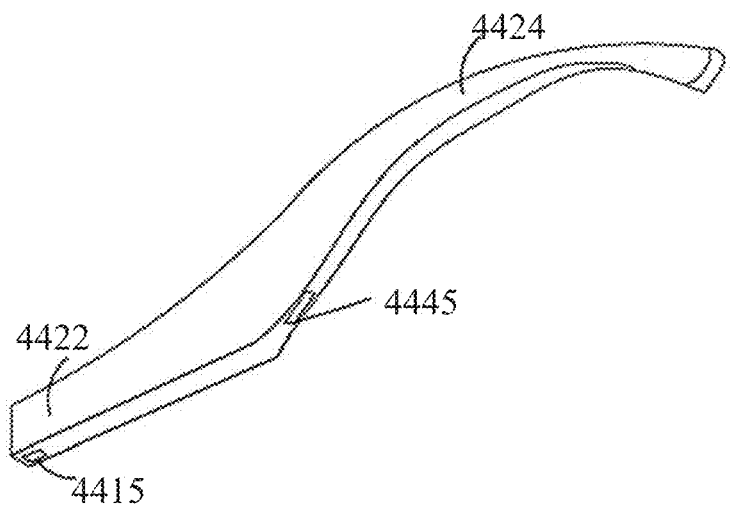
FIG. 44B is a schematic diagram illustrating a temple of exemplary smart glasses according to some embodiments of the present disclosure.

FIG. 44A and FIG. 44B are schematic diagrams of exemplary temples according to some embodiments of the present disclosure. As shown in FIG. 44A and FIG. 44B, one of the temples 4320 (e.g., the temple 4320-1 and/or the temple 4320-2) may be a hollow structure. The hollow structure may be configured to accommodate a microphone array 4410 (e.g., the microphone array 3810 in the microphone noise reduction system 3800), a circuit board 4420, a battery slot 4430, and an acoustic output device 4440. In some embodiments, the hollow structure may include a noise reduction device and a synthesis device (not shown in FIG. 44A and FIG. 44B). As shown in FIG. 44B, a sound inlet 4415 (or a sound hole for inputting the sound) matched with the microphone array 4410, and a sound outlet 4445 (or a sound hole for outputting the sound) matched with the acoustic output device 4440 may be disposed on a surface of one of the temples 4320. It should be noted that positions of the microphone array 4410, the circuit board 4420, the battery slot 4430, the acoustic driver 4440, and other components may be adjusted in the hollow structure according to actual needs, which may be not the same as that illustrated in FIG. 44A. For example, the position of the battery slot 4430 and the position of the circuit board 4420 may be exchanged. As another example, the microphone array 4410 may be disposed at a rear end 4424 of the one of temples 4320. In some embodiments, the microphone array may be disposed in the frame 4310 (e.g., the bridge 4312).

Figure 45A:
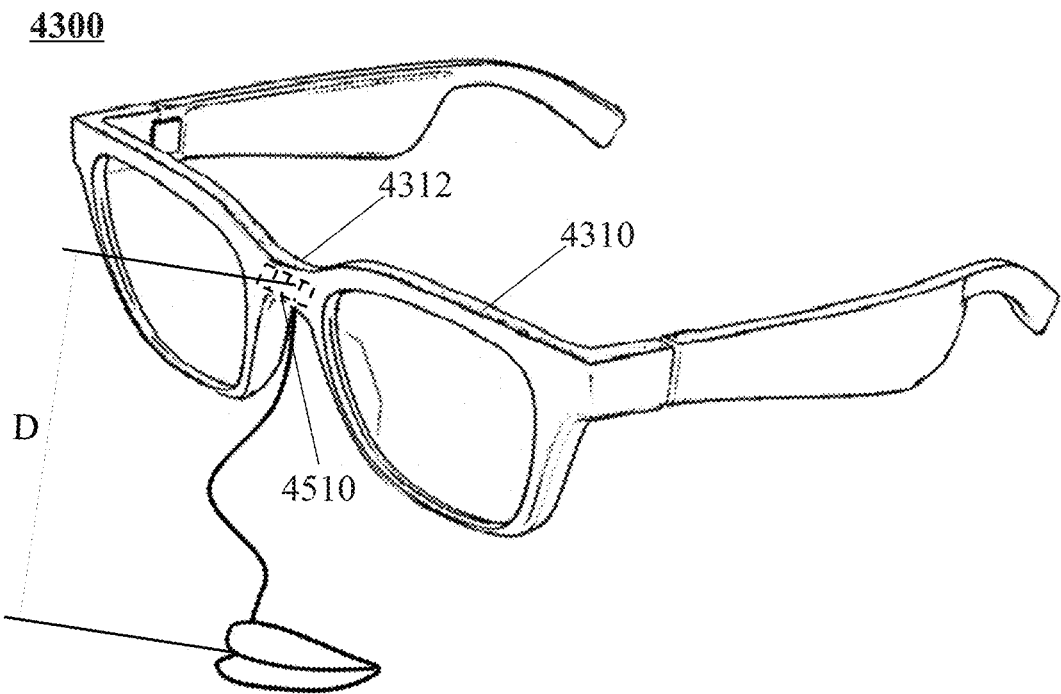
FIG. 45A is a schematic diagram illustrating exemplary smart glasses according to some embodiments of the present disclosure.
Figure 45B:
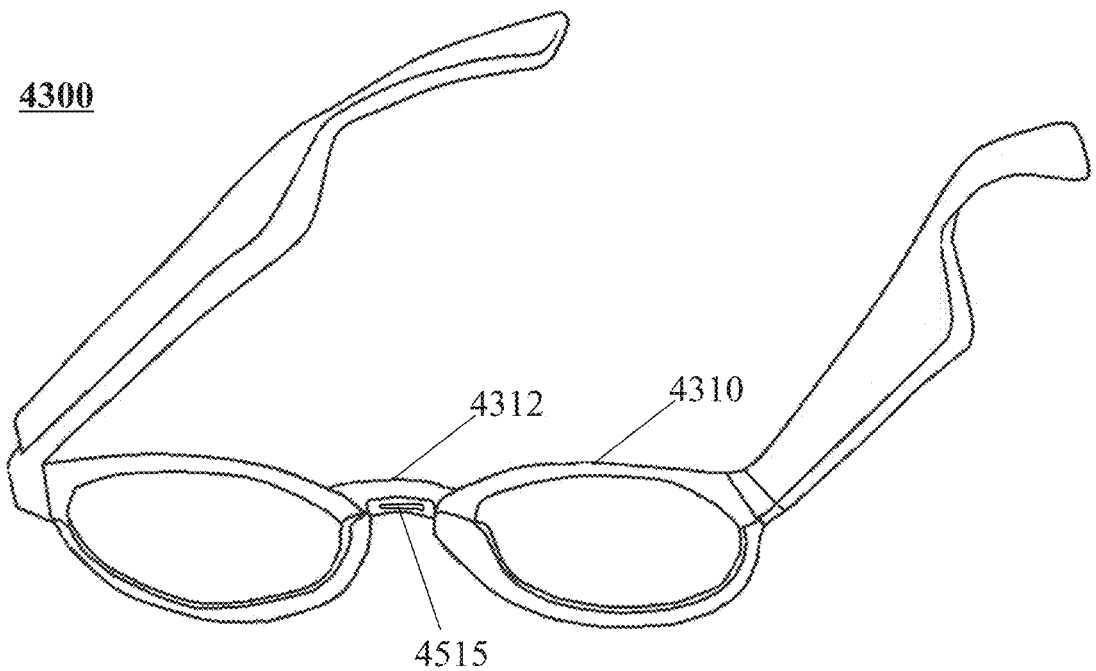
FIG. 45B is a schematic diagram illustrating exemplary smart glasses according to some embodiments of the present disclosure.

FIG. 45A and FIG. 45B are schematic diagrams illustrating an exemplary smart glasses according to some embodiments of the present disclosure. As shown in FIG. 45A and FIG. 45B, a microphone array 4510 may be disposed at the bridge 4312 in a middle of the frame 4310. A sound inlet 4515 may be disposed on a surface of the bridge 4312, which may be matched with the microphone array 4510.

In some embodiments, as shown in FIG. 45A, when a user wears a smart glasses 4300, a distance D between a center point of the microphone array 4410 or the microphone array 4510 and a center point of the user's mouth (i.e., a main sound source) may be 2 centimeters-20 centimeters. In some embodiments, the distance D may be 2.5 centimeters-18 centimeters. In some embodiments, the distance D may be 3 centimeters-16 centimeters. In some embodiments, the distance D may be 3.5 centimeters-14 centimeters. In some embodiments, the distance D may be 4 centimeters-12 centimeters. In some embodiments, the distance D may be 4.5 centimeters-10 centimeters. In some embodiments, the distance D may be 5 centimeters –8 centimeters. In some embodiments, the distance D may be 5.5 centimeters-7.5 centimeters. In some embodiments, the distance D may be 6 centimeters-7 centimeters.

In some embodiments, the microphone array 4410 may include at least a pair of low-frequency microphones and at least a pair of high-frequency microphones. The configuration of each pair of microphones may be the same. That is, the configurations of low-frequency microphones in one pair may be the same; the configurations of high-frequency microphones in one pair may be the same. Each pair of microphones may correspond to sub-band voice signals with the same frequency band. That is, sub-band voice signals corresponding to low-frequency microphones in one pair may have the same frequency band, and sub-band voice signals corresponding to high-frequency microphones in one pair may have the same frequency band. A distance between microphones in each pair of microphones may be the same. That is, a distance between microphones of each pair of low-frequency microphones may be equal to a distance between microphones of each pair of high-frequency microphones. For illustration purposes, a microphone of each pair of microphones closer to the main sound source may be regarded as a first microphone, and a microphone of each pair of microphones away from the main sound source may be regarded as a second microphone. FIG. 46A is a schematic diagram illustrating an exemplary temple 4600 of smart glasses according to some embodiments of the present disclosure. As shown in FIG. 46A, a hollow structure of the temple 4600A may include two sets of microphones that correspond to each other. That is, a microphone array may include two microphone sets (e.g., a first microphone set 4612 and a second microphone set 4614), and the two microphone sets may correspond to each other. Each of the first microphone set 4612 and the second microphone set 4614 may include microphones corresponding to a plurality of sub-band voice signals with different frequency bands. A microphone in the first microphone set 4612 may correspond to a microphone in the second microphone set 4614 one to one. A microphone in the first microphone set 4612 and a corresponding microphone in the second microphone set 4614 may correspond to sub-band voice signals with the same frequency band. For example, each microphone in the first microphone set 4612 and/or the second microphone set 4614 may decompose a voice signal into a sub-band voice signal. The voice signal may be processed by a first microphone in the first microphone set 4612 and a corresponding second microphone in the second microphone set 4614, and sub-band voice signals with the same frequency band may be generated by the first microphone and the corresponding second microphone.

A distance between the first microphone set 4612 and the main sound source (e.g., a human mouth) may be less than a distance between the second microphone set 4614 and the main sound source. In some embodiments, the first microphone set 4612 and the second microphone set 4614 may be distributed in the temple 4600A in a specific manner, and the main sound source may be in a direction from the second microphone set 4614 pointing to the first microphone set 4614.

In some embodiments, for a first microphone 4612-$i$ ($i$ is an integer equal to or greater than 1) and a second microphone 4614-$i$ corresponding to the first microphone 4612-$i$, due to the distance between the main sound source and the first microphone 4612-$i$ and/or the distance between the main sound source and the second microphone 4614-$i$ may be smaller than distances between other sound sources (e.g., a noise source) in the environment and the first microphone 4612-$i$ and/or distances between the other sound sources and the second microphone 4614-$i$ when the user wears the smart glasses with the temple 4600A, the main sound source may be regarded as a near-field sound source of the first microphone 4612-$i$ and the second microphone 4614-$i$. For the near-field sound source, a volume of a sound received by a microphone may be associated with the distance between the near-field sound source and the microphone. The first microphone 4612-$i$ may be close to the main sound source than the second microphone 4614-$i$, and an audio signal may be processed by the first microphone 4612-$i$ to generate a relatively great sub-band voice signal Vn. The second microphone 4614-$i$ may be relatively far away from the main sound source than the first microphone 4612-$i$, and the audio signal may be processed by the second microphone 4614-$i$ to generate a relatively small sub-band voice signal V12, and Vn is greater than the VJ2. As used herein, a first signal greater than a second signal refers to that the amplitude (i.e., the intensity) of the first signal exceeds the amplitude (i.e., the intensity) of the second signal.

In some embodiments, the noise source in the environment may be relatively far away from the first microphone 4612-$i$ and the second microphone 4614-$i$, and the noise source may be regarded as a far-field sound source of the first microphone 4612-i and the second microphone 4614-j. For the far-field sound source, the noise is processed by the microphone sets and used to generate sub-band noise signals. Values of the generated sub-band noise signals may be (or substantially) equal, i.e., Vy1 ~ VY2.

The first microphone 4612-i may process the received voice signal and generate a total voice signal which may be represented by Equation (11) below:

$$V_1 = V_{J1} + V_{Y1}, \quad (11)$$

The second microphone 4614-i may process the received voice signal and generate a total voice signal which may be represented by Equation (12) below:

$$V_2 = V_{J2} + V_{Y2}, \quad (12)$$

To eliminate the noise in the received voice signal, a difference operation may be performed between the total voice signal generated by the first microphone 4612-i, and the total voice signal generated by the second microphone 4614-i. The difference operation may be represented by Equation (13) below:

$$V = V_1 - V_2 = (V_{J1} - V_{J2}) + (V_{Y1} - V_{Y2}) \approx V_{J1} - V_{J2}, \quad (13)$$

Further, actual sub-band voice signals (i.e., $V_{J1}$ or $V_{J2}$) send by the main sound source and actually received by the first microphone 4612-i and/or the second microphone 4614-i may be determined according to a result of the difference operation of the sub-band voice signals determined based on Equation (13), the distance between the first microphone 4612-i and the main sound source, and the distance between the second microphone 4614-i and the main sound source. In some embodiments, the difference results of sub-band voice signals may be input into a synthesis device (not shown) for further processing after the difference results being enhanced and amplified, and a target signal may be generated. The target signal may be broadcast to the user via an acoustic driver 4640 and/or an acoustic driver 4650.

Figure 46B:
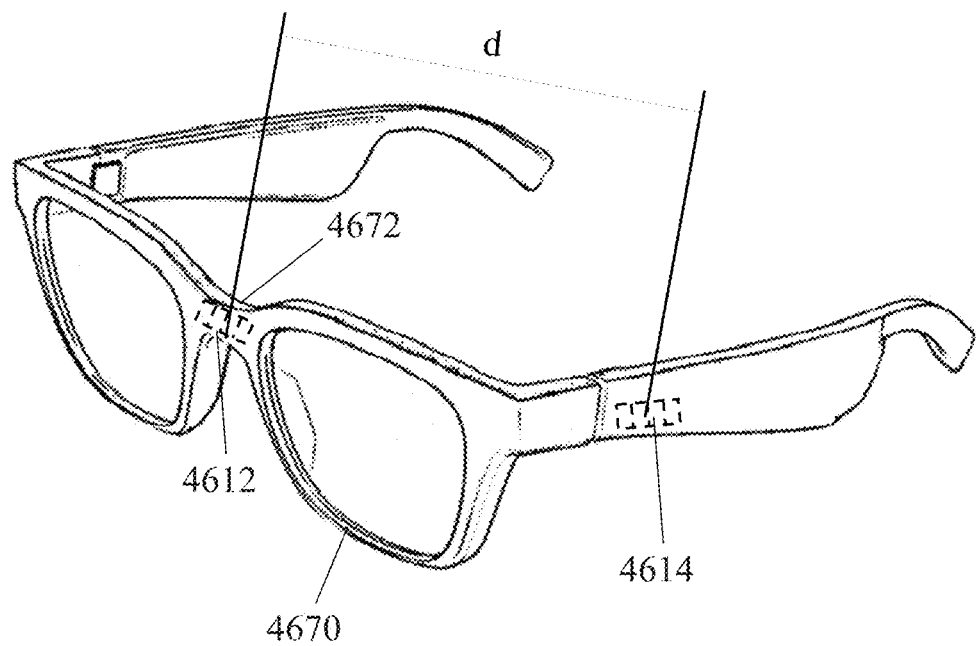
FIG. 46B is a schematic diagram illustrating exemplary smart glasses according to some embodiments of the present disclosure.

In some embodiments, the first microphone set 4612 and/or the second microphone set 4614 may be disposed on the temple 4600A and/or a frame 4670 (as shown in FIG. 46A and FIG. 46B). To improve the quality of the generated sub-band voice signals, the difference result of the sub-band voice signals determined according to Equation (13) may be relatively great, i.e., $V_{J1} \gg V_{J2}$. In some embodiments, an position of the first microphone set 4612 may relatively close to the main sound source, and an position of the second microphone set 4614 may be relatively far away from the main sound source. In some embodiments, a baffle or the like may be disposed between two microphone arrays. For example, the first microphone set 4612 may be disposed at a front end 4622 of the temple 4600A, and the second microphone set 4614 may be disposed at a rear end of the temple 4624. When the user wears the smart glasses with the temple 4600A, the auricle may increase the distance between the first microphone set 4612 and the second microphone set 4614, and the auricle may be regarded as the baffle between the first microphone set 4612 and the second microphone set 4614. In some embodiments, the distance between the first microphone set 4612 and the main sound source may be the same as the distance between the microphone array 4410 as shown in FIG. 44A or the microphone array 4510 as shown in FIG. 45A and the main sound source. In some embodiments, a distance d (shown in FIG. 46A or 46B) between the first microphone set 4612 and the second microphone set 4614 may be not less than 0.2 centimeters. In some embodiments, the distance d may not be less than 0.4 centimeters. In some embodiments, the distance d may not be less than 0.6 centimeters. In some embodiments, the distance d may not be less than 0.8 centimeters. In some embodiments, the distance d may not be less than 1 centimeters. In some embodiments, the distance d may not be less than 2 centimeters. In some embodiments, the distance d may not be less than 3 centimeters. In some embodiments, the distance d may be not less than 4 centimeters. In some embodiments, the distance d may be not less than 5 centimeters. In some embodiments, the distance d may be not less than 6 centimeters. In some embodiments, the distance d may be not less than 7 centimeters. In some embodiments, the distance d may be not less than 8 centimeters. In some embodiments, the distance d may be not less than 9 centimeters. In some embodiments, the distance d may be not less than 10 centimeters. In some embodiments, the distance d may be not less than 11 centimeters. In some embodiments, the distance d may be not less than 12 centimeters. In some embodiments, the distance d may be not less than 13 centimeters. In some embodiments, the distance d may be not less than 14 centimeters. In some embodiments, the distance d may be not less than 15 centimeters. In some embodiments, the distance d may be not less than 17 centimeters. In some embodiments, the distance d may be not less than 19 centimeters. In some embodiments, the distance d may be not less than 20 centimeters.

Figure 47:
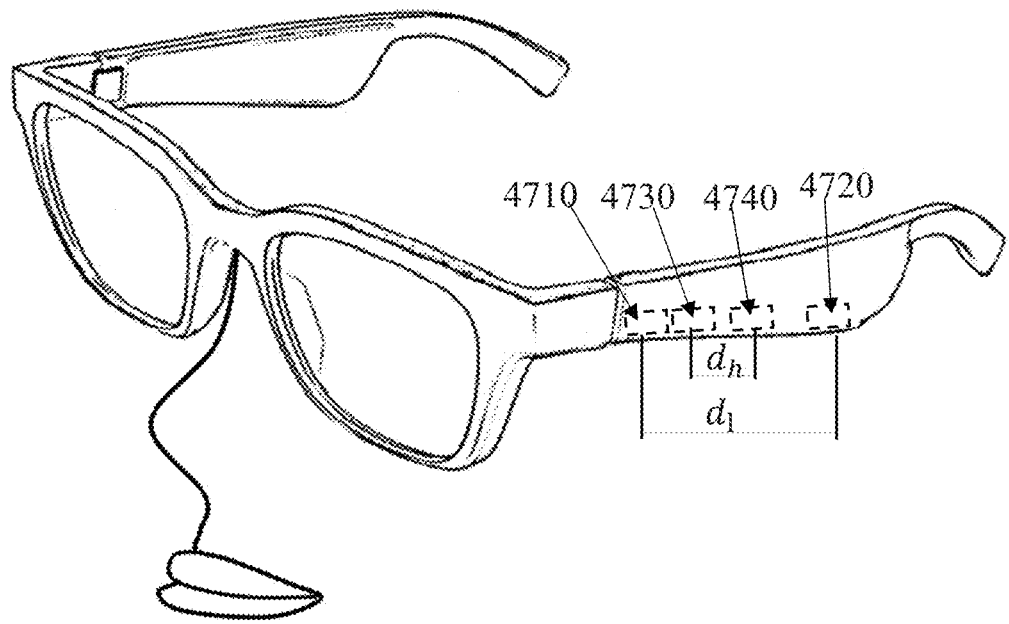
FIG. 47 is a schematic diagram illustrating exemplary smart glasses according to some embodiments of the present disclosure.

In some embodiments, a distance between microphones of each pair of microphones in a microphone array may be different. A distance between low-frequency microphones may be greater than a distance between high-frequency microphones. FIG. 47 is a schematic diagram illustrating exemplary smart glasses according to some embodiments of the present disclosure. As shown in FIG. 47, a microphone array in a smart glasses 4700 may include at least one pair of low-frequency microphones (e.g., a low-frequency microphone 4710 and a low-frequency microphone 4720) and at least one pair of high-frequency microphones (e.g., a high-frequency microphone 4730 and a high-frequency microphone 4740). A distance between the low frequency microphone 4710 and the low-frequency microphone 4720 may be greater than a distance between the high frequency microphone 4730 and the high frequency microphone 4740 Different distances of microphones may be determined for different frequencies, thereby improving the sound reception performance of the smart glasses 4700. Specifically, when a position of a far-field sound source is constant, a frequency of a low-frequency sound may be relatively low and a period of the low-frequency sound may be relatively long. Increasing the distance between the low-frequency microphone 4710 and the low-frequency microphone 4720 may improve the sound reception effect of the near-field sound and may not increase the low-frequency noise in the far-field (as a phase shift caused by the distance between the low-frequency microphone 4710 and the low-frequency microphone 4720 may only account for a relatively small part of the period). For high-frequency sounds, the frequency may be relatively great and the period may be relatively short. As the distance between the high-frequency microphone 4730 and the high-frequency microphone 4740 decreases, a phase difference of far-field high-frequency noises collected by the high-frequency microphone 4730 and the high-frequency microphone 4740 may gradually decrease, thereby eliminating long-range high-frequency noises. The distance between the high-frequency microphones may be set smaller than the distance between the low-frequency microphones, and different operations may be performed to reduce the noise, the far-field noise (e.g., a far-field noise may include a far-field low-frequency noise and a far-field high-frequency noise) may be eliminated or approximately eliminated. It should be noted that positions of the low-frequency microphone 4710, the low-frequency microphone 4720, the high-frequency microphone 4730, and the high-frequency microphone 4740 in FIG. 47 may be only exemplary, and each of the microphones may be disposed at a suitable position of the smart glasses 4700. For example, the low-frequency microphone 4710 and the low-frequency microphone 4720 may be disposed in the frame, the high-frequency microphone 4730 and the high-frequency microphone 4740 may be disposed in a temple. As another example, the low-frequency microphone 4710 may be disposed in the frame, the low-frequency microphone 4720, the high-frequency microphone 4730, and the high-frequency microphone 4740 may be disposed in the temple. In some embodiments, a range of the distance $d_l$ between the low-frequency microphone 4710 and the low-frequency microphone 4720 may be 0.8 centimeters-20 centimeters. In some embodiments, the range of $d_l$ may be 1 centimeters-18 centimeters. In some embodiments, the range of d may be 1.2 centimeters-16 centimeters. In some embodiments, the range of $d_l$ may be 1.4 centimeters-14 centimeters. In some embodiments, the range of $d_l$ may be 1.6 centimeters-12 centimeters. In some embodiments, the range of $d_l$ may be 1.8 centimeters-10 centimeters. In some embodiments, the range of $d_l$ may be 2 centimeters-8 centimeters. In some embodiments, the range of $d_l$ may be 2.2 centimeters-6 centimeters. In some embodiments, the range of $d_l$ may be 2.4 centimeters-4 centimeters. In some embodiments, the range of $d_l$ may be 2.6 centimeters-3.8 centimeters. In some embodiments, the range of d; may be 2.8 centimeters-3.6 centimeters. In some embodiments, $d_l$ may be 3 centimeters. In some embodiments, a range of the distance $d_h$ between the high-frequency microphone 4730 and the high-frequency microphone 4740 may be 1 millimeters-12 millimeters. In some embodiments, the range of $d_h$ may be 1.2 millimeters-11 millimeters. In some embodiments, the range of d) may be 1.2 millimeters-10 millimeters. In some embodiments, the range of d) may be 1.4 millimeters-9 millimeters. In some embodiments, the range of $d_h$ may be 1.6 millimeters-8 millimeters. In some embodiments, the range of $d_h$ may be 1.8 millimeters-7.5 millimeters. In some embodiments, the range of $d_h$ may be 2 millimeters-7 millimeters. In some embodiments, the range of $d_h$ may be 2.5 millimeters-6.5 millimeters. In some embodiments, the range of $d_h$ may be 3 millimeters-6 millimeters. In some embodiments, the range of $d_h$ may be 3.5 millimeters-5.5 millimeters. In some embodiments, the range of $d_h$ may be 4 millimeters-5.3 millimeters. In some embodiments, $d_h$ may be 5 millimeters. In some embodiments, for a human voice, a frequency band of the human voice may be mainly concentrated in a middle and low-frequency band. The low-frequency microphone 4710 may be disposed to be closer to the main sound source than the high-frequency microphone 4730, thereby improving the intensity of a picked-up middle and low-frequency band signal. The distance between the low-frequency microphone 4710 and the main sound source may be the same as the distance between the microphone array 4410 and the main sound source, which is not repeated herein.

It should be noted that the descriptions regarding the smart glasses (e.g., the smart glasses 4300, the smart glasses 4600B, the smart glasses 4700, etc.) and/or the temple (e.g., the temples 4320, the temple 4600A, etc.) may be intended to be illustrative, which do not limit the scope of the present disclosure. It should be understood that, after understanding the principle of the system, those skilled in the art may make various changes and modifications in forms and details to the application fields of the method and system without departing from the principle. However, the changes and modifications may not depart from the scope of the present disclosure. For example, the lenses 4330 may be omitted from the smart glasses 4300 As another example, the smart glasses 4300 may include one lens. The stabilization unit 4660 may be integrally formed with the temple 4600A or may be detachably disposed on the temple 4600A.

In some embodiments, a microphone noise reduction system of the smart glasses (e.g., the smart glasses 4300, the smart glasses 4600B, the smart glasses 4700, etc.) may pick up the voice signal of the user wearing the smart glasses through a sound hole, process the voice signal and generate a target signal, and transmit the target signal to an object or a device that the smart glasses may be communicated with. An acoustic output device in the smart glasses may receive an audio signal transmitted by the object or the device communicated with the smart glasses, convert the audio signal into a voice signal, and output the audio signal to the user wearing the smart glasses through the sound hole. In some embodiments, the smart glasses may generate a control instruction according to a received voice signal, and control one or more functions of the smart glasses. For example, the smart glasses may generate a control instruction according to a received voice to adjust the transmittance of at least one of the lenses, so as to pass the light with different luminous fluxes. In some embodiments, the smart glasses may automatically adjust the light transmittance and/or haze degree according to the received instruction, and call or turn off a mini-projection device (not shown) to realize free switching among a normal mode, a VR mode, an AR mode, etc. For example, after the smart glasses receive an instruction to switch to the AR mode, the transmittance of the lenses may be controlled to be decreased, and the AR image or video may be projected in front of the user's sight by calling the mini projection device. As another example, when the smart glasses receive an instruction to switch to the VR mode, the haze degree of the lenses may be controlled to be risen to close to 100%, and a VR image or video may be projected on the inside of the lenses by calling the mini projection device.

The beneficial effects of the embodiments of the present disclosure may include but be not limited to the following. (1) A microphone array including microphones with different frequency responses may have better sensitivity to voice signals in various frequency bands, and the smart glasses including the microphone array may have a relatively stable frequency response curve for a full frequency band, thereby improving the sound reception effect of the smart glasses; (2) Noise in a voice signal may be reduced by using noise reduction technology in the smart glasses; (3) The sound leakage of the smart glasses may be effectively reduced by using sub-band sound leakage reduction technology, thereby improving the user's experience. It should be noted that different embodiments may have different beneficial effects. In different embodiments, the possible beneficial effects may be any one or a combination of the beneficial effects described above, or any other beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A system, comprising:
   at least one storage medium including a set of instructions; and
   at least one processor in communication with the at least one storage medium, wherein when executing the set of instructions, the at least one processor is configured to cause the system to:
   obtain sub-band voice signals generated by a microphone array collecting a voice signal;
   for each of the sub-band voice signals,
   generate, based on the sub-band voice signal, a sub-band noise correction signal;
   generate, based on the sub-band noise correction signal and the sub-band voice signal, a target sub-band signal corresponding to the sub-band voice signal; and
   generate, based on target sub-band signals corresponding to the sub-band voice signals, a target signal;
   wherein the generating, based on the sub-band voice signal, a sub-band noise correction signal includes:
   generating a sub-band noise signal corresponding to the sub-band voice signal; and
   generating, based on the sub-band voice signal and the sub-band noise signal, the sub-band noise correction signal corresponding to the sub-band noise signal.

2. The system of claim 1, wherein the sub-band noise correction signal has a phase opposite to a phase of the sub-band noise signal.

3. The system of claim 1, wherein the microphone array includes one or more pairs of microphones, and distances from microphones in at least one pair of the one or more pairs of microphones to a main sound source are different.

4. The system of claim 3, wherein the generating a sub-band noise signal includes:
   designating a voice signal collected by a microphone of each pair of the pairs of microphones that is far from the main sound source as the sub-band noise signal.

5. The system of claim 3, wherein the obtaining sub-band voice signals includes:
   designating a voice signal collected by a microphone of each pair of the pairs of microphones that is close to the main sound source as one of the sub-band voice signals.

6. The system of claim 3, wherein the microphone array includes a pair of low-frequency microphones and a pair of high-frequency microphones.

7. The system of claim 1, wherein a combination of frequency bands of the sub-band voice signals covers a frequency band of the voice signal.

8. The system of claim 1, wherein microphones in the microphone array have different frequency responses to the voice signal.

9. An acoustic output device, comprising:
   at least one microphone array configured to generate sub-band voice signals by acquiring a voice signal; and
   a noise reduction device configured to generate a sub-band noise correction signal based on each of the sub-band voice signals and generate, based on the sub-band noise correction signal and each of the sub-band voice signals, a target sub-band voice signal corresponding to the sub-band voice signal;
   wherein the generating a sub-band correction signal based on each of the sub-band voice signals includes:
   generating a sub-band noise signal corresponding to each of the sub-band voice signals; and
   generating, based on the sub-band voice signal and the sub-band noise signal, the sub-band noise correction signal corresponding to the sub-band noise signal, the sub-band noise correction signal having a phase opposite to a phase of the sub-band noise signal.

10. The system of claim 9, wherein the microphone array includes one or more pairs of microphones, and distances from microphones in at least one pair of the one or more pairs of microphones to a main sound source are different.

11. The system of claim 10, wherein the generating sub-band voice signals includes:
    designating a voice signal collected by a microphone of each pair of the pairs of microphones that is close to the main sound source as one of the sub-band voice signals.

12. The system of claim 10, wherein the generating a sub-band noise signal includes:
    designating a voice signal collected by a microphone of each pair of the pairs of microphones that is far from the main sound source as the sub-band noise signal.

13. The acoustic output device of claim 9, wherein each of microphones of the at least one microphone array includes an acoustic channel element and a sound sensitive element;

the acoustic channel element includes an acoustic route configured to transmit the voice signal to the sound sensitive element; and the sound sensitive element is configured to convert the voice signal into one of the sub-band voice signals.

14. The acoustic output device of claim 9, wherein each of the at least one microphone array includes at least two microphones and at least two filters corresponding to the at least two microphones;

the at least two microphones are configured to receive the voice signal and transmit the voice signal to the at least two filters; and the at least two filters are configured to generate the sub-band voice signals based on the voice signal transmitted from the at least two microphones.

15. The acoustic output device of claim 9, wherein the noise reduction device includes at least two noise reduction units corresponding to at least two microphones of the at least one microphone array, each of the at least two noise reduction units includes a sub-band noise estimation sub-unit and a sub-band noise suppression sub-unit, the sub-band noise estimation sub-unit is configured to estimate noises in one of the sub-band voice signals and generate a sub-band noise signal based on the noises and the sub-band voice signal, and the sub-band noise suppression sub-unit is configured to receive the sub-band noise signal from the sub-band noise estimation sub-unit, generate the sub-band noise correction signal based on the sub-band noise signal and the sub-band voice signal, and generate a target sub-band voice signal based on the sub-band noise correction signal and the sub-band voice signal.

16. The acoustic output device of claim 15, wherein the sub-band noise suppression sub-unit includes a phase modulator, an amplitude modulator, and a sub-band voice signal generator, the phase modulator is configured to receive the sub-band noise signal and generate a phase modulation signal based on the sub-band noise signal, the amplitude modulator is configured to receive the phase modulation signal and generate the sub-band noise correction signal based on the phase modulation signal, and the sub-band voice signal generator is configured to generate the target sub-band voice signal based on the sub-band noise correction signal and the sub-band voice signal.

17. The acoustic output device of claim 9, further comprising a synthesis device, wherein the synthesis device is configured to generate a target signal by combing target sub-band voice signals corresponding to the sub-band voice signals.

18. A method implemented on a computing device including a storage device and at least one processor, the method comprising:

obtaining sub-band voice signals generated by a microphone array collecting a voice signal;

for each of the sub-band voice signals, generating, based on the sub-band voice signal, a sub-band noise correction signal;

generating, based on the sub-band noise correction signal and the sub-band voice signal, a target sub-band voice signal corresponding to the sub-band voice signal; and generating, based on target sub-band voice signals corresponding to the sub-band voice signals, a target signal;

wherein the generating, based on the sub-band voice signal, a sub-band noise correction signal includes:

generating a sub-band noise signal corresponding to the sub-band voice signal; and generating, based on the sub-band voice signal and the sub-band noise signal, the sub-band noise correction signal corresponding to the sub-band noise signal.

* * * * *